(12) United States Patent
Nakada

(10) Patent No.: US 12,179,614 B2
(45) Date of Patent: Dec. 31, 2024

(54) EXCAVATOR

(71) Applicant: SUMITOMO CONSTRUCTION MACHINERY CO., LTD., Tokyo (JP)

(72) Inventor: Kaoru Nakada, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 247 days.

(21) Appl. No.: 17/655,829

(22) Filed: Mar. 22, 2022

(65) Prior Publication Data

US 2022/0314820 A1 Oct. 6, 2022

(30) Foreign Application Priority Data

Mar. 31, 2021 (JP) ................................. 2021-062372

(51) Int. Cl.
| | | |
|---|---|---|
| *B60L 50/60* | (2019.01) | |
| *E02F 3/32* | (2006.01) | |
| *E02F 9/12* | (2006.01) | |
| *E02F 9/22* | (2006.01) | |

(52) U.S. Cl.
CPC ............... *B60L 50/66* (2019.02); *E02F 3/32* (2013.01); *B60L 2200/40* (2013.01); *E02F 9/123* (2013.01); *E02F 9/2221* (2013.01); *E02F 9/2285* (2013.01); *E02F 9/2292* (2013.01); *E02F 9/2296* (2013.01)

(58) Field of Classification Search
CPC .......... B60L 50/66; B60L 50/64; B60L 50/61; B60L 2200/40; B60L 1/003; E02F 3/32; E02F 9/123; E02F 9/2221; E02F 9/2285; H01M 50/204; H01M 50/207; H01M 50/258; H01M 50/244; H01M 50/249
See application file for complete search history.

(56) References Cited

U.S. PATENT DOCUMENTS

| | | | |
|---|---|---|---|
| 8,956,751 B2 * | 2/2015 | Noh ................. | H01M 10/0413 |
| | | | 429/99 |
| 9,156,341 B2 * | 10/2015 | Matsumura ............ | B60L 50/51 |
| 10,096,804 B2 * | 10/2018 | Miki .................. | H01M 50/367 |
| 2013/0313030 A1 | 11/2013 | Matsumura et al. | |
| 2023/0339359 A1 * | 10/2023 | Numata .................. | B60L 3/12 |

FOREIGN PATENT DOCUMENTS

| | | |
|---|---|---|
| JP | 2014-146461 | 8/2014 |
| JP | 2018-168635 | 11/2018 |
| JP | 2019-127751 | 8/2019 |

\* cited by examiner

*Primary Examiner* — Steve Clemmons
(74) *Attorney, Agent, or Firm* — IPUSA, PLLC

(57) ABSTRACT

An excavator includes a lower traveling body; an upper turning body turnably mounted to the lower traveling body; an actuator configured to drive a driven part including the lower traveling body and the upper turning body; and a power storage device mounted in the upper turning body and configured to serve as an energy source for driving the actuator. The power storage device includes a plurality of power storage modules stacked in a vertical direction, each of the plurality of power storage modules including a power storage part and a housing configured to house the power storage part. The housings of power storage modules among the plurality of power storage modules that are adjacent to each other in the vertical direction, are coupled to each other.

10 Claims, 26 Drawing Sheets

EXCAVATOR

CROSS-REFERENCE TO RELATED APPLICATION

The present application is based on and claims priority under 35 U.S.C. § 119 to Japanese Patent Application No. 2021-062372, filed on Mar. 31, 2021, the contents of which are incorporated herein by reference in their entirety.

BACKGROUND

1. Technical Field

The present invention relates to an excavator.

2. Description of the Related Art

For example, an electrically operated excavator that operates by using, as an energy source, a power storage device such as a battery, is known.

SUMMARY

According to an embodiment of the present invention, there is provided an excavator including a lower traveling body; an upper turning body turnably mounted to the lower traveling body; an actuator configured to drive a driven part including the lower traveling body and the upper turning body; and a power storage device mounted in the upper turning body and configured to serve as an energy source for driving the actuator, wherein the power storage device includes a plurality of power storage modules stacked in a vertical direction, each of the plurality of power storage modules including a power storage part and a housing configured to house the power storage part, and the housings of power storage modules among the plurality of power storage modules that are adjacent to each other in the vertical direction, are coupled to each other.

DETAILED DESCRIPTION

There are various usage modes of using an excavator, and there may be users that use the excavator by a usage mode in which the operating time of the excavator is relatively long with respect to each instance of charging the power storage device, and there may be users that use the excavator by a usage mode in which the operating time of the excavator is relatively short with respect to each instance of charging the power storage device. Therefore, depending on the usage mode of the electrically operated excavator used by the user, there may be cases where the capacity of the power storage device needs to be relatively large (high) and there may be cases where the capacity of the power storage device to be installed may be relatively small (low). Therefore, it is desirable that the capacity of the power storage device installed in each excavator can be easily changed in accordance with, for example, the user's usage mode, from the viewpoint of energy saving by reducing the weight of the power storage device, or from the viewpoint of cost reduction by reducing the capacity of the power storage device, or the like.

Therefore, it is desirable to provide a technology in which the capacity of a power storage device can be easily changed in an electrically operated excavator.

Hereinafter, an embodiment for carrying out the invention will be described with reference to the drawings.

[Overview of Excavator]

First, an overview of an excavator 100 as an example of a work machine will be described with reference to FIG. 1.

Figure 1:
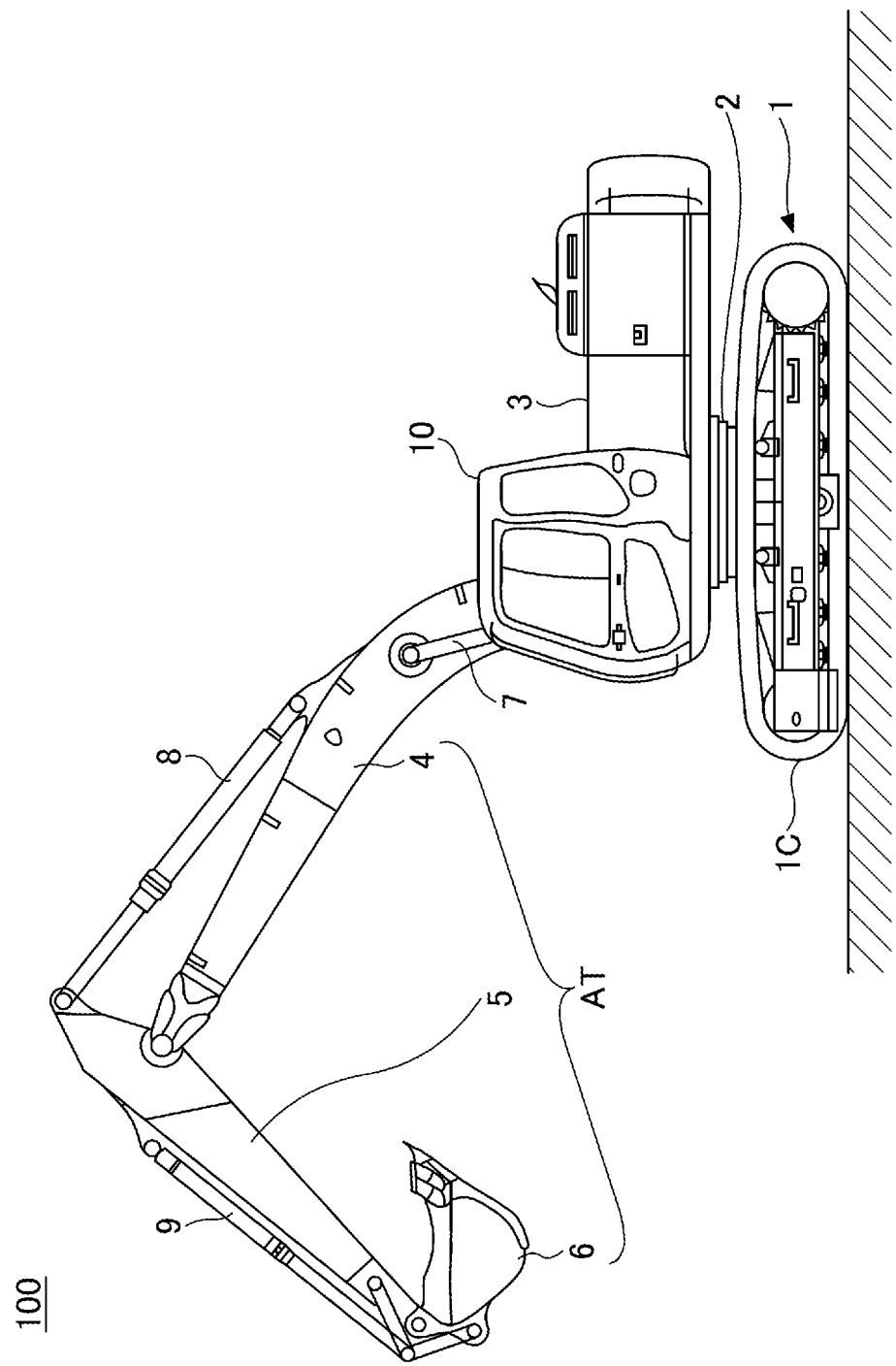
FIG. 1 is a side view of an excavator.

FIG. 1 is a side view illustrating an example of the excavator 100 according to the present embodiment.

The excavator 100 includes a lower traveling body 1, an upper turning body 3 that is mounted to the lower traveling body 1 in a turnable manner via a turning mechanism 2, an attachment AT, and a cabin 10 in which an operator is to be seated.

As described below, the cabin 10 may be omitted when the excavator 100 is remotely operated or the excavator 100 operates by a fully automatic operation.

The lower traveling body 1 includes, for example, a pair of left and right crawlers 1C (an example of a driven part). In the lower traveling body 1, each crawler 1C travels by being hydraulically driven by traveling hydraulic motors 1A and 1B (examples of actuators) (see FIGS. 2 and 3).

Figure 2:
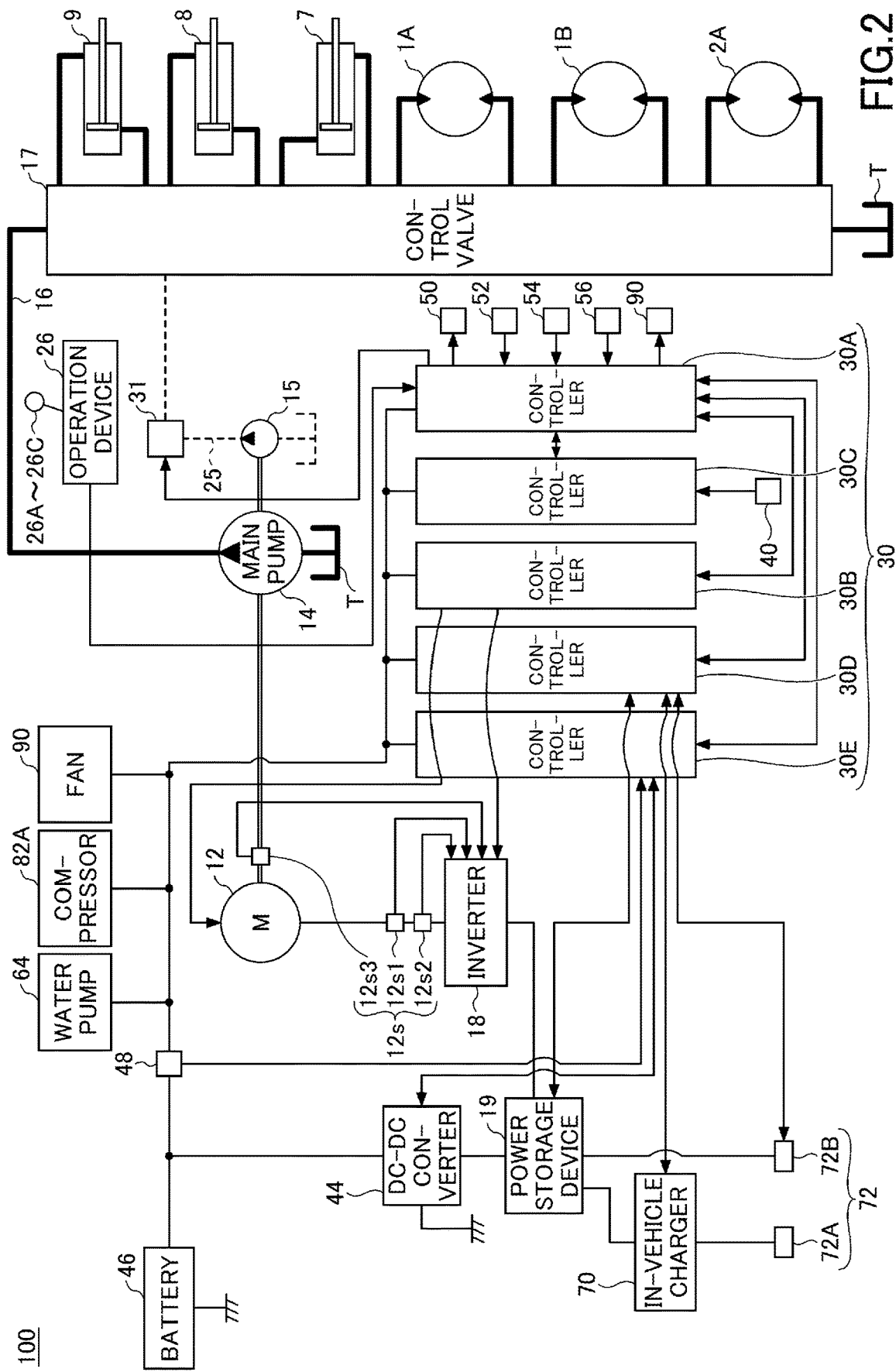
FIG. 2 is a block diagram schematically illustrating an example of a configuration of the excavator.
Figure 3:
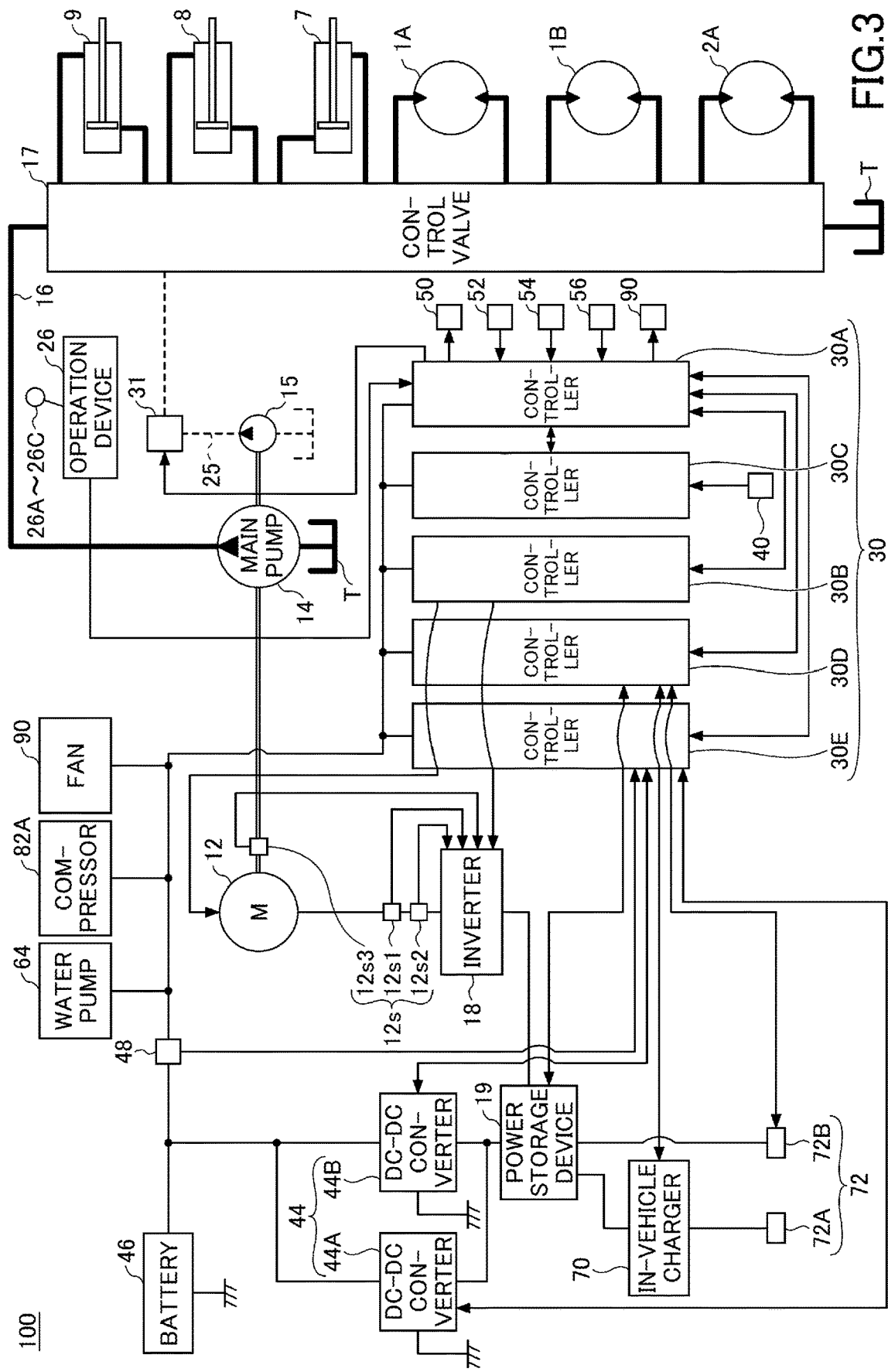
FIG. 3 is a block diagram schematically illustrating another example of a configuration of the excavator.

The upper turning body 3 (an example of a driven part) is hydraulically driven by a turning hydraulic motor 2A via the turning mechanism 2 (see FIGS. 2 and 3).

The attachment AT includes a boom 4, an arm 5, and a bucket 6.

The boom 4 (an example of a driven part) is pivotally mounted to the front center of the upper turning body 3, the arm 5 (an example of a driven part) is mounted to the leading end of the boom 4 so as to turn upward and downward, and the bucket 6 (an example of a driven part) is mounted to the leading end of the arm 5 so as to turn upward and downward. The boom 4, the arm 5, and the bucket 6 are hydraulically driven by a boom cylinder 7, an arm cylinder 8, and a bucket cylinder 9 (all examples of actuators) as hydraulic actuators.

The bucket 6 is an example of an end attachment and is used for drilling work, rolling work, and the like.

Other end attachments may be attached to the leading end of the arm 5, instead of the bucket 6, depending on the work content and the like. Other end attachments may be, for example, buckets of a type different from the bucket 6, such as a slope bucket, a dredger bucket, or the like. Other end attachments may also be, for example, end attachments of a type different from buckets, such as a breaker, an agitator, a grappler, and the like. Also, in the coupling part between the end attachment including the bucket 6 and the arm 5 may be provided with an auxiliary attachment such as, for example, a quick coupling, a tilt rotator, or the like.

In this example, as will be described later, in the excavator 100, all driven parts are hydraulically driven by the hydraulic oil supplied from a main pump 14 (see FIG. 2) which is powered by a pump motor 12. That is, in this example, the excavator 100 has a configuration in which a motor (engine) of what is known as a hydraulic excavator is replaced with the pump motor 12.

Some of or all of the driven parts of the excavator 100 may be electrically driven. For example, the upper turning body 3 may be electrically driven by a turning motor (an example of an actuator) via the turning mechanism 2 to turn relative to the lower traveling body 1.

The cabin 10 is mounted, for example, on the front left side of the upper turning body 3, and the inside of the cabin 10 is provided with an operation seat on which an operator is seated and an operation device 26 to be described later.

As described below, the cabin 10 may be omitted when the excavator 100 is remotely operated or the excavator 100 operates by a fully automatic operation.

The excavator 100 operates the driven parts, such as the lower traveling body 1 (the left and right crawlers 1C), the upper turning body 3, the boom 4, the arm 5, and the bucket 6, according to the operation of an operator seated in the cabin 10.

Further, the excavator 100 may be remotely operable (remote control) from outside the excavator 100, instead of or in addition to being operable by an operator seated in the cabin 10. When the excavator 100 is remotely operated, the interior of the cabin 10 may be unmanned. The following discussion assumes that the operation by the operator includes an operation with respect to the operation device 26 by an operator in the cabin 10 and/or remote operation by an external operator.

The remote operation includes a mode in which the excavator 100 is operated, for example, by an operation input relating to an actuator of the excavator 100 performed at a predetermined external device. The external device includes, for example, a management apparatus for managing the excavator 100, a terminal apparatus (user terminal), and the like, used by a user of the excavator 100. Hereinafter, the same may apply to remote monitoring as described below. In this case, the excavator 100 may be provided with a communication device capable of communicating with the external device, and for example, the excavator 100 may transmit an image representing the state around the excavator 100 based on image information (captured image), output by an imaging device included in the surrounding information acquiring device 40, which will be described later (hereinafter referred to as the "surrounding image"), to the external device. The external device may display a surrounding image of the excavator 100 that is received by a display device (hereinafter, "a display device for remote operation") arranged in the external device. Various information images (information screens) displayed on the output device 50 (display device) inside the cabin 10 of the excavator 100 may also be displayed on the display device for remote operation of the external device. Accordingly, the operator of the external device can remotely operate the excavator 100 while confirming the display contents of the surrounding image of the excavator 100 displayed on the remote operation display device, the information screen, or the like. The excavator 100 may operate an actuator in response to a remote operation signal representing the content of the remote operation, received from an external device by a communication device, to drive a driven part such as the lower traveling body 1, the upper turning body 3, the boom 4, the arm 5, the bucket 6, and the like.

The remote operation may also include a mode in which the excavator 100 is operated, for example, by voice sound input, gesture input, or the like, from outside to the excavator 100, from a person (e.g., a worker) around the excavator 100. Specifically, the excavator 100 recognizes a voice that is spoken by a nearby worker or the like or a gesture that is carried out by a worker or the like through a voice sound input device (e.g., a microphone) or a gesture input device (e.g., an imaging device) mounted on the excavator 100 (own machine). The excavator 100 may operate an actuator in accordance with the content of the recognized voice, gesture, or the like to drive a driven part, such as the lower traveling body 1, the upper turning body 3, the boom 4, the arm 5, the bucket 6, and the like.

The excavator 100 may also automatically operate the actuator regardless of the operator's operation. Thus, the excavator 100 implements a function (referred to as "automatic operation function" or "machine control (MC) function") to automatically operate at least some of the driven parts including the lower traveling body 1, the upper turning body 3, the boom 4, the arm 5, the bucket 6, and the like.

The automatic operation function may include a function to automatically operate a driven part (actuator) other than the driven parts (actuators) that are the targets of operation, in accordance with an operation or a remote operation by the operator with respect to the operation device 26 (referred to as "semi-automatic operation function" or "operation-assisted MC function"). The automatic operation function may include a function to automatically operate at least some of a plurality of driven parts (actuators), on the assumption that there is no operation or remote operation performed by the operator on the operation device 26 (referred to as "fully automatic operation function" or a "fully automatic MC function"). In the excavator 100, the interior of the cabin 10 may be unmanned if a fully automatic operation function is enabled. Further, the semi-automatic operation function, the fully automatic operation function, or the like may include a mode in which the operation content of the driven part (actuator) subject to automatic operation is automatically determined in accordance with a predetermined rule. Further, the semi-automatic operation function, the fully automatic operation function, or the like may include a mode in which the excavator 100 autonomously makes various determinations, and the operation content of the driven part (actuator) subject to automatic operation is autonomously determined, based on the determination result (referred to as "autonomous operation function").

Further, when the excavator 100 operates by an automatic operation function (particularly a fully automatic operation function), the work status of work by the excavator 100 may be remotely monitored from outside the excavator 100.

When remote monitoring is performed, the excavator 100 may be provided with a communication device capable of communicating with the external device and transmit, for example, an image (surrounding image) representing the surrounding state of the excavator 100 based on image information output by the imaging device included in the surrounding information acquiring device 40, which will be described later, to the external device. The external device may display image information (captured image) received by a display device (hereinafter, a "display device for remote monitoring") arranged in the external device. Various information images (information screens) displayed on the output device 50 (display device) inside the cabin 10 of the excavator 100 may also be displayed on the display device for remote monitoring of the external device in the same manner. Thus, the monitoring person at the external device can remotely monitor the work status of the excavator 100 while confirming the display contents of the surrounding image of the excavator 100, the information screen, or the like displayed on the remote monitoring display device, for example. The monitoring person at the external device may also be able to, for example, implement emergency stop with respect to the operation of the excavator 100 or to perform an intervention operation with respect to the excavator 100 by providing a predetermined input to the external device in the event that a problem arises in the work status of the excavator 100. In this case, the excavator 100 may stop the actuator in response to a signal indicating emergency stop received from the external device through the communication device, to implement emergency stop with respect to the driven part such as the lower traveling body 1, the upper turning body 3, the boom 4, the arm 5, the bucket 6, and the like. Further, the excavator 100 may operate the actuator in response to a signal representing the contents of the intervention operation received from the external device through the communication device to implement the intervention operation with respect to a driven part such as the lower traveling body 1, the upper turning body 3, the boom 4, the arm 5, the bucket 6, and the like.

[Configuration of Excavator]

Next, the configuration of the excavator 100 according to the present embodiment will be described with reference to FIGS. 2 to 7 in addition to FIG. 1.

Figure 4:
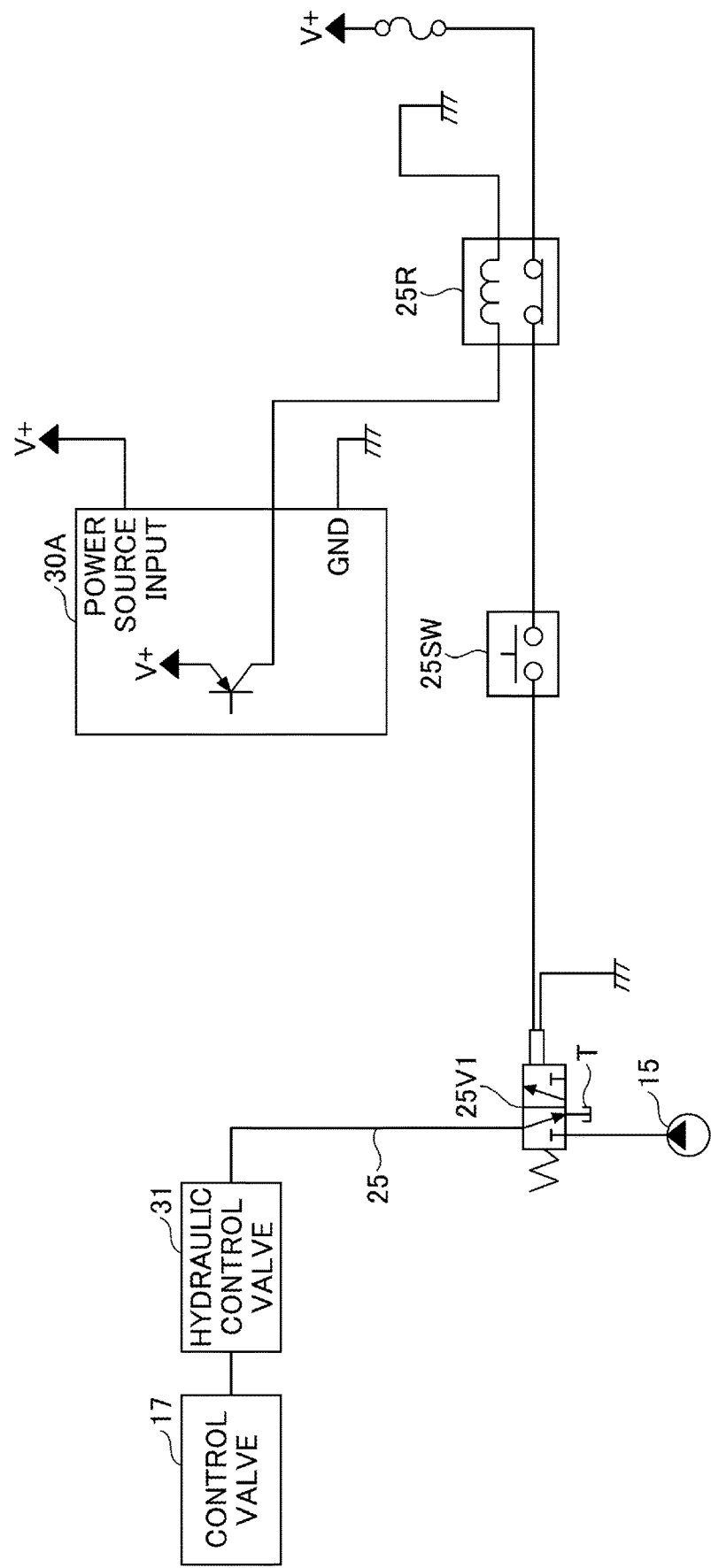
FIG. 4 is a diagram illustrating an example of a configuration related to the operation limitation of a hydraulic driving system.
Figure 5:
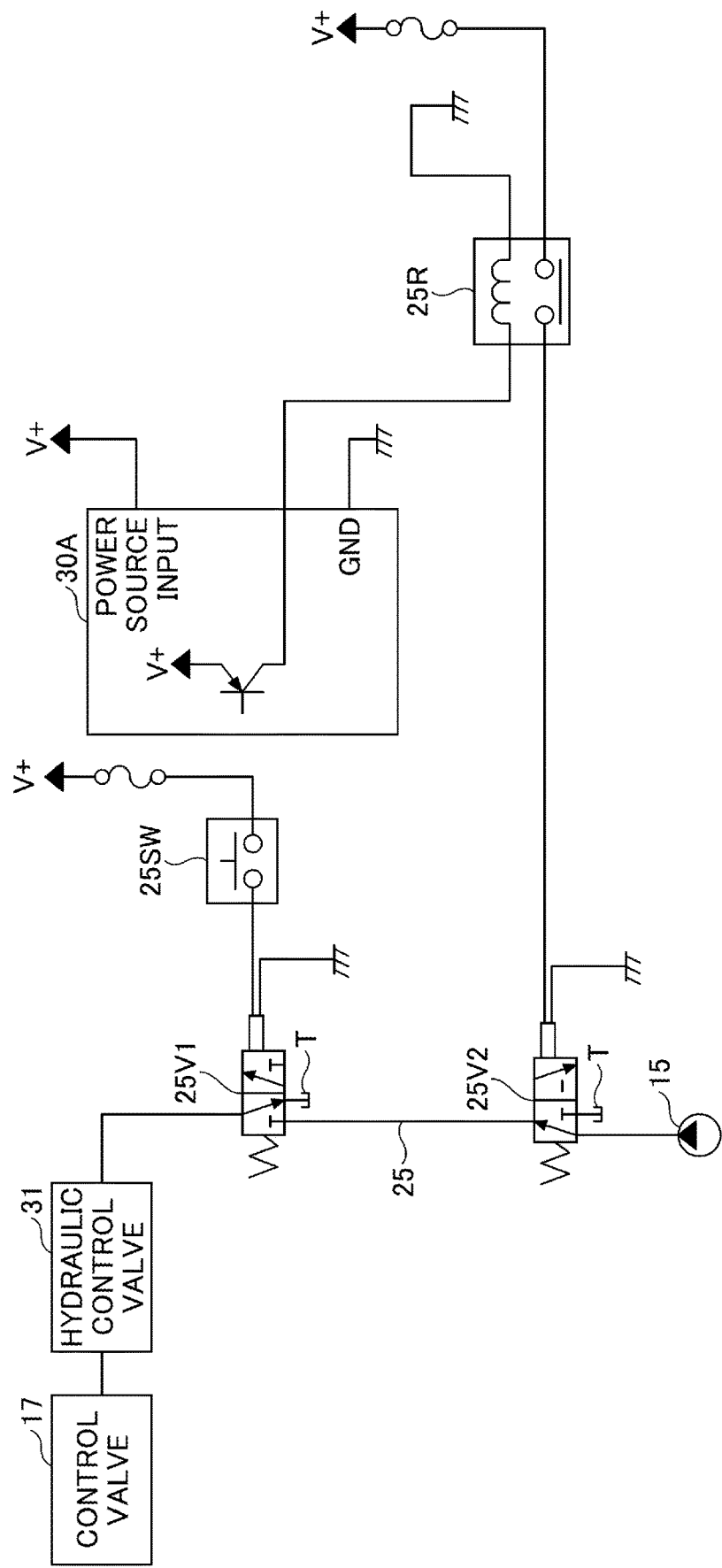
FIG. 5 is a diagram illustrating another example of a configuration related to the operation limitation of the hydraulic control system.
Figure 6:
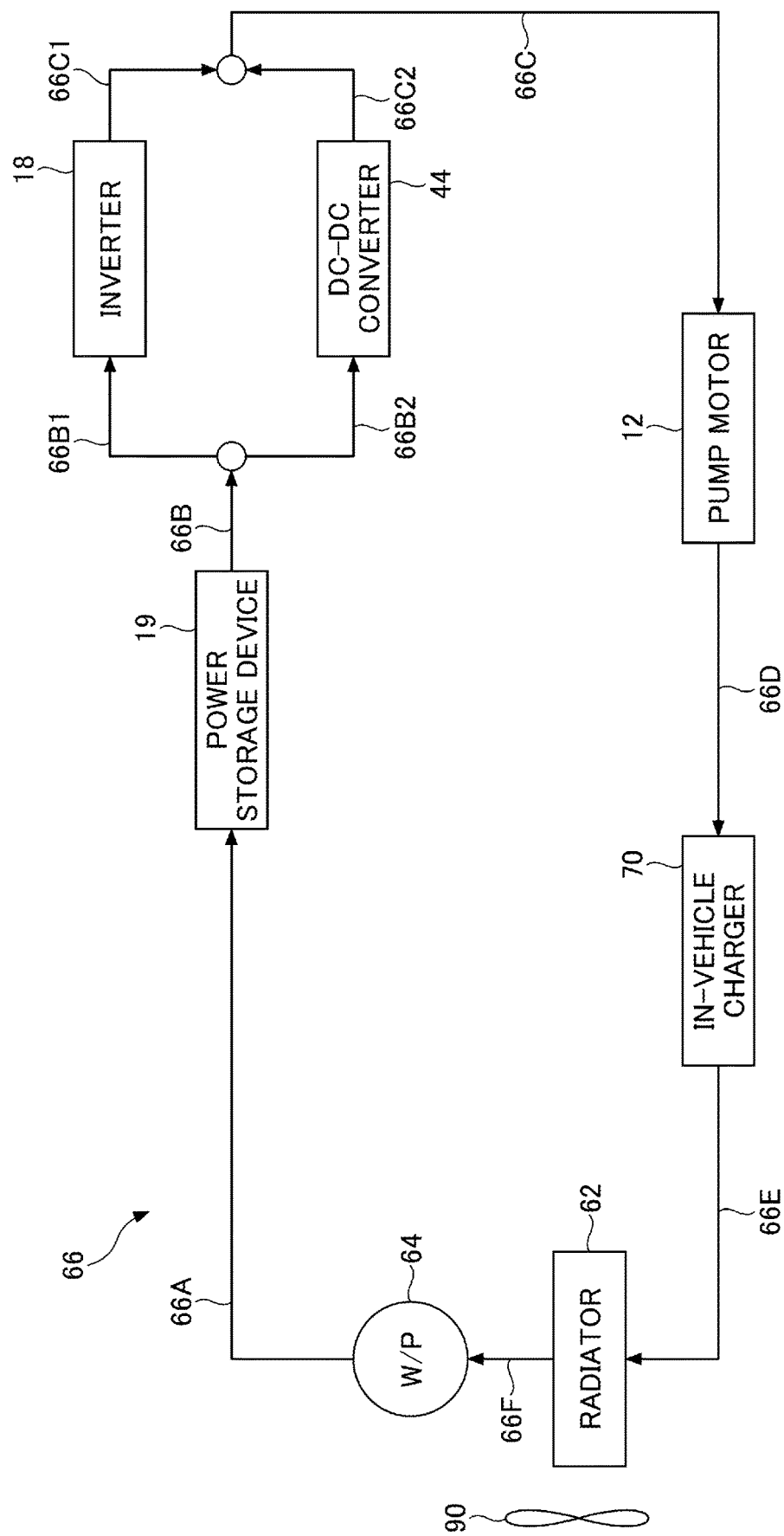
FIG. 6 is a diagram illustrating an example of a configuration of a cooling device.
Figure 7:
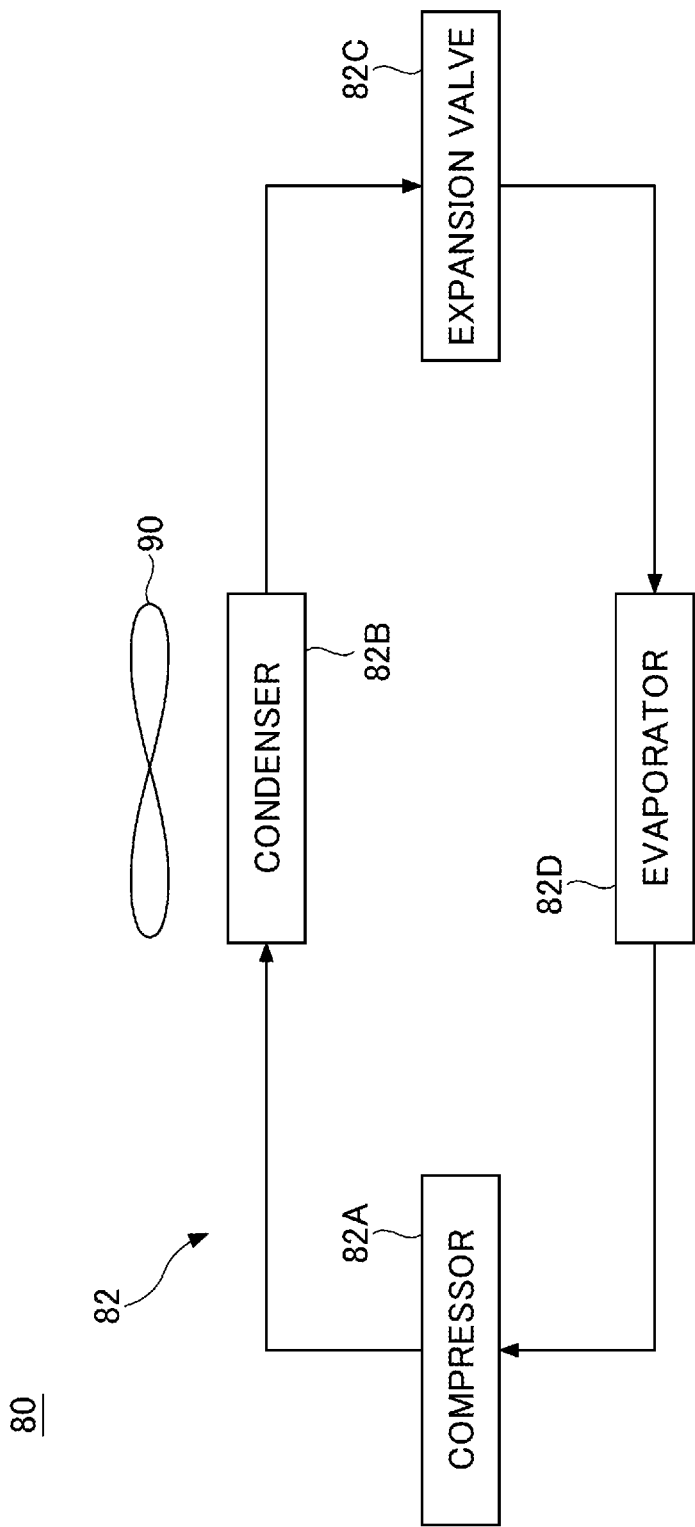
FIG. 7 is a diagram illustrating an example of the heat pump cycle of an air conditioning device.

FIGS. 2 and 3 are block diagrams schematically illustrating one example and another example of the configuration of the excavator 100 according to the present embodiment. FIG. 4 is a diagram illustrating an example of a configuration relating to the operation limitation of the hydraulic driving system. FIG. 5 is a diagram illustrating another example of a configuration relating to the operation limitation of the hydraulic driving system. FIG. 6 is a diagram illustrating an example of a cooling device 60 mounted on an excavator 100 according to the present embodiment. FIG. 7 is a diagram illustrating an example of a heat pump cycle 82 of an air conditioning device 80 mounted on the excavator 100 according to the present embodiment.

In FIGS. 2 and 3, the transmission system of mechanical power is represented by a double line; the transmission system of relatively high hydraulic pressure, that is, the hydraulic oil line of a hydraulic driving system is represented by a thick solid line; the transmission system of pilot pressure, that is, the hydraulic oil line of an operation system is represented by a dashed line; and the transmission system of power and electrical signals is represented by a thin solid line.

The excavator 100 includes elements of each of the hydraulic driving system, the electric driving system, the power source system, the operation system, the cooling system, the user interface system, the comfort equipment system, the control system, and the like.

<Hydraulic Driving System>

The hydraulic driving system of the excavator 100 is a group of elements relating to the hydraulic driving of the driven parts.

The hydraulic driving system of the excavator 100 includes hydraulic actuators such as the traveling hydraulic motors 1A and 1B, a boom cylinder 7, an arm cylinder 8, a bucket cylinder 9, and the like, for hydraulically driving each driven part of the lower traveling body 1, the boom 4, the arm 5, the bucket 6, and the like, respectively. The hydraulic driving system of the excavator 100 also includes a pump motor 12, a main pump 14, and a control valve 17.

The pump motor 12 is a power source for the hydraulic driving system. The pump motor 12 is, for example, an IPM (Interior Permanent Magnet) motor. The pump motor 12 is connected to a power storage device 19 via an inverter 18. The pump motor 12 is powered by three-phase AC power supplied from the power storage device 19 via the inverter 18 to drive the main pump 14 and a pilot pump 15. The drive control of the pump motor 12 may be performed by an inverter 18 under the control of a controller 30B, which will be described later.

The main pump 14 suctions the hydraulic oil from a hydraulic oil tank T and discharges the hydraulic oil to a high pressure hydraulic line 16 to supply the hydraulic oil to the control valve 17 through the high pressure hydraulic line 16. The main pump 14 is driven by the pump motor 12 as described above. The main pump 14 is, for example, a variable capacity hydraulic pump, and a regulator (not illustrated) controls the angle (tilt angle) of the swash plate under the control of a controller 30A, which will be described later. Accordingly, the main pump 14 can adjust the stroke length of the piston and adjust the discharge flow rate (discharge pressure).

The control valve 17 controls the hydraulic driving system in response to an operation instruction corresponding to an operator's operation or an automatic operation function. The control valve 17 is, as described above, connected to the main pump 14 via the high pressure hydraulic line 16 and is configured to selectively supply hydraulic oil supplied from the main pump 14 to a plurality of hydraulic actuators. For example, the control valve 17 is a valve part which includes a plurality of control valves (directional switching valves) for controlling the flow and flow direction of hydraulic oil supplied from the main pump 14 to each of the hydraulic actuators. The hydraulic oil supplied from the main pump 14 and flowing through the control valve 17 or the hydraulic actuator is discharged from the control valve 17 to the hydraulic oil tank T.

<Electric Driving System>

The electric driving system of the excavator 100 is a group of elements relating to the electric driving of the motor (power source) and driven parts of the excavator 100.

As illustrated in FIGS. 2 and 3, the electric driving system of the excavator 100 includes the pump motor 12, a sensor 12*s*, and the inverter 18.

As described above, the electric driving system of the excavator 100 may include an electric actuator for driving the driven part, an inverter for driving the electric actuator, or the like, when some of or all of the driven parts are electrically driven.

The sensor 12*s* includes a current sensor 12*s*1, a voltage sensor 12*s*2, and a rotation state sensor 12*s*3.

The current sensor 12*s*1 detects the current of each of the three phases (U, V, and W phases) of the pump motor 12. The current sensor 12*s*1 is provided, for example, in a power path between the pump motor 12 and the inverter 18. The detection signal corresponding to the current of each of the three phases of the pump motor 12 detected by the current sensor 12*s*1 is taken directly into the inverter 18 through the communication line. The detection signal may also be taken into controller 30B through communication line and input to the inverter 18 via the controller 30B.

The voltage sensor 12*s*2 detects the applied voltage of each of the three phases of the pump motor 12. The voltage sensor 12*s*2 is provided, for example, in the power path between the pump motor 12 and the inverter 18. The detection signal corresponding to the applied voltage of each of the three phases of the pump motor 12 detected by the voltage sensor 12*s*2 is taken directly into the inverter 18 through the communication line. The detection signal may also be taken into the controller 30B through the communication line and input to the inverter 18 via the controller 30B.

The rotation state sensor 12*s*3 detects the rotation state of the pump motor 12. The rotation state of the pump motor 12 includes, for example, a rotation position (rotation angle), a revolution speed, and the like. The rotation state sensor 12*s*3 is, for example, a rotary encoder or a resolver. The detection signal corresponding to the rotation state of the pump motor 12 detected by the rotation state sensor 12*s*3 is taken directly into the inverter 18 through the communication line. The detection signal may also be taken into controller 30B via communication line and input to the inverter 18 via controller 30B.

The inverter 18 drives and controls the pump motor 12 under the control of the controller 30B. The inverter 18 includes, for example, a conversion circuit for converting DC power to three-phase AC power or for converting three-phase AC power to DC power, a driving circuit for switching the conversion circuit, and a control circuit for outputting control signals for defining the operation of the driving circuit. The control signal is, for example, a PWM (Pulse Width Modulation) signal.

The control circuit of the inverter 18 performs drive control of the pump motor 12 while identifying the operation state of the pump motor 12. For example, the control circuit of the inverter 18 identifies the operation state of the pump motor 12 based on the detection signal of the rotation state sensor 12*s*3. The control circuit of the inverter 18 may sequentially identify the operation state of the pump motor 12 by estimating the rotation angle of the rotation axis of the pump motor 12 or the like, based on the detection signal of the current sensor 12*s*1 and the detection signal of the voltage sensor 12*s*2 (or a voltage instruction value generated in the control process).

At least one of the driving circuit or the control circuit of the inverter 18 may be provided outside the inverter 18.

<Power Supply>

The power supply system of the excavator 100 is a group of elements for supplying power to various electrical devices.

As illustrated in FIGS. 2 and 3, the power supply system of the excavator 100 includes the power storage device 19, a DC-DC converter 44, a battery 46, an in-vehicle charger 70, and a charging port 72.

The power storage device 19 is an energy source for driving an actuator of the excavator 100. The power storage device 19 is connected to an external commercial power supply by a predetermined cable (hereinafter referred to as "charging cable"), thereby being charged (power storage), and supplying the charged (stored) power to the pump motor 12. The power storage device 19 is, for example, a lithium ion battery and has a relatively high output voltage (e.g., several hundred volts).

A power converting device may be provided between the power storage device 19 and the pump motor 12 for boosting the output voltage of the power storage device 19 and applying the output voltage to the pump motor 12. As described above, when some of or all of the driven parts are electrically driven, the power of the power storage device 19 is supplied to an electric actuator that electrically drives the driven part instead of or in addition to the pump motor 12.

The DC-DC converter 44 is provided, for example, in the upper turning body 3 to decrease DC power of a very high voltage output from the power storage device 19 to a predetermined voltage (e.g., approximately 24 volts), and output the decreased voltage. The output power of the DC-DC converter 44 is supplied to the battery 46 for charging (power storage) the battery 46, or is supplied to an electric device (hereinafter referred to as "low voltage device") that is powered by the battery 46. The low voltage devices include, for example, various controllers (such as controllers 30A to 30E) included in a control device 30. Examples of the low voltage device are, for example, a water pump 64 (W/P), the air conditioning device 80, a fan 90, and the like, which will be discussed later.

For example, as illustrated in FIG. 2, one DC-DC converter 44 is mounted on the excavator 100.

For example, as illustrated in FIG. 3, the DC-DC converter 44 may include a plurality of DC-DC converters (in this example, two DC-DC converters 44A and 44B) connected in parallel. This allows the plurality of the DC-DC converters 44A and 44B to share the operation of outputting the current required by the low voltage device. As a result, the plurality of the DC-DC converters 44A and 44B will each have a relatively small current capacity, that is, a relatively small maximum value of the output current, and will thus have a relatively small external size. Therefore, it is possible to improve the degree of freedom of arrangement when mounting the DC-DC converters 44A and 44B in the upper turning body 3. Further, even if one of the plurality of the DC-DC converters 44A and 44B is unable to supply power due to an abnormality or the like, the power supply from the other converter can be continued.

Note that the DC-DC converter 44 may be replaced by an alternator. In this case, the alternator may be provided in the upper turning body 3 and generate power by the power of the pump motor 12. As with the DC-DC converter 44, the alternator's generating power is supplied to the battery 46 for charging (power storage) the battery 46, or to the low voltage device such as controllers 30A to 30E.

The battery 46 is provided in the upper turning body 3 and has a relatively low output voltage (e.g., 24 volts). The battery 46 supplies power to low voltage devices, other than those in the electric driving system that require relatively high power. The battery 46 may be, for example, a lead-acid battery or a lithium-ion battery, and may be charged with the output power of the DC-DC converter 44 as described above.

The in-vehicle charger 70 converts single-phase AC power having a relatively low voltage (e.g., 100 volts or 200 volts) supplied from an external power source through a charging port 72A, which will be described later, to DC power, and outputs the power to the power storage device 19 to charge the power storage device 19.

The charging port 72 is provided, for example, on the side surface of the upper turning body 3 or the like, and is connected by inserting the leading end of the charging cable extending from an external power source. The charging port 72 includes charging ports 72A and 72B.

The charging port 72A is configured to be connectable with a charging cable extending from an external power supply (e.g., a commercial power supply) capable of supplying, for example, single-phase AC power of a relatively low voltage. The charging port 72A is connected to the in-vehicle charger 70 by a power line (wire harness) and supplies power supplied from an external power source to the power storage device 19 through the in-vehicle charger 70. This achieves what is referred to as normal charging of the power storage device 19.

The charging port 72B is connected with a charging cable extending from an external power source capable of supplying, for example, DC power of relatively high voltage (e.g., 400 volts). The charging port 72B is connected directly to the power storage device 19 by a power line (wire harness) to directly provide DC power to the power storage device 19 from an external power source. This results in what is referred to as rapid charging of the power storage device 19.

<Operation System>

The operation system of the excavator 100 is a group of elements related to the operation of the driven part.

As illustrated in FIGS. 2 and 3, the operation system of the excavator 100 includes the pilot pump 15, the operation device 26, and a hydraulic control valve 31. As illustrated in FIG. 4, the operation system of the excavator 100 includes a gate lock valve 25V1, a gate lock switch 25SW, and a relay 25R. As illustrated in FIG. 5, the operation system of the excavator 100 may include a switching valve 25V2 in addition to the relay 25R.

The pilot pump 15 supplies pilot pressure to various hydraulic devices (e.g., the hydraulic control valve 31) mounted to the excavator 100 via the pilot line 25. Thus, the hydraulic control valve 31, under the control of the controller 30A, can supply pilot pressure to the control valve 17 according to the operation contents (for example, the operation amount or the operation direction) with respect respect to the operation device 26. Accordingly, the controller 30A and the hydraulic control valve 31 can implement the operation of a driven part (the hydraulic actuator) according to the operation content with respect to the operation device 26 by the operator. The hydraulic control valve 31, under the control of the controller 30A, can supply pilot pressure to the control valve 17 according to the contents of the remote operation specified by the remote operation signal. The hydraulic control valve 31, under the control of the controller 30A, is also capable of supplying pilot pressure to the control valve 17 in accordance with an operation instruction corresponding to an automatic operation function. The pilot pump 15 is, for example, a fixed capacitive hydraulic pump, and is driven by the pump motor 12 as described above.

Note that the pilot pump 15 may be omitted. In this case, the hydraulic devices such as the hydraulic control valve 31 may be supplied with hydraulic oil having pressure reduced to a predetermined pilot pressure, which is discharged from the main pump 14 via a pressure reducing valve or the like.

The operation device 26 is provided within reach of an operator in the operator's seat of the cabin 10 and is used by the operator to operate the respective driven parts (i.e., the left and right crawlers 1C of the lower traveling body 1, the upper turning body 3, the boom 4, the arm 5, the bucket 6, and the like). That is, the operation device 26 is used by the operator to operate actuators (e.g., the traveling hydraulic motors 1A and 1B, the boom cylinder 7, the arm cylinder 8, the bucket cylinder 9, and the like) that drive the respective driven parts. For example, as illustrated in FIGS. 2 and 3, the operation device 26 is electric and outputs an electrical signal (hereinafter, "operation signal") according to the operation contents by the operator. The operation signal output from the operation device 26 is loaded into the controller 30A. Accordingly, the control device 30 including the controller 30A can control the hydraulic control valve 31 or the like to control the operation of the driven part (the actuator) of the excavator 100 in accordance with the operation instructions corresponding to the operation contents of the operator and the automatic operation function.

The operation device 26 includes, for example, levers 26A to 26C. The lever 26A may be configured to receive an operation relating to each of the arm 5 (the arm cylinder 8) and the upper turning body 3 (turning motion), according to the operation in the front-rear direction and the left-right direction, for example. The lever 26B may be configured to receive an operation relating to each of the boom 4 (the boom cylinder 7) and the bucket (the bucket cylinder 9), according to the operation in the front-rear direction and the left-right direction, for example. The lever 26C may be configured to receive an operation relating to the lower traveling body 1 (the crawler 1C), for example.

When the control valve 17 is configured by an electromagnetic pilot-type hydraulic control valve (directional switching valve), the operation signal of the electric operation device 26 may be directly input to the control valve 17, and the respective hydraulic control valves may operate according to the operation contents of the operation device 26. The operation device 26 may be a hydraulic pilot type which outputs pilot pressure according to the operation contents. In this case, the pilot pressure according to the operation is supplied to the control valve 17.

The hydraulic control valve 31 outputs a predetermined pilot pressure by using hydraulic oil supplied from the pilot pump 15 through the pilot line 25, under the control of the controller 30A. The pilot line on the secondary side of the hydraulic control valve 31 is connected to the control valve 17, and the pilot pressure output from the hydraulic control valve 31 is supplied to the control valve 17.

The gate lock valve 25V1 is a switching valve provided on the pilot line 25. The gate lock valve 25V1 is, for example, an electromagnetic solenoid valve. In a non-energized state (the state in FIGS. 4 and 5), the gate lock valve 25V1 maintains the spool in the right-hand position in the drawing by elastic force and sets the pilot line 25 to be in a non-communicating state. In this case, the gate lock valve 25V1 discharges the hydraulic oil of the pilot line 25 on the downstream side to the hydraulic oil tank T. On the other hand, the gate lock valve 25V1, when energized (in an energized state), moves the spool leftward against the elastic force by the function of the electromagnetic solenoid to set the pilot line 25 in a communicating state. In this case, the gate lock valve 25V1 supplies the hydraulic oil of the pilot pump 15 to the downstream side.

The gate lock switch 25SW is provided on a power line between the battery 46 and the gate lock valve 25V1 (electromagnetic solenoid). In the off state, the gate lock switch 25SW opens the power line to set the gate lock valve 25V1 to be in a non-energized state, and in the on state, the gate lock switch 25SW closes the power line to set the gate lock valve 25V1 to be in an energized state.

The gate lock switch 25SW is turned on and off according to the operation state of the gate lock lever inside the cabin 10. The gate lock switch 25SW is, for example, a limit switch that operates in conjunction with the operation of the gate lock lever.

The gate lock switch 25SW is turned off when the gate lock lever is in a state corresponding to a pulled-up state of the gate bar, i.e., in an operation state corresponding to a state in which the operation seat of the cabin 10 is open such that an operator can enter or exit the cabin 10. Thus, when the gate bar is in a raised state, the gate lock valve 25V1 maintains the pilot line 25 in a non-communicating state. Therefore, the gate lock switch 25SW can operate the gate lock valve 25V1 such that pilot pressure is not supplied to the hydraulic control valve 31, in accordance with a situation in which the operator of the cabin 10 has no intention to operate the excavator, a situation in which the operator is absent from the cabin 10, or the like. On the other hand, the gate lock switch 25SW is turned on when the gate bar is lowered, i.e., in an operation state corresponding to a state in which the operation seat of the cabin 10 is closed such that an operator cannot enter or exit the cabin 10. This allows the gate lock switch 25SW to operate the gate lock valve 25V1 such that pilot pressure is supplied to the hydraulic control valve 31, in accordance with a situation in which the operator of the cabin 10 intends to operate the excavator.

The relay 25R is used to cut off the pilot line 25 (to be in a non-communicating state) regardless of the operation state of the gate lock lever, i.e., the state of the gate lock switch 25SW.

For example, as illustrated in FIG. 4, the relay 25R is positioned on a power line between the battery 46 and the gate lock valve 25V1 (electromagnetic solenoid). In this case, the relay 25R is a normally closed type, and is opened when energized by a control current input from the controller 30A. Thus, by energizing the relay 25R and opening the relay 25R, the controller 30A can cause the gate lock valve 25V1 to be in a non-energized state, and cause the pilot line 25 to transition to a non-communicating state, even when the gate lock switch 25SW is on. Therefore, the control device 30 (the controller 30A) can stop the operation of the driven part (hydraulic actuator).

For example, as illustrated in FIG. 5, the relay 25R may be provided on a power line between the battery 46 and the switching valve 25V2 (electromagnetic solenoid). In this case, the relay 25R is a normally open type, and is closed when energized by a control current input from the controller 30A.

The switching valve 25V2 is provided on the pilot line 25. For example, as illustrated in FIG. 5, the switching valve 25V2 may be provided downstream of the gate lock valve 25V1 of the pilot line 25 or upstream of the gate lock valve 25V1. The switching valve 25V2 is, for example, an electromagnetic solenoid valve. Similar to the gate lock valve 25V1, the switching valve 25V2 maintains the spool in the right-hand position in the drawing by elastic force in the non-energized state (the state illustrated in FIG. 5) and causes the pilot line 25 is to be in a communicating state. On the other hand, the switching valve 25V2, when energized, moves the spool leftward against the elastic force, by the function of the electromagnetic solenoid, to cause the pilot line 25 to be in a non-communicating state.

When the coil of the relay 25R is not energized (in a non-energized state), the relay 25R is opened so that the switching valve 25V2 maintains the pilot line 25 in a communicating state. On the other hand, when the coil of the relay 25R is energized by the controller 30A, the relay 25R is closed so that the switching valve 25V2 maintains the pilot line 25 in a non-communicating state. This allows the control device (the controller 30A) to cause the switching valve 25V2 to transition to a non-communicating state even when the gate lock valve 25V1 is in a communicating state. Therefore, the control device (the controller 30A) can stop the operation of the driven part (hydraulic actuator).

The relay 25R and the switching valve 25V2 may be omitted. In this case, the control device 30 may control the pilot pressure output from the hydraulic control valve 31, for example, to limit the operation of the driven part (hydraulic actuator).

<Cooling System>

The cooling system of the excavator 100 is a group of elements for cooling the elements that generate heat in association with the operation of the excavator 100.

As illustrated in FIG. 6, the cooling system of the excavator 100 includes a cooling device 60 and a fan 90.

The cooling device 60 cools the devices of the electric driving system in the excavator 100 and the devices of the power supply system having a relatively high voltage. For example, as illustrated in FIG. 6, the device to be cooled by the cooling device 60 includes the pump motor 12, the inverter 18, the power storage device 19, the DC-DC converter 44, the in-vehicle charger 70, and the like.

Note that, as long as the necessary conditions relating to the cooling performance for each of the plurality of cooling targets are satisfied, the connection mode in a refrigerant circuit 66 of the cooling target may be optional, wherein the refrigerant circuit 66 is configured to allow a refrigerant to pass therearound or therein. That is, as long as the necessary conditions relating to the cooling performance for each of the plurality of cooling targets are satisfied, some of or all of the plurality of cooling targets cooled by the refrigerant circuit 66 may be connected in series or some of or all of the plurality of cooling targets cooled by the refrigerant circuit 66 may be connected in parallel. Further, as long as the necessary conditions relating to the cooling performance for each of the plurality of cooling targets are satisfied, the order in which the plurality of cooling targets are arranged starting from a radiator 62 in the refrigerant circuit 66 is optional.

The cooling device 60 includes the radiator 62, the water pump 64, and the refrigerant circuit 66.

The radiator 62 cools the refrigerant (e.g., cooling water) in the refrigerant circuit 66. Specifically, the radiator 62 allows heat exchange between the ambient air and the refrigerant to cool the refrigerant.

The water pump 64 circulates the refrigerant within the refrigerant circuit 66. The water pump 64 operates, for example, by power supplied from the DC-DC converter 44 or the battery 46.

The refrigerant circuit 66 includes refrigerant flow paths 66A, 66B, 66C, 66C1, 66C2, 66D, 66D1, 66D2, 66E, and 66F.

The refrigerant flow path 66A connects the water pump 64 and the power storage device 19 to allow the refrigerant discharged from the water pump 64 to flow into the refrigerant flow path inside or around the power storage device 19. Thus, the cooling device 60 can cool the power storage device 19 with a refrigerant. The refrigerant flowing through the refrigerant flow path inside or around of the power storage device 19 flows out to the refrigerant flow path 66B.

The refrigerant flow paths 66B, 66B1, and 66B2 connect the power storage device 19 to the inverter 18 and the DC-DC converter 44. The refrigerant flow paths 66B, 66B1, and 66B2 allow refrigerant flowing from the refrigerant flow paths inside or around the power storage device 19 to flow into the refrigerant flow paths inside or around the inverter 18 and the DC-DC converter 44. Specifically, the refrigerant flow path 66B has one end connected to the power storage device 19 and has the other end branching into the refrigerant flow paths 66B1 and 66B2, which are connected to the inverter 18 and the DC-DC converter 44, respectively. The refrigerant flow paths 66B1 and 66B2 allow the refrigerant to flow into the refrigerant flow paths inside or around the inverter 18 and the DC-DC converter 44. This allows the cooling device 60 to cool the inverter 18 and the DC-DC converter 44 with the refrigerant. The refrigerant flowing through the refrigerant flow path inside or around the inverter 18 flows out to the refrigerant flow path 66C1. Further, the refrigerant flowing through the refrigerant flow path inside or around the DC-DC converter 44 flows out to the refrigerant flow path 66C2.

The refrigerant flow paths 66C, 66C1, and 66C2 connect the inverter 18 and the DC-DC converter 44 to the pump motor 12. The refrigerant flow paths 66C, 66C1, and 66C2 allow the refrigerant that flows out of the refrigerant flow paths inside or around the inverter 18 and the DC-DC converter 44 into the refrigerant flow paths inside or around the pump motor 12. Specifically, the refrigerant flow paths 66C1 and 66C2 have one end connected to the inverter 18 and the DC-DC converter 44, respectively, which merge with one end of the refrigerant flow path 66C, and the other end of the refrigerant flow path 66C is connected to the pump motor 12. Thus, the cooling device 60 can cool the pump motor 12 with a refrigerant. The refrigerant flowing through the refrigerant flow path inside or around the pump motor 12 flows out into the refrigerant flow path 66D.

When a power converting device is provided between the power storage device 19 and the pump motor 12, the power converting device may be cooled by the cooling device 60. In this case, for example, in the refrigerant circuit 66, the power converting device may be arranged in parallel with the inverter 18 and the DC-DC converter 44 and cooled by the refrigerant flowing out of the power storage device 19. The DC-DC converter 44 may be air-cooled. In this case, the refrigerant flow paths 66B2 and 66C2 are omitted. At least a portion of the inverter 18 and the DC-DC converter 44 and the like may be arranged in series in the refrigerant circuit 66.

The refrigerant flow path 66D connects the pump motor 12 and the in-vehicle charger 70 and causes the refrigerant flowing from the refrigerant flow path inside or around the pump motor 12 to flow into the refrigerant flow path inside or around the in-vehicle charger 70. Accordingly, the cooling device 60 can cool the in-vehicle charger 70 by using a refrigerant. The refrigerant flowing through the refrigerant flow path inside or around the in-vehicle charger 70 flows out into the refrigerant flow path 66E.

The refrigerant flow path 66E connects the in-vehicle charger 70 and the radiator 62 and supplies the refrigerant flowing out of the refrigerant flow path inside or around the in-vehicle charger 70, to the radiator 62. Accordingly, the refrigerant circuit 66 cools various devices of the electric driving system or the power supply system and cools the refrigerant whose temperature is raised, by the radiator 62. Then, the refrigerant circuit 66 can cause various devices of the electric driving system or the power supply system to return a coolable state again.

The refrigerant flow path 66F connects the radiator 62 and the water pump 64 and supplies the refrigerant cooled by the radiator 62 to the water pump 64. This allows the water pump 64 to discharge the refrigerant cooled by the radiator 62 into the refrigerant flow path 66A and circulate through the refrigerant circuit 66.

The fan 90 operates under the control of the control device 30 (e.g., the controller 30A) and blows air toward a predetermined device (hereinafter referred to as a "heat exchanger") that exchanges heat with air. The fan 90 operates, for example, by power supplied from the DC-DC converter 44 or the battery 46.

The fan 90 may, for example, blow air toward the radiator 62 and cool the radiator 62, as illustrated in FIG. 6. Accordingly, around the radiator 62, air capable of exchanging heat with the refrigerant passing inside the radiator 62, is sequentially supplied, and the degree of cooling of the refrigerant by the radiator 62 can be increased.

The fan 90 may be a single fan or a plurality of fans as described below. That is, the fan 90 may be configured in any number provided that the required degree of heat exchange (degree of cooling or degree of heating) by the heat exchanger can be secured.

The cooling system of the excavator 100 may include an oil cooler for cooling the hydraulic oil used in the hydraulic driving system (high pressure hydraulic line) or the operation system (pilot line). The oil cooler may be provided, for example, in a return oil path between the control valve 17 and the hydraulic oil tank T to perform heat exchange between ambient air and the hydraulic oil flowing therein, to cool the hydraulic oil. In this case, the fan 90 may blow air toward the oil cooler and the oil cooler may be cooled. As a result, the surroundings of the oil cooler is continuously supplied with air which is capable of exchanging heat with the hydraulic oil flowing in the oil cooler, thereby increasing the degree of cooling of the hydraulic oil by the oil cooler. In this case, the same fan 90, i.e., the common fan 90 may serve as the fan 90 for blowing air to the radiator 62 and the fan 90 for blowing air to the oil cooler, or different fans 90 may be used for these purposes.

<User Interface System>

The user interface system of the excavator 100 is a group of elements relating to the exchange of information with the user.

As illustrated in FIGS. 2 and 3, the user interface system includes an output device 50 and an input device 52.

The output device 50 outputs various kinds of information to the user under the control of the control device 30 (e.g., the controller 30A). For example, the output device 50 is provided within the cabin 10 and includes an output device for outputting various kinds of information to a user (e.g., an operator) within the cabin 10. For example, the output device 50 may be provided outside the cabin 10 and include an output device for outputting various kinds of information to a user around the excavator 100 (e.g., a worker or a supervisor around the excavator 100).

The output device 50 includes, for example, a display device, a lighting device, or the like, that outputs (reports) information to the user in a visual manner. The display device may display various information images under the control of controller 30A. The display device may be, for example, a liquid crystal display, an organic electroluminescence display, or the like. The lighting device may be, for example, a warning lamp or the like.

The output device 50 also includes, for example, a sound output device for outputting information in an auditory manner to a user. The sound output device may be, for example, a buzzer or a speaker.

The input device 52 receives various inputs from a user. For example, the input device 52 is provided within the cabin 10 and includes an input device for receiving various inputs from a user (e.g., an operator) within the cabin 10. For example, the input device 52 may be provided outside the cabin 10 and include an input device for receiving various inputs from a user outside the cabin 10 (e.g., a worker or a supervisor around the excavator 100).

The input device 52 may include, for example, an operation input device that receives the user's operation input. The operation input device includes, for example, buttons, toggles, levers, touch panels, touch pads, and the like. The input device 52 may also include, for example, a sound input device for receiving sound inputs from an operator or a gesture input device for receiving gesture inputs from an operator. The sound input device includes, for example, a microphone that acquires the voice sound of a user. The gesture input device includes, for example, a camera capable of capturing a user's gesture. A signal corresponding to an input from an operator received by the input device 52 is loaded into the control device 30 (e.g., the controller 30A).

<Comfort Equipment>

The comfort equipment of the excavator 100 is a group of elements relating to the comfort equipment of the user (operator) within the cabin 10.

As illustrated in FIG. 7, the comfort equipment system of the excavator 100 includes the air conditioning device 80. Further, as illustrated in FIG. 7, the comfort equipment system of the excavator 100 includes the fan 90.

The air conditioning device 80 adjusts the condition of the air in the cabin 10, specifically the temperature and humidity of the air. The air conditioning device 80 operates, for example, by power supplied from the DC-DC converter 44 or the battery 46. The air conditioning device 80 is, for example, a heat pump type for both cooling and heating, and includes a heat pump cycle 82.

The air conditioning device 80 may include, for example, a freezing cycle and a heater for heating, in place of the heat pump cycle 82. A heater for heating includes, for example, a positive temperature coefficient (PTC) heater, a combustion type heater, and the like.

As illustrated in FIG. 7, the heat pump cycle 82 includes a compressor 82A, a condenser 82B, an expansion valve 82C, and an evaporator 82D.

The arrows in FIG. 7 represent the flow of the refrigerant during the cooling operation of the air conditioning device 80, and the flow of the refrigerant during the heating operation of the air conditioning device 80 will be in the reversed direction.

The compressor 82A compresses the refrigerant in the heat pump cycle 82. The compressor 82A includes, for example, an internal motor and an inverter circuit for driving the motor, and is electrically driven by power supplied from the battery 46 or the DC-DC converter 44. The refrigerant compressed by the compressor 82A is delivered to the condenser 82B during the cooling operation of the air conditioning device 80, and is delivered to the evaporator 82D during the heating operation of the air conditioning device 80.

The compressor 82A may be configured to be driven by power supplied directly from the power storage device 19. The compressor 82A may also be configured to be mechanically driven by the pump motor 12.

The condenser 82B is compressed by the compressor 82A during the cooling operation of the air conditioning device 80 to cool the refrigerant having relatively high temperature and an elevated gas state. Specifically, the condenser 82B releases heat of the refrigerant to the outside air by heat exchange between the refrigerant that is passing inside, and the outside air, thereby cooling the refrigerant. The refrigerant cooled by the condenser 82B changes to a liquid state.

In the heating operation of the air conditioning device 80, the condenser 82B draws heat from the outside air by heat exchange between the refrigerant that is passing inside, and the outside air, thereby increasing the temperature of the refrigerant which is depressurized through the expansion valve 82C and lowered to a relatively low temperature.

The expansion valve 82C rapidly reduces the pressure of the refrigerant passing therethrough and lowers the temperature of the refrigerant. The expansion valve 82C rapidly reduces the pressure of the refrigerant that is in a liquid state and a high pressure state, delivered from the condenser 82B during the cooling operation of the air conditioning device 80, thereby lowering the temperature of the refrigerant. The expansion valve 82C rapidly reduces the pressure of the refrigerant that is in a liquid state and a high pressure state, delivered from the evaporator 82D during the heating operation of the air conditioning device 80, thereby lowering the temperature of the refrigerant.

The evaporator 82D exchanges heat between the refrigerant passing inside and the air delivered from the air conditioning device 80 into the cabin 10. The evaporator 82D cools the air delivered into the cabin 10 during the cooling operation of the air conditioning device 80, in a manner such that the refrigerant, which has a relatively low temperature (vapor-liquid mixed state) and which is delivered from the expansion valve 82C, draws the heat from the air. The evaporator 82D heats the air delivered into the cabin 10 during the heating operation of the air conditioning device 80, in a manner such that the air draws heat from the refrigerant, which has a relatively high temperature (gas state) and which is delivered from the compressor 82A.

The fan 90, for example, may blow air toward the condenser 82B to cool or heat the condenser 82B, as illustrated in FIG. 7. Accordingly, the surroundings of the condenser 82B is continuously supplied with air capable of heat exchange with the refrigerant passing inside, thereby increasing the degree of cooling or heating of the refrigerant by the condenser 82B.

<Control System>

The control system of the excavator 100 is a group of elements relating to the various kinds of control with respect to the excavator 100.

As illustrated in FIGS. 2 and 3, the control system of the excavator 100 includes the control device 30. The control system of the excavator 100 also includes a surrounding information acquiring device 40, a sensor 48, and temperature sensors 54 and 56.

The control device 30 includes the controllers 30A to 30E.

The functions of controllers 30B to 30E may be integrated into the controller 30A. That is, the various functions implemented by the control device 30 may be implemented by a single controller or may be distributed among two or more controllers suitably set.

The functions of each of the controllers 30A to 30E may be implemented with any hardware or any combination of hardware and software. For example, the controllers 30A to 30E are each mainly configured by a computer including a CPU (Central Processing Unit), a memory device such as a RAM (Random Access Memory), an auxiliary storage device such as a ROM (Read Only Memory), an interface device functioning as an interface with outside devices, and the like. The controllers 30A to 30E, for example, implement various functions by loading a program installed in an auxiliary storage device into a memory device and executing the program on the CPU.

The controller 30A cooperates with various controllers included in the control device 30 including the controllers 30B to 30E, to perform drive control of the excavator 100.

The controller 30A, for example, outputs a control instruction to the hydraulic control valve 31 in response to an operation signal input from the operation device 26 and outputs pilot pressure from the hydraulic control valve 31 according to the operation contents of the operation device 26. Thus, the controller 30A can implement the operation of the driven part (hydraulic actuator) of the excavator 100 corresponding to the operation contents of the electric operation device 26.

Further, when the excavator 100 is remotely operated, for example, the controller 30A may implement control relating to the remote operation. Specifically, the controller 30A may output a control instruction to the hydraulic control valve 31 and output pilot pressure from the hydraulic control valve 31 according to the contents of the remote operation. Accordingly, the controller 30A can implement the operation of the driven part (hydraulic actuator) of the excavator 100 corresponding to the contents of the remote operation.

The controller 30A may, for example, implement control relating to the automatic operation function. Specifically, the controller 30A may output a control instruction to the hydraulic control valve 31 and apply pilot pressure, in accordance with an operation instruction corresponding to an automatic operation function, from the hydraulic control valve 31 to the control valve 17. Accordingly, the controller 30A can implement the operation of the driven part (the hydraulic actuator) of the excavator 100 corresponding to the automatic operation function.

Further, the controller 30A may control the operation of the entire excavator 100 (various devices mounted in the excavator 100) in an integrated manner based on two-way communication with various controllers such as the controllers 30B to 30E.

The controller 30B implements control relating to the electric driving system based on various kinds of information input from the controller 30A (for example, a control instruction including an operation signal of the operation device 26).

The controller 30B, for example, outputs a control instruction to the inverter 18 and implements drive control of the pump motor 12.

As described above, when a power converting device is provided between the power storage device 19 and the pump motor 12, the controller 30B may, for example, output a control instruction to the power converting device to control the operation of the power converting device.

The controller 30C implements control relating to the surrounding monitoring function of the excavator 100.

The controller 30C detects a predetermined object around the excavator 100 (hereinafter referred to as a "monitored object") and estimates the position of the monitored object based on, for example, data regarding the status of the three-dimensional space around the excavator 100 taken from the surrounding information acquiring device 40. The monitored object may include, for example, a person. The monitored object may also include, for example, other work vehicles or other work machines. The monitored object may also include, for example, a utility pole, a pylon, a fence, a work site material, and the like. Data regarding the status of the three-dimensional space around the excavator 100 includes, for example, detection data regarding an object around the excavator 100 and the position of the object.

The controller 30C, for example, outputs a warning to a user in the cabin 10 and to the surroundings of the excavator 100 through an output device 50 (e.g., a display device, a sound output device, or the like) when the monitored object is detected within a predetermined monitoring range. The monitoring range is suitably set, for example, as a range around the excavator 100 that is a relatively close distance from the excavator 100.

The controller 30C may, for example, limit the operation of a driven part (actuator) of the excavator 100 when the monitored object is detected within a predetermined monitoring range.

Limitations on the operation of driven parts include, for example, stopping the operation of driven parts. The controller 30C may forcibly stop the driven part (hydraulic actuator) by, for example, outputting a request signal to the controller 30A and opening the relay 25R described above. The controller 30C may forcibly stop the operation of the driven part (hydraulic actuator) by outputting a request signal to the controller 30A and disabling the operator's operation or operation instructions.

Further, limitations on the operation of the driven part includes, for example, slowing down of the operation of the driven part. The controller 30C may, for example, output a request signal to the controller 30A, relatively reduce the pilot pressure output from the hydraulic control valve 31 to the control valve 17, and slow down the operation of the driven part (the hydraulic actuator) with respect to the operator's operation and operation instructions.

The controller 30D (an example of a power storage control device) implements control relating to the power storage device 19.

The controller 30D controls, for example, the charging of the power storage device 19.

The controller 30D monitors various states (e.g., the current state, the voltage state, the temperature state, the charge state, the deterioration state, presence or absence of abnormality, and the like) of the power storage device 19 based on the output of various sensors built into the power storage device 19, for example.

The controller 30E implements control relating to the DC-DC converter 44.

The controller 30E implements control relating to, for example, the operation of the DC-DC converter 44.

The controller 30E monitors various states (e.g., the current state, the voltage state, the temperature state, etc.) of the DC-DC converter 44, for example.

The surrounding information acquiring device 40 outputs information concerning the status of the three-dimensional space around the excavator 100. The surrounding information acquiring device 40 may include, for example, an ultrasonic sensor, a millimeter wave radar, a monocular camera, a stereo camera, a depth camera, LIDAR (Light Detection and Ranging), a distance image sensor, an infrared sensor, and the like. The output information of the surrounding information acquiring device 40 is loaded into the controller 30C.

The surrounding monitoring function of the excavator 100 may be omitted. In this case, the controller 30C or the surrounding information acquiring device 40 may be omitted.

The sensor 48 measures the state of the power supplied to the low voltage load from the DC-DC converter 44 and the battery 46. For example, the sensor 48 may include a current sensor that measures the current supplied to the low voltage load from the DC-DC converter 44 or the battery 46 or a voltage sensor that measures the voltage.

The temperature sensor 54 measures (detects) the temperature of the device of the electric driving system to be cooled by the cooling device 60, which will be described later. The temperature sensor 54 includes, for example, a temperature sensor that detects the temperature of the pump motor 12. The temperature sensor 54 also includes a temperature sensor that detects the temperature of the inverter 18. The temperature sensor 54 also includes, for example, a temperature sensor that detects the temperature of the power storage device 19. The temperature sensor 54 also includes, for example, a temperature sensor that detects the temperature of the DC-DC converter 44. The temperature sensor 54 also includes, for example, a temperature sensor that detects the temperature of the in-vehicle charger 70. The detection signal of the temperature sensor 54 is incorporated into the controller 30A, for example. Thus, the controller 30A can identify the temperature state of devices in the electric driving system.

If a power conversion device is provided between the power storage device 19 and the pump motor 12, the temperature sensor may include a temperature sensor for identifying the temperature state of the power conversion device.

The temperature sensor 56 measures (detects) the indoor temperature of the cabin 10. The detection signal from the temperature sensor 56 is incorporated into the controller 30A, for example. Thus, the controller 30A can identify the temperature state in the interior of the cabin 10.

[Arrangement Structure of Various Devices in the Upper Turning Body]

Next, the arrangement structure of various devices in the upper turning body 3 will be described with reference to FIG. 8.

Figure 8:
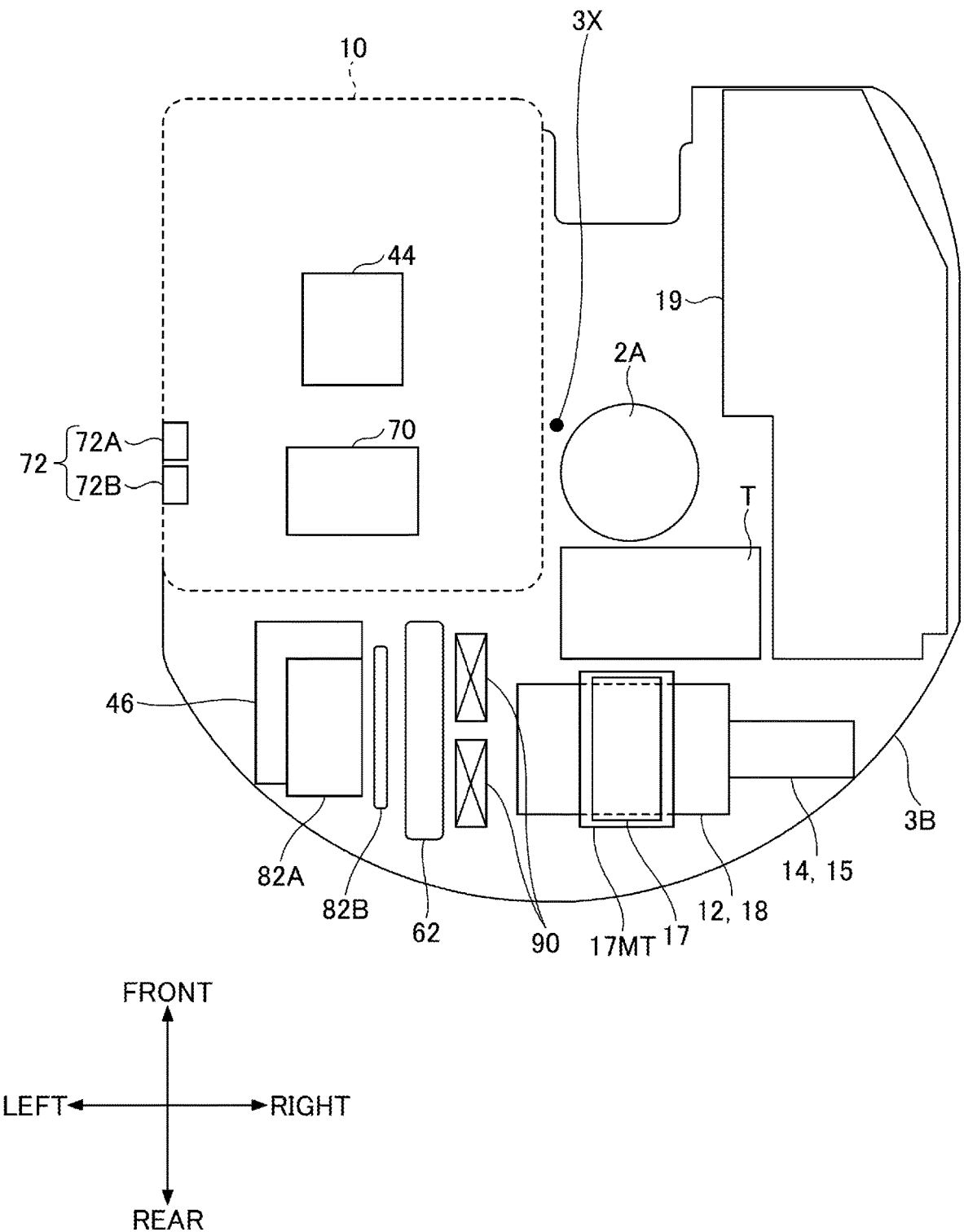
FIG. 8 is a top view illustrating an example of the arrangement configuration of various devices of an upper turning body.
Figure 9:
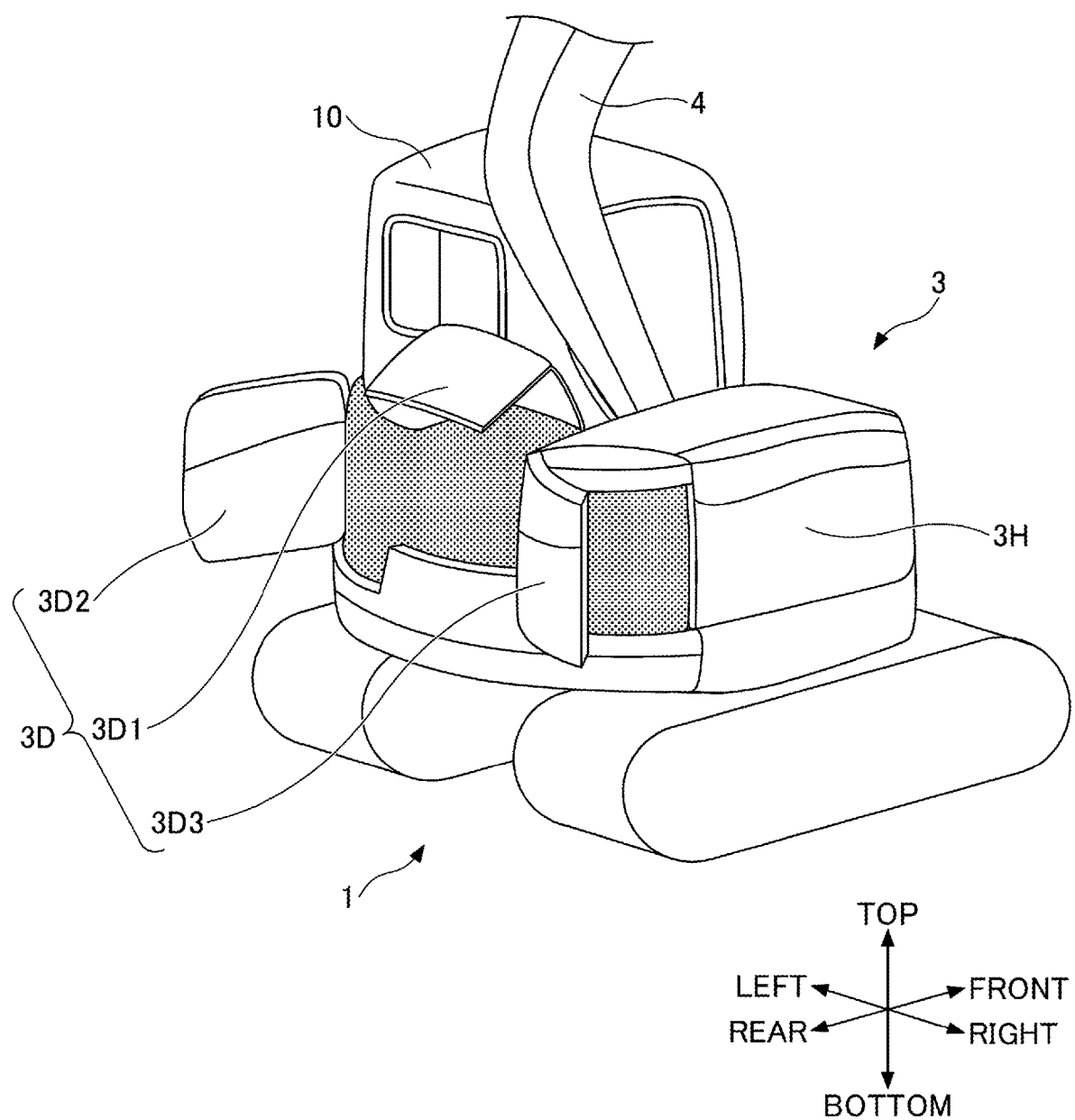
FIG. 9 is a perspective view illustrating an example of a maintenance door of the upper turning body.

FIG. 8 is a top view illustrating an example of the arrangement structure of various devices of the upper turning body 3. FIG. 9 is a perspective view illustrating an example of a maintenance door 3D of the upper turning body 3. In FIG. 8, a house portion 3H of the upper turning body 3 (see FIG. 9) is omitted to expose various devices of the upper turning body 3.

As illustrated in FIG. 8, in this example, the power storage device 19 is mounted in a range extending from the front portion to the center portion in the front-rear direction on the right side of the upper turning body 3.

The pump motor 12, the main pump 14, the pilot pump 15, the control valve 17, and the inverter 18 are provided in a range extending from the center portion to the right end portion in the left-right direction at the rear portion of the upper turning body 3.

The pump motor 12 and the inverter 18 are arranged integrally at the center portion in the left-right direction at the rear portion of the upper turning body 3. The pump motor 12 and inverter 18 are also arranged in a manner that the pump motor 12 has the axis of rotation thereof aligned with the left-right direction and has the output axis thereof extending to the right. For example, the pump motor 12 is mounted to the bottom portion 3B (turning frame) of the upper turning body 3 via a mount member. Specifically, the pump motor 12 may be positioned in relative proximity to the bottom portion 3B such that the positions of the main pump 14 and the pilot pump 15, which are coupled in a manner as to be machine-driven, are as low as possible. This allows the position of the main pump 14 to be positioned lower than the liquid level inside the hydraulic oil tank T. Therefore, it is possible to reduce the occurrence of air entrainment in the main pump 14.

The main pump 14 and the pilot pump 15 are positioned adjacent the right side of the pump motor 12 in a manner such that the input shaft thereof is coupled to the output shaft of the pump motor 12. The main pump 14 and the pilot pump 15 are mounted on the bottom portion 3B via the pump motor 12, for example, by being coupled to the pump motor 12.

The control valve 17 is arranged at the center portion in the left-right direction at the rear portion of the upper turning body 3 and above the pump motor 12. For example, the pump motor 12 and the main pump 14 are positioned at a relatively low position in the space between the bottom portion 3B and the house portion 3H of the upper turning body 3, and the control valve 17 is positioned at a relatively high position in that space. Specifically, a stand 17MT which is provided so as to straddle the pump motor 12 in the front-rear direction, is mounted to the bottom portion 3B. The control valve 17 is mounted on the stand 17MT, and is mounted to the bottom portion 3B via the stand 17MT.

Note that the control valve 17 may be arranged on the main pump 14 or the pilot pump. The control valve 17 may also be positioned in the left-right direction so as to straddle between the pump motor 12 and the main pump 14 or the pilot pump 15.

The turning hydraulic motor 2A is mounted at the center of the upper turning body 3.

The hydraulic oil tank T is arranged in the space between the turning hydraulic motor 2A and the pump motor 12 and the control valve 17 in the front-rear direction. The hydraulic oil tank T is mounted to the bottom portion 3B, either directly or via a bracket or the like.

The radiator 62, the condenser 82B, and the fan 90 are arranged on the left side of the rear of the upper turning body 3, i.e., to the left of the pump motor 12, the main pump 14, and the control valve 17.

The radiator 62 is arranged so that the front-rear direction is substantially in the longitudinal direction (the width direction) and the left-right direction is substantially in the shorter direction (the thickness direction), while standing substantially perpendicular with respect to the bottom portion 3B. The term "substantially" is used with the intension, for example, to allow manufacturing errors in the excavator 100 or the device mounted in the excavator 100. The term "substantially" is used in the same manner in the following. Thus, the radiator 62 can perform heat exchange by introducing air between the fins of the core and passing air in the left-right direction (the shorter direction). The radiator 62 is attached to the bottom portion 3B, for example, via a mount member.

The condenser 82B is positioned adjacent to the left side of the radiator 62. The condenser 82B is arranged in series with the radiator 62 with respect to the air flow. That is, similar to the radiator 62, the condenser 82B is arranged so that the front-rear direction is substantially in the longitudinal direction (the width direction) and the left-right direction is in the shorter direction (the thickness direction), while standing substantially perpendicular with respect to the bottom portion 3B. The condenser 82B is mounted on the bottom portion 3B via the radiator 62, for example, by being attached to the radiator 62, either directly or via a bracket or the like.

Note that other heat exchangers may be arranged adjacent the radiator 62 and the condenser 82B. For example, an oil cooler may be arranged adjacent to the left side of the radiator 62 and at the top or bottom of the condenser 82B. This is because the vertical dimension of the condenser 82B is typically somewhat smaller than the radiator 62.

The fan 90 is positioned adjacent to the right side of the radiator 62. The fan 90 is mounted to the bottom portion 3B via the radiator 62, for example, by being attached to the radiator 62 via a resin fan shroud. The fan 90 is arranged, for example, in two rows in the longitudinal direction (the front-rear direction) of the radiator 62 and in two stages in the height direction (vertical direction). The fan 90 sucks air from the radiator 62 side (left side) toward the right side, and blows air to the radiator 62, the condenser 82B, and the like.

The fan 90 may be positioned adjacent to the left side of the condenser 82B, the radiator 62, and the like. In this case, the fan 90 blows air to the radiator 62, the condenser 82B, and the like, by pushing out the air from the left side to the side of the condenser 82B and the radiator 62 (right side).

The battery 46 and the compressor 82A are arranged at the left end at the rear portion of the upper turning body 3, i.e., to the left of the radiator 62, the condenser 82B, and the fan 90.

The battery 46 is attached to the bottom portion 3B, for example, via a bracket.

The compressor 82A is positioned above the battery 46, for example, by being mounted on a stand that is standing from the bottom portion 3B.

A charging port 72 is provided on the side surface of the cabin 10 of the upper turning body 3. Charging ports 72A and 72B are arranged, for example, one behind the other. Also arranged within the cabin 10 are the DC-DC converter 44 and the in-vehicle charger 70.

For example, as illustrated in FIG. 9, a maintenance door 3D is provided at the rear portion of the upper turning body 3 (the house portion 3H).

In this example, as described above, the relatively large power storage device 19 is arranged on the right front portion of the upper turning body 3, and a group of elements having a relatively small size is aggregated at the rear portion of the upper turning body 3. Therefore, the worker can easily access this group of elements via the maintenance door 3D.

The maintenance door 3D includes maintenance doors 3D1 to 3D3.

The maintenance door 3D1 is provided in the center portion in the left-right direction at the rear portion of the house portion 3H and can be opened upwardly with the axis in the left-right direction of the upper surface of the house portion 3H as a fulcrum. Thus, the worker can access the pump motor 12, the control valve 17, the inverter 18, the hydraulic oil tank T, and the like, by opening the maintenance door 3D1 and perform various maintenance operations. In particular, the worker can easily perform maintenance of a hydraulic device such as oil filters of the hydraulic oil tank T, for which maintenance is relatively highly necessary and frequent.

The maintenance door 3D2 is provided on the side surface on the left end at the rear portion of the house portion 3H, and can be opened leftward with the vertical axis of the side surface of the house portion 3H as a fulcrum. This allows the worker to access the battery 46, the compressor 82A, the condenser 82B, the radiator 62, and the like by opening the maintenance door 3D2, and perform various maintenance operations.

The maintenance door 3D3 is provided on the side surface on the right end of at the rear portion of the house portion 3H and can be opened leftward with the vertical axis of the side surface of the house portion 3H as a fulcrum. Accordingly, the worker can access the main pump 14, the pilot pump 15, or nearby elements by opening the maintenance door 3D3 and perform various maintenance operations. In particular, the worker can easily perform maintenance of the filters positioned near the main pump 14, for which the necessity and frequency of maintenance are relatively high.

In this example, the rear portion of the upper turning body 3 is configured to have a substantially circular arc shape about the center of a turning center (axis center) 3X in a top view. Accordingly, the turning radius of the rear portion of the upper turning body 3 can be relatively small. The turning radius of the rear portion of the upper turning body 3 means the radius centered around the turning center 3X of the trajectory (outer edge) drawn by the rear portion of the upper turning body 3 when the upper turning body 3 turns. The excavator 100 corresponds to, for example, a rear ultra-small turning radius excavator. A rear ultra-small turning radius excavator means an excavator in which the ratio of the turning radius of the rear portion of the upper turning body 3 is less than or equal to 120 percent with respect to half (½) the full width of the crawler 1C. This allows the excavator 100 to improve workability in a small and narrow worksite.

On the other hand, in the case of the rear ultra-small turning radius excavator, the space of the rear portion of the upper turning body 3, particularly the spaces at the left and right end portions, are reduced, and is relatively small. Further, motorization tends to proceed mainly with small machines, and, therefore, even when the excavator 100 is not a rear ultra-small turning radius excavator, in the electrically operated excavator 100, the space at the rear portion of the upper turning body 3 is limited and tends to be relatively small. Therefore, if a relatively large element is placed at the rear portion of the upper turning body 3, dead space may be increased and it may not be possible to achieve an efficient element arrangement structure.

In contrast, in this example, the power storage device 19, which is one of the largest elements mounted on the upper turning body 3, is arranged at the right front portion of the upper turning body 3. The pump motor 12 and the main pump 14 are mounted at the rear portion of the upper turning body 3.

Therefore, in the excavator 100, the pump motor 12, the main pump 14, and the like having a relatively small size are arranged at the rear portion of the upper turning body 3, so that the dead space can be relatively reduced. Then, the excavator 100 can secure a relatively large arrangement space for the power storage device 19 along the right side surface of the upper turning body 3, where the change in the horizontal position is relatively small across the front-rear direction from the top view. Therefore, the excavator 100 can achieve an efficient element arrangement structure in the upper turning body 3 including the power storage device 19.

In this example, the excavator 100 may be a rear ultra-small turning radius excavator in which the ratio of the turning radius of the rear portion of the upper turning body 3 is less than or equal to 120 percent with respect to half (½) the full width of the lower traveling body 1. Specifically, the upper turning body 3 may have a rear shape that is a substantially circular arc shape based on the turning center 3X in the upper view.

Accordingly, the excavator 100 can achieve a relatively small turning radius at the rear portion of the upper turning body 3 by an efficient arrangement structure including the power storage device 19. Thus, the excavator 100 can improve the work efficiency in a small and narrow worksite.

Also in this example, the control valve 17 is arranged on at least one of the main pump 14 and the pump motor 12.

Thus, the excavator 100 can secure the space above the main pump 14 or the pump motor 12 having a relatively small height dimension, as a space for arranging of the control valve 17. Further, in the excavator 100, the control valve 17 supplied from the main pump 14 is positioned relatively close to the main pump 14, thereby allowing the piping of the hydraulic oil to be relatively short. Therefore, the excavator 100 can achieve a more efficient arrangement structure of the elements in the upper turning body 3.

Also, in this example, the main pump 14 may be arranged below the liquid level of the hydraulic oil in the hydraulic oil tank T.

Thus, the excavator 100 can reduce the occurrence of air entrainment in the main pump 14.

Also, in this example, the power storage device 19 may be arranged in a range from the right front portion of the upper turning body 3 to the right center portion in the horizontal direction of the upper turning body 3. The main pump 14 may be located behind the power storage device 19. The pump motor 12 may be positioned to the left of the main pump 14 so that the main pump 14 can be mechanically driven.

Accordingly, the excavator 100 can secure a relatively large capacity of the power storage device 19 while the main pump 14 having a relatively small size is arranged behind the power storage device 19. Therefore, it is possible to reduce the dimension in the front-rear direction in the right corner (right end) at the rear portion of the upper turning body 3. Therefore, the excavator 100 can both secure the capacity of the power storage device 19 and reduce the turning radius of the rear portion of the upper turning body 3.

In this example, the hydraulic oil tank T may be positioned in front of the pump motor 12 and to the left of the power storage device 19.

Thus, the hydraulic oil tank T can be specifically arranged and the capacity thereof can be secured by using the space at the front of the pump motor 12 and the power storage device 19.

Also, in this example, the radiator 62 may be positioned to the left of the pump motor 12.

Thus, the radiator 62 can be specifically arranged using the space on the left side at the rear portion of the upper turning body 3.

In this example, the rear portion of the house portion 3H in the upper turning body 3 may be provided with the maintenance door 3D by which the elements mounted in the upper turning body 3 can be accessed.

This allows the worker to easily access a group of relatively small elements relative to the power storage device 19, that are aggregated and arranged at the rear portion of the upper turning body 3 as described above.

[Details of Power Storage Device]

Next, the details of the power storage device 19 will be described with reference to FIGS. 10 to 13.

Figure 10:
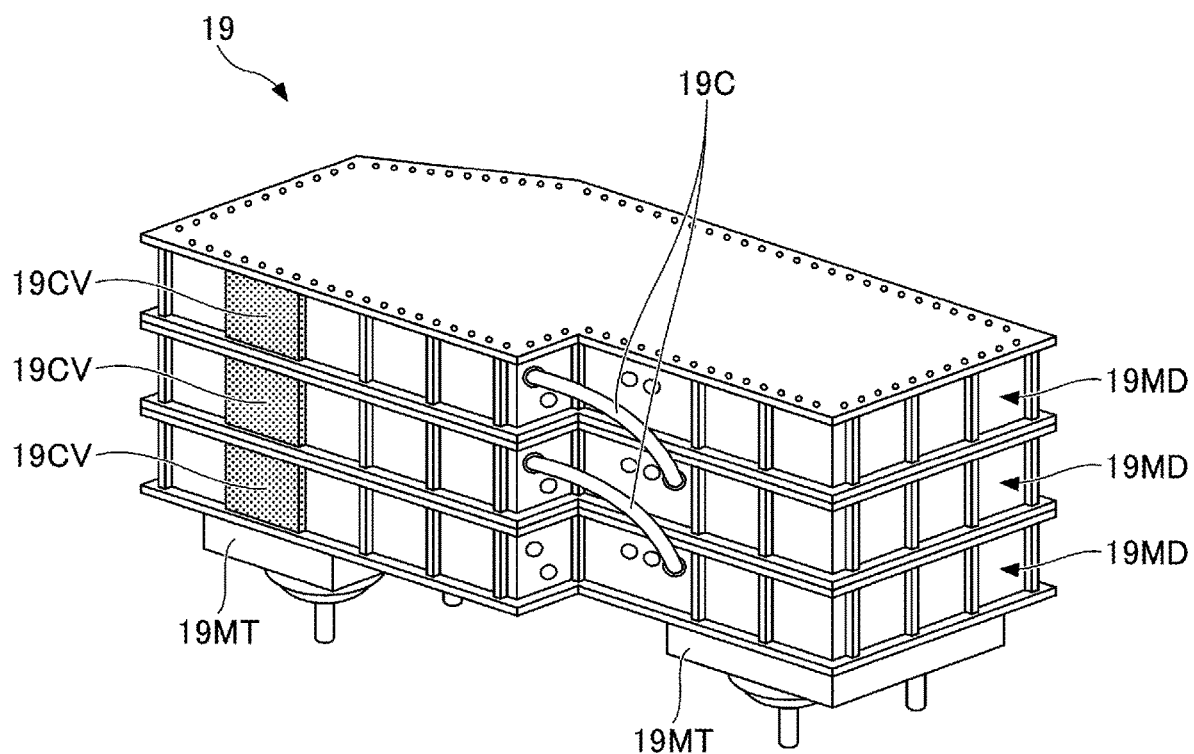
FIG. 10 is a perspective view illustrating an example of a power storage device.
Figure 11:
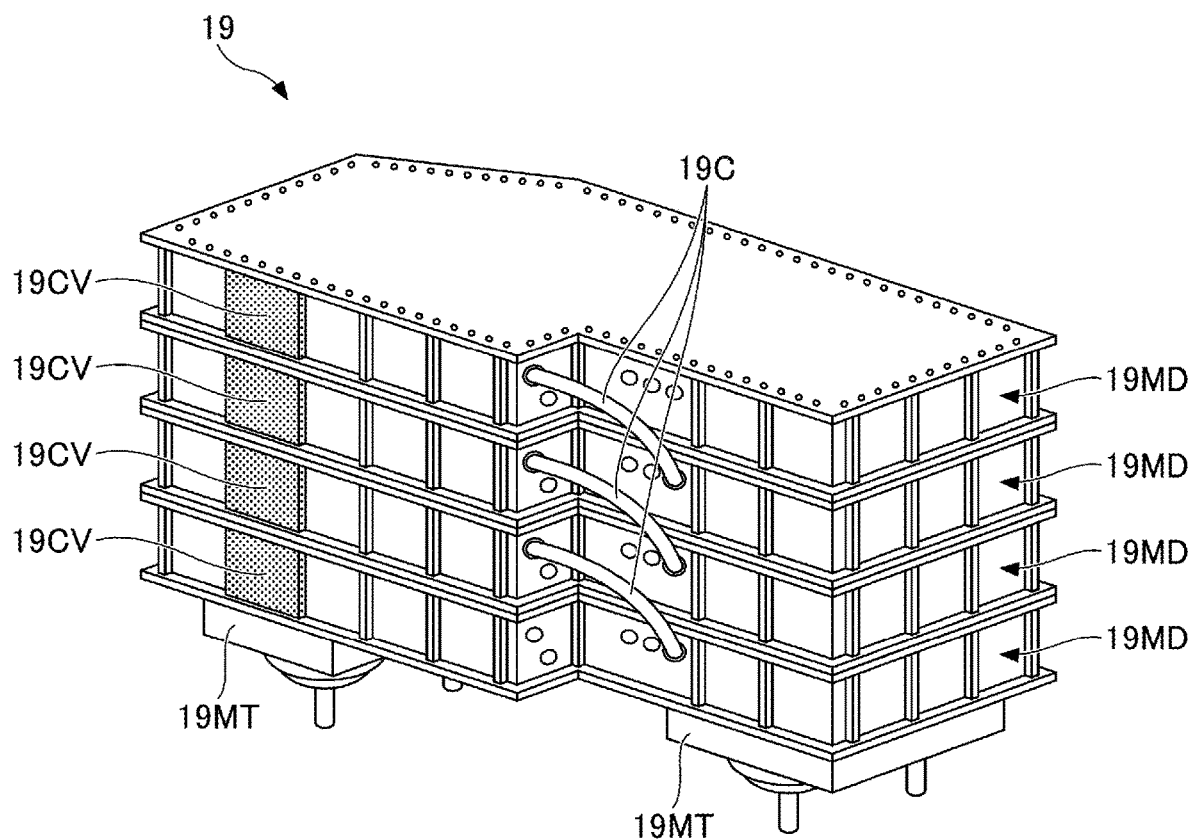
FIG. 11 is a perspective view illustrating another example of the power storage device.
Figure 12:
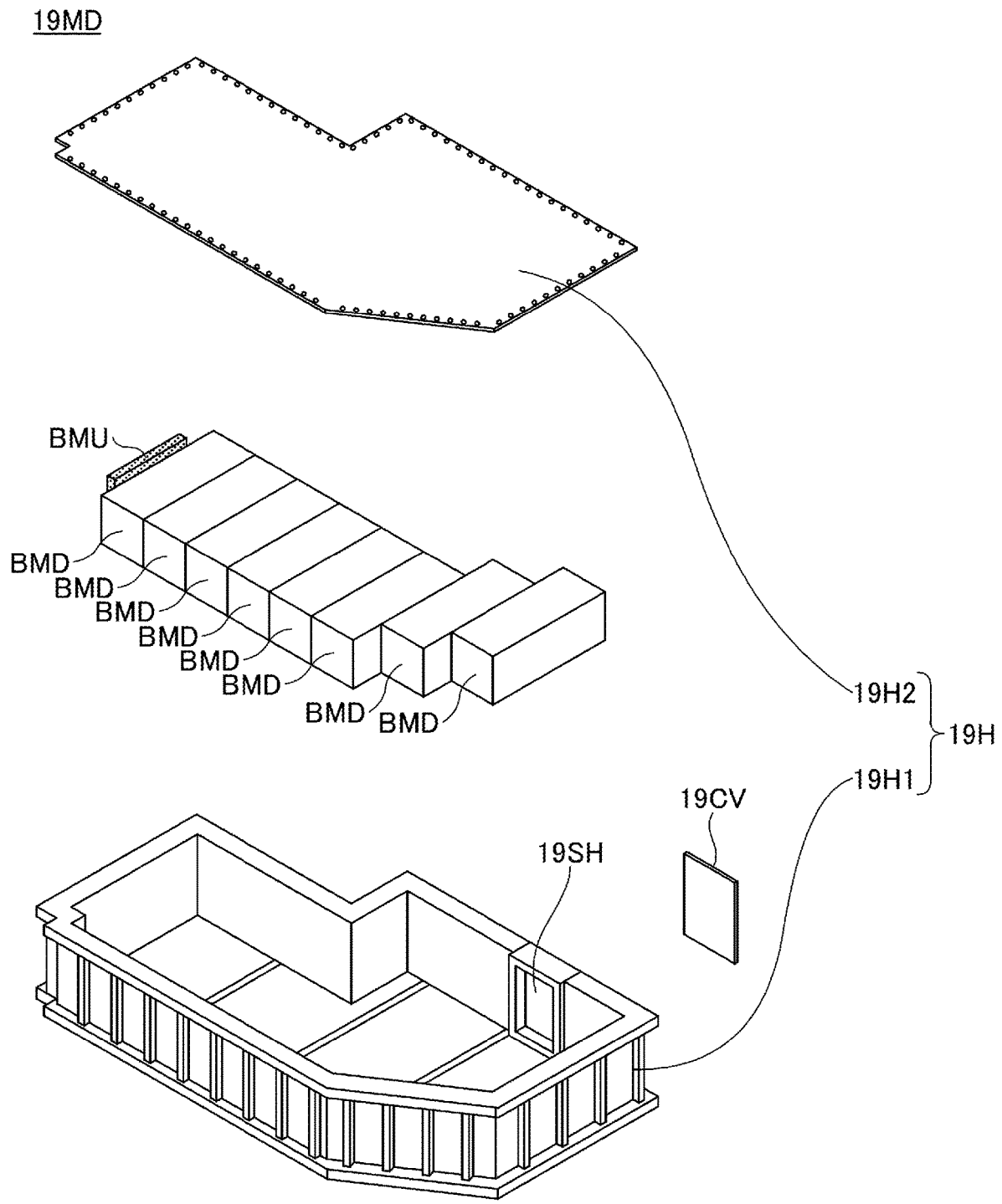
FIG. 12 is an exploded view illustrating an example of a configuration of the power storage module.
Figure 13:
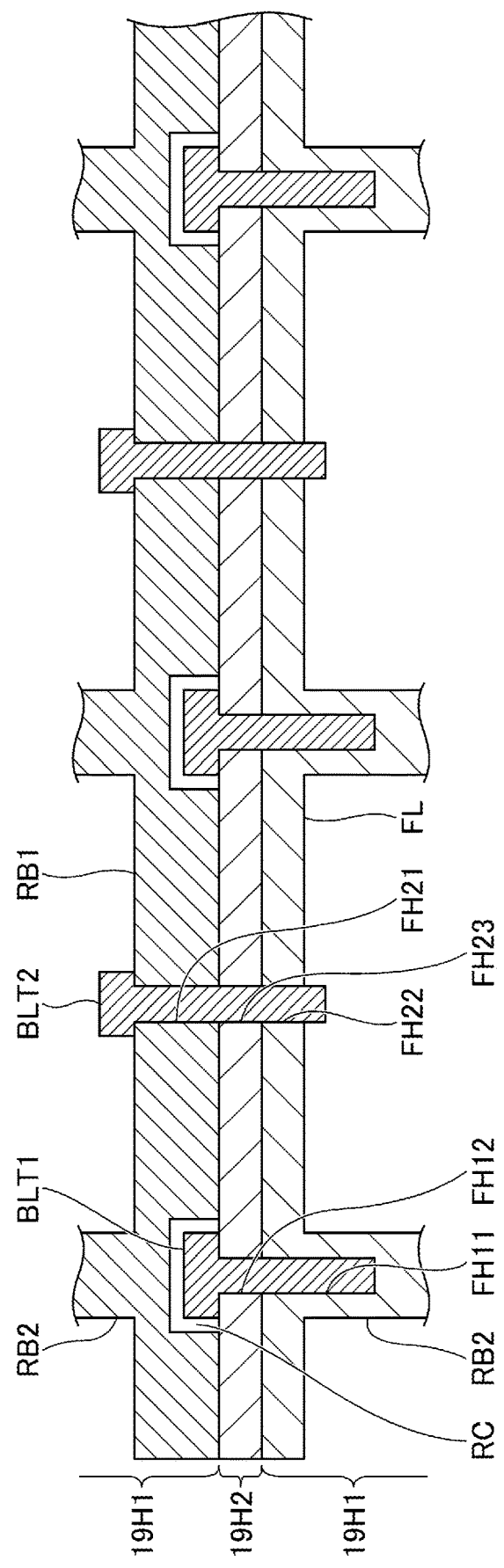
FIG. 13 is a cross-sectional view illustrating an example of a coupling configuration between power storage modules.

FIGS. 10 and 11 are perspective views illustrating an example and another example of a power storage device. FIG. 12 is an exploded view illustrating an example of a configuration of a power storage module 19MD. FIG. 13 illustrates an example of a coupling structure between the power storage modules.

As illustrated in FIGS. 10 and 11, the power storage device 19 is configured by a plurality of the power storage modules 19MD stacked in the vertical direction, and adjacent power storage modules in the vertical direction are connected to each other by a wire harness 19C. In this example, a plurality of the power storage modules 19MD are connected in series, and adjacent power storage modules 19MD in the vertical direction have a positive terminal of one of the power storage modules 19MD connected to a negative terminal of the other power storage modules 19MD by one wire harness 19C.

Note that in a case where at least some of the plurality of power storage modules 19MD are connected in parallel, the power storage modules 19MD adjacent in the vertical direction, which are to be connected in parallel, may be connected by two wire harnesses 19C connecting the positive terminals of these two modules and connecting the negative terminals of these two modules, respectively.

The power storage device 19 is mounted to the bottom portion 3B (turning frame) of the upper turning body 3 via a mount member 19MT mounted to the power storage module 19MD at the lowest layer.

As illustrated in FIG. 12, the power storage module 19MD includes a plurality (eight in this example) of battery modules BMD, a battery management part 19MU, a housing 19H, a service plug installing part 19SH, and a cover 19CV.

The battery module BMD (an example of a power storage part) is an assembly configured by a plurality of battery cells connected in series.

The battery management part BMU communicates with various sensors built into the power storage module 19MD, acquires the detection data sequentially, communicates with the controller 30D of a higher level, and transmits the detection data to the controller 30D. Various sensors are voltage sensors, current sensors, temperature sensors, and the like. This allows the controller 30D to monitor the state of the battery module BMD and the state of each battery cell included in the battery module BMD.

The housing 19H houses elements of the power storage module 19MD, such as a plurality of the battery modules BMD and the battery management part BMU. The housing 19H is made of a metal such as, for example, an aluminum alloy or iron. The housing 19H includes the accommodating part 19H1 for housing elements and a lid 19H2 for sealing an opening in the upper portion of the accommodating part 19H1. The lid 19H2 is fastened in a vertical direction by bolts BLT1 (see FIG. 13) to a flange FL (see FIG. 13) provided on the outer edge of the opening of the accommodating part 19H1.

The plurality of power storage modules 19MD each have the housing 19H in substantially the same shape. Accordingly, the plurality of power storage modules 19MD can be easily stacked in a vertical direction because the shape is substantially the same in a top view.

Note that the housing 19H of the plurality of power storage modules 19MD is substantially the same in the basic shape manufactured by forging or casting, and there may be some difference in the additional processing. For example, the power storage module 19MD at lowest layer among the plurality of power storage modules 19MD may be specially machined for coupling to the mount member 19MT. The housing 19H of some of the plurality of power storage modules 19MD may be specially machined to mount a bracket for supporting other elements when mounted on the upper turning body 3.

The service plug installing part 19SH (an example of a hole) is a hole for installing a service plug to cut off the electrical connection of the plurality of battery modules BMD included in the power storage module 19MD. The service plug installing part 19SH is provided on the side surface of the housing 19H (the accommodating part 19H1). Thus, as illustrated in FIGS. 10 and 11, in a state of mounting the plurality of power storage modules 19MD stacked in a vertical direction on the upper turning body 3, the worker can access the service plugs of each power storage module 19MD by simply removing the cover 19CV.

The sealing structure of the housing 19H is achieved when a service plug is mounted (for example, fitted) to the service plug installing part 19SH.

The cover 19CV is detachably mounted on the side surface of the housing 19H (the accommodating part 19H1) so as to cover the service plug installing part 19SH, i.e., the service plug. This allows the cover 19CV to protect the service plug. The cover 19CV has a structure such that the cover 19CV cannot be mounted to the housing 19H (the accommodating part 19H1) when the service plug is not mounted completely to the service plug installing part 19SH (for example, in a semi-fitting state). This prevents the case in which the cover 19CV is closed when the service plug is not mounted properly due to human error.

The plurality of power storage modules 19MD may also be equipped with relevant devices of the power storage device 19 distributed among the plurality of power storage modules 19MD. Relevant devices include, for example, the controller 30D and a junction box. A junction box (an example of a power relay device) performs relay of power between the power storage device 19 and a plurality of other devices (e.g., the inverter 18, the DC-DC converter 44, the in-vehicle charger 70, the charging port 72B, and the like). For example, the controller 30D may be housed within the housing 19H of any one of a plurality of the power storage modules 19MD, and a junction box may be housed within the housing 19H of another one of the power storage modules 19MD. This allows for the free space in each of the plurality of power storage modules 19MD to be used for housing the relevant devices of the power storage device 19.

As illustrated in FIG. 13, the housings 19H of the power storage modules 19MD adjacent in the vertical direction are directly coupled in the vertical direction.

The lower end of the side surface of the accommodating part 19H1 is provided with a rib RB1 which circulates so as to extend along the outer edge in a top view. Ribs RB2 are provided at predetermined intervals along the outer edge in a top view, in a range of a height direction between the rib RB1 at the lower end and the flange FL at the top end of the side surface of the accommodating part 19H1.

A fastening hole FH11 is provided at a point where the rib RB2 in the flange FL of the accommodating part 19H1 is connected, and a fastening hole FH12 is provided at a corresponding point of the lid 19H2 in a top view. Accordingly, in a state where the positions of the fastening holes FH11 and FH12 are aligned, the bolts BLT1 (an example of the first bolt) is inserted into and fastened to the fastening holes FH11 and FH12, such that the lid 19H2 can be mounted to the accommodating part 19H1, and the accommodating part 19H1 can be sealed by the lid 19H2.

A seal member is provided between the back surface of the lid 19H2 and the flange FL of the accommodating part 19H1 to ensure sealing.

A recess RC is provided on the lower surface of the rib RB1 of the accommodating part 19H1. The number of the recesses RC arranged are the same as the number of the bolts BLT1, to house the head of the bolt BLT1 when the housing 19H (the accommodating part 19H1) is stacked on the housing 19H (the lid 19H2) of the adjacent power storage module 19MD below. This allows the head of the bolt BLT1 on the upper surface of the housing 19H of the lower power storage module 19MD to not come into contact with the lower surface of the housing 19H (the accommodating part 19H1) of the upper power storage module 19MD when the power storage modules 19MD are stacked in the vertical direction. Accordingly, it is possible to prevent the bolt BLT1 from being damaged or prevent the dimension of the power storage device 19 in the height direction from being increased by the length of the head of the bolt BLT1.

The rib RB1 of the accommodating part 19H1 is provided with a plurality of fastening holes FH21 which penetrate from the top surface to the bottom surface of the rib RB1. The plurality of fastening holes FH21 are positioned between two adjacent ribs RB2 at the outer edge of the accommodating part 19H1 in a top view.

The flange FL of the accommodating part 19H1 is provided with a plurality of fastening holes FH22 which penetrate from the top surface to the bottom surface of the flange FL. A plurality of fastening holes FH22 are provided at substantially the same position as the fastening holes FH21 in a top view.

The lid 19H2 is provided with a plurality of fastening holes FH23 that penetrate from the top surface to the bottom surface of the lid 19H2. The plurality of fastening holes FH23 are provided at substantially the same position as those of the fastening holes FH21 and FH22 in a top view, when the accommodating part 19H1 and the lid 19H2 are coupled to each other.

Therefore, two power storage modules 19MD can be coupled by having the bolts BLT2 (an example of a second bolt) inserted from above and fastening with the fastening holes FH21 of the upper power storage module 19MD (the housing 19H) and the fastening holes FH22 and FH23 of the lower power storage module 19MD (the housing 19H).

For example, a stand may be mounted on the bottom portion 3B of the upper turning body 3 and the power storage modules 19MD may be attached to the stand so as to be stacked in the vertical direction. However, if, for example, the number of power storage modules 19MD is to be changed for each specification of the excavator 100, it may be necessary to change the stand, resulting in increased cost. On the other hand, it is possible to set a relatively large stand to match the assumed maximum number of the power storage modules 19MD, but if, for example, the number of the power storage modules 19MD to be mounted is relatively small, the stand may constrain the layout of other devices. For example, a relatively large stand may increase the cost, or the weight of a relatively large stand may reduce the energy consumption efficiency.

In contrast, in this example, the power storage device 19 is configured by stacking a plurality of power storage modules 19MD in the vertical direction. In the plurality of power storage modules 19MD, the housings 19H of the adjacent power storage modules 19MD in the vertical direction are coupled to each other.

Accordingly, it is possible to mount a plurality of the power storage modules 19MD to the upper turning body 3 via the power storage module 19MD of the lowest layer, by merely coupling the housings 19H of the power storage modules 19MD adjacent in the vertical direction. Therefore, when the number of the power storage modules 19MD is changed according to the specification of the excavator 100 or the like, for example, as in the case of FIGS. 10 and 11, the number of the power storage modules 19MD can be easily changed. Accordingly, the capacity of the power storage device 19 can be easily changed.

In this example, the plurality of power storage modules 19MD may each be configured to have an upper coupling structure (e.g., the fastening holes FH22, FH23) configured to be compatible with the lower coupling structure (e.g., the fastening holes FH21) of all other power storage modules 19MD.

Similarly, the plurality of power storage modules 19MD may each be configured to have a lower coupling structure (e.g., the fastening holes FH21) configured to be compatible with the upper coupling structure (e.g., the fastening holes FH22, FH23) of all other power storage modules 19MD.

Thus, for example, a plurality of the power storage modules 19MD can be stacked and coupled in any order, and, therefore, a plurality of the power storage modules 19MD can be stacked and mounted to the upper turning body 3 more easily. Thus, it is easier to change the number of power storage modules 19MD.

Further, in this example, the plurality of power storage modules 19MD may have substantially the same shape with each other in a top view.

Thus, for example, a plurality of the power storage modules 19MD can be stacked in any order, and, therefore, a plurality of the power storage modules 19MD can be stacked and mounted to the upper turning body 3 more easily. Thus, it is easier to change the number of power storage modules 19MD.

Also, in this example, at least two or more of the plurality of power storage modules 19MD may have the housing 19H of substantially the same external shape.

Thus, for example, a plurality of the power storage modules 19MD can be stacked in any order, and, therefore, a plurality of the power storage modules 19MD can be stacked and mounted to the upper turning body 3 more easily. Thus, it is easier to change the number of power storage modules 19MD.

In this example, the relevant devices of the power storage device 19 may be distributed among and housed in the housings 19H of the plurality of power storage modules 19MD.

Thus, it is possible to effectively use the free space of each of the housings 19H of a plurality of the power storage modules 19MD.

In this example, the relevant device may include at least one of the controller 30D for controlling the power storage device 19 and a junction box for relaying power between the power storage device 19 and a plurality of other devices.

This specifically allows the controller 30D and the junction box to be distributed among and housed in the housings 19H of the plurality of power storage modules 19MD.

In this example, the plurality of power storage modules 19MD may each include the service plug installing part 19SH for detachably mounting a service plug that blocks the power path, on the side surface of the housing 19H, and the cover 19CV covering the service plug installing part 19SH.

This allows the worker to remove the cover 19CV on the side of the housing 19H and access the service plug, for example, during maintenance of the power storage device 19, even when a plurality of the power storage modules 19MD are stacked in the vertical direction. Therefore, it is possible to easily cut off the power path during maintenance of the power storage device 19.

In this example, the housing 19H may include the accommodating part 19H1 for housing the battery module BMD and having the upper portion that can be opened, the lid 19H2 for closing the upper portion of the open accommodating part 19H1, and a plurality of the bolts BLT1 for fastening the lid 19H2 to the accommodating part 19H1 in the vertical direction. The housings 19H of the power storage modules 19MD adjacent to each other in the vertical direction may be coupled together by a plurality of the bolts BLT2 fastened in the vertical direction. In the housing 19H, the fastening holes FH21, FH22, and FH23 for fastening the bolts BLT2 may be provided between two adjacent fastening holes FH11 and FH12 in which the bolts BLT1 are fastened.

Thus, for example, a coupling structure that couples the housings 19H of the power storage modules 19MD adjacent to each other in the vertical direction is arranged near the coupling structure of the accommodating part 19H1 and the lid 19H2 of the housing 19H, and a situation in which the outer edge of the housing 19H extends outwardly in a top view can be avoided. Therefore, the coupling structure of the accommodating part 19H1 and the lid 19H2 of the housing 19H and the coupling structure that couples the housings 19H of the power storage modules 19MD adjacent to each other in the vertical direction can both be achieved within a smaller space.

In this example, when the housing 19H is stacked on the housing 19H of another power storage module 19MD, the housing 19H may have, on the lower surface thereof, the recess RC at substantially the same position as the bolt BLT1 of the housing 19H of the other power storage module 19MD.

This allows the recess RC to house the head of the bolt BLT1 when the housing 19H of the other power storage module 19MD is stacked on top of the housing 19H. Therefore, it is possible to avoid a situation in which the head of the bolt BLT1 of the lower housing 19H contacts the lower surface of the upper housing 19H. Accordingly, it is possible to prevent the head of the bolt BLT1 from being damaged, to prevent an increase in the vertical dimension of the power storage device 19 caused by the head of the bolt BLT1, or the like.

[Operation/Stop Switching Method of DC-DC Converter]

Next, a method of switching between the operation and stop of the DC-DC converters 44A and 44B will be described with reference to FIGS. 14 and 15.

Figure 14:
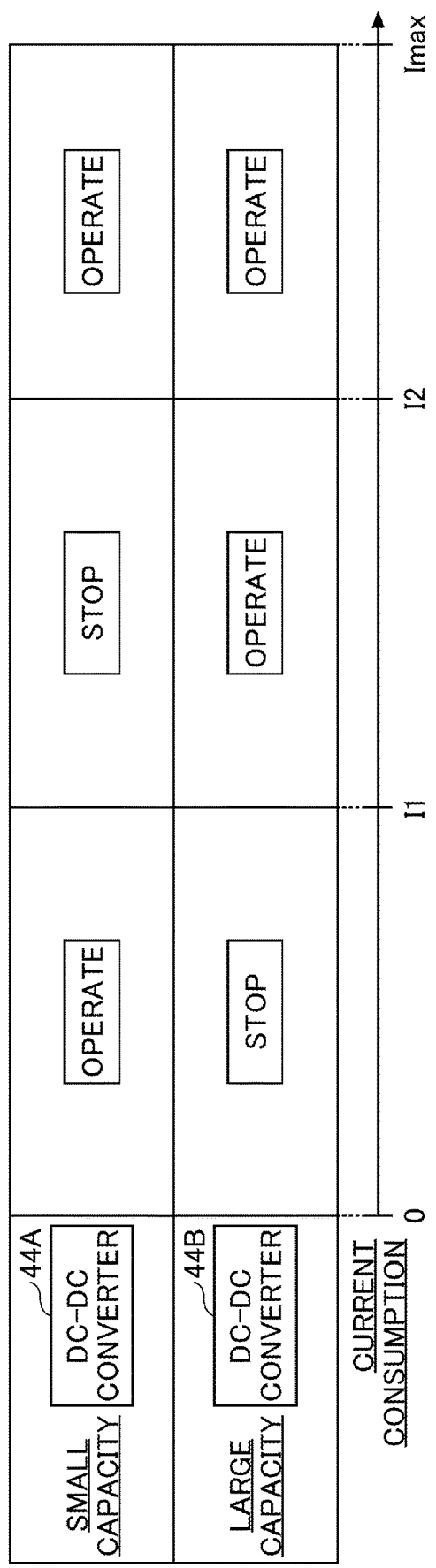
FIG. 14 is a diagram illustrating a method of switching between operation/stop of the DC-DC converter.

FIG. 14 is a diagram illustrating a method of switching between the operation and stop of the DC-DC converters 44A and 44B. FIG. 15 is a diagram illustrating the conversion efficiency of the DC-DC converter 44.

In FIG. 14, there is no significance in the intervals of the scales of the current consumption, and these are illustrated merely to simulate the magnitude relationship between the threshold values I1 and I2 and the maximum value Imax.

In this example, the DC-DC converters 44A and 44B differ from each other in current capacity, i.e., the maximum value of current that can be output. Specifically, the DC-DC converter 44A is configured so that the current capacity is relatively small and the DC-DC converter 44B is configured so that the current capacity is relatively large.

As illustrated in FIG. 14, in this example, the controller 30E switches the operation/stop of the DC-DC converters 44A and 44B in accordance with the current required by all of the low voltage devices, i.e., the current consumption of all of the low voltage devices. The controller 30E can acquire the current consumption of all of the low voltage device based on the output of the sensor 48.

Specifically, the controller 30E causes the DC-DC converter 44A to operate and causes the DC-DC converter 44B to stop, when the current consumption of all of the low voltage devices is less than or equal to the threshold value I1 (>0). The threshold value I1 is set to be somewhat less than the maximum output current of the DC-DC converter 44A. That is, the controller 30E supplies power to the battery 46 or the low voltage device only with the DC-DC converter 44A having a relatively low current capacity, in the range where the current consumption of all of the low voltage devices is less than or equal to the threshold value I1.

The controller 30E causes the DC-DC converter 44A to stop and causes the DC-DC converter 44B to operate, when the current consumption of all of the low voltage devices is greater than the threshold value I1 and less than or equal to the threshold value I2 (>I1). The threshold value I2 is set to be somewhat less than the maximum output current of the DC-DC converter 44B. That is, the controller 30E supplies power to the battery 46 and the low voltage device only with the DC-DC converter 44B having a relatively high current capacity, in a range where the current consumption of all of the low voltage devices is greater than the threshold value I1 and less than or equal to the threshold value I2.

Note that a situation may arise in which both of the DC-DC converters 44A and 44B stop instantaneously when the current consumption of all of the low voltage devices changes from a state of less than or equal to the threshold value I1 to a state greater than the threshold value I1 or vice versa. However, the battery 46 functions as a buffer, and, therefore, problems such as instantaneous interruption of the power supply to the low voltage device will not arise.

The controller 30E causes both the DC-DC converters 44A and 44B to operate, when the current consumption of all of the low voltage devices is greater than the threshold value I2 and less than or equal to the maximum value Imax. That is, the controller 30E supplies power to the battery 46 and to the low voltage device with both the DC-DC converters 44A and 44B, in the range where the current consumption of all of the low voltage devices is greater than the threshold value I2.

A hysteresis is provided in the method of switching between the operation and stop of the DC-DC converters 44A and 44B, in a case in which the current consumption of all of the low voltage devices rises and a case in which this current consumption drops. The threshold value I1 and the threshold value I2 may be set to different values for each of these cases.

Figure 15:
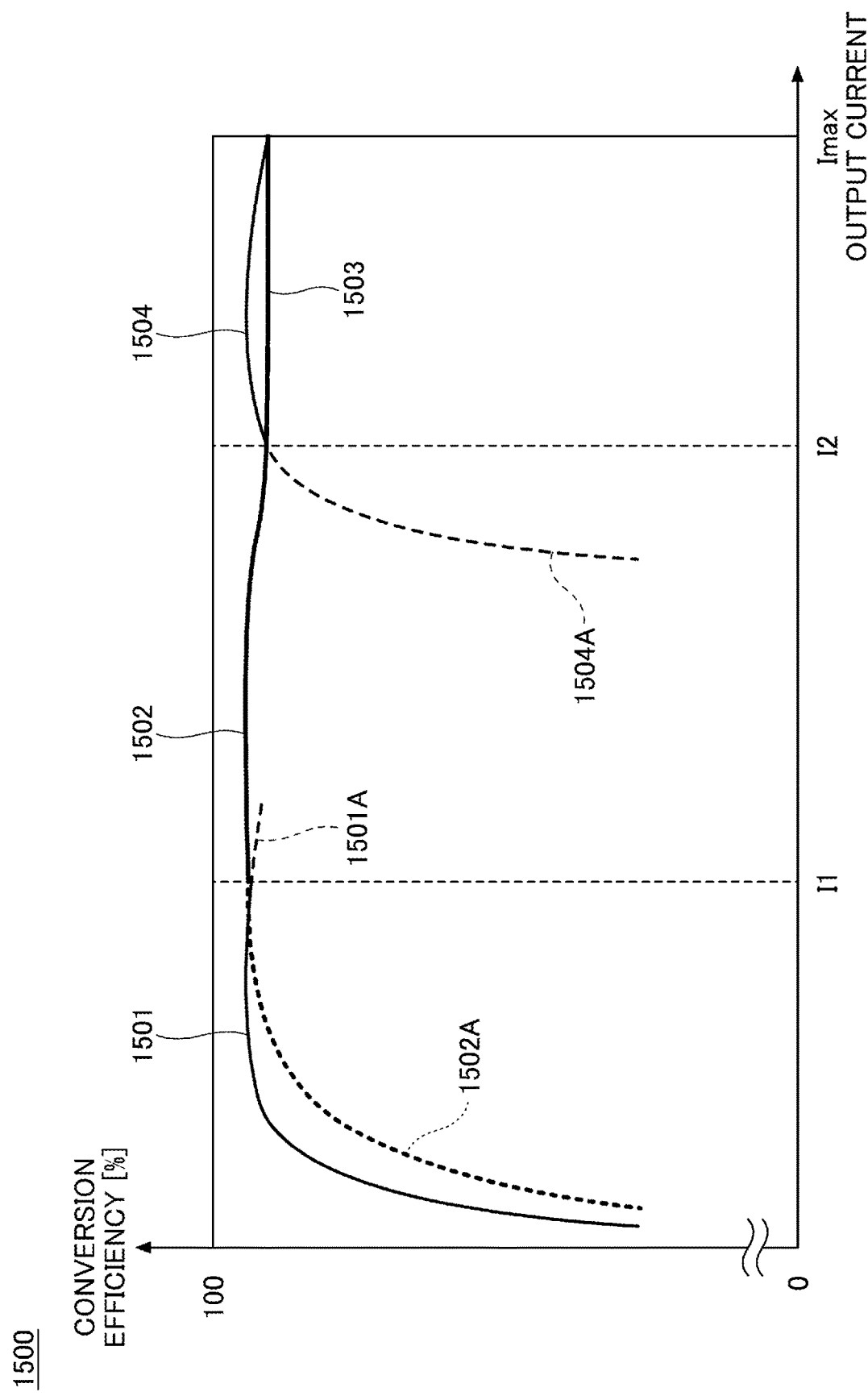
FIG. 15 illustrates the conversion efficiency of the DC-DC converter.

As illustrated in FIG. 15, the conversion efficiency of the DC-DC converter 44A (see graph line 1501) is higher than the conversion efficiency of the DC-DC converter 44B (graph line 1502A) in the range where the output current is less than or equal to the threshold value I1. This is because the smaller the current capacity, the more the conversion efficiency tends to rise in response to an increase of the output current. Therefore, in the range in which the current consumption of all of the low voltage devices is less than or equal to the threshold value I1, by causing only the DC-DC converter 44A to operate, the conversion efficiency of the entire DC-DC converter 44 can be relatively increased.

Further, the conversion efficiency of the DC-DC converter 44B remains relatively high in a range in which the output current is greater than the threshold value I1 and less than or equal to than the threshold value I2 (see graph line 1502). On the other hand, when the output current exceeds the threshold value I1, the conversion efficiency of the DC-DC converter 44A is slightly reduced because the output current is close to the upper limit (see graph line 1501A). Therefore, when the current consumption of all of the low voltage devices is greater than the threshold value I1 and less than or equal to the threshold value I2, the conversion efficiency of the entire DC-DC converter 44 can be relatively increased by causing only the DC-DC converter 44B to operate.

Further, if the current consumption of all of the low voltage devices exceeds the threshold value I2 to a certain extent, the DC-DC converter 44B alone cannot accommodate the current consumption of all of the low voltage devices. Therefore, if the current consumption of all of the low voltage devices is greater than the threshold value I2, by causing the DC-DC converter 44A to operate in addition to the DC-DC converter 44B, the current consumption of all of the low voltage devices can be accommodated. In this case, the output current of the DC-DC converter 44B is maintained at a relatively high level so that the conversion efficiency of the DC-DC converter 44B is maintained at a relatively high level (see graph line 1503). Also, the DC-DC converter 44A is maintained at a relatively high conversion efficiency (graph line 1504), by appropriate control of the output current, excluding the region of relatively low conversion efficiency (graph line 1504A). This allows the conversion efficiency of the entire DC-DC converter 44 to be relatively high.

Thus, in this example, the excavator 100 uses the plurality of the DC-DC converters 44A and 44B connected in parallel to supply power to the low voltage device and the battery 46.

This allows the respective output currents of the DC-DC converters 44A and 44B to rise relatively fast. Therefore, the conversion efficiency of the entire DC-DC converter 44 can be relatively high. Therefore, the power consumption of the power storage device 19 can be reduced, and the operating time of the excavator 100 can be relatively long.

In this example, the current capacities of the DC-DC converters 44A and 44B are set to differ from each other.

Thus, it is possible to switch between operating only the DC-DC converter 44A, operating only the DC-DC converter 44B, and operating both the DC-DC converters 44A and 44B, in accordance with the current consumption of all of the low voltage devices. Therefore, the conversion efficiency of the entire DC-DC converter 44 can be further increased. Accordingly, the power consumption of the power storage device 19 can be further reduced to further increase the operating time of the excavator 100.

In this example, the controller 30E switches the operation/stop of the DC-DC converters 44A and 44B in accordance with the current consumption of all of the low voltage devices.

Accordingly, it is possible to specifically switch between operating only the DC-DC converter 44A, operating only the DC-DC converter 44B, and operating both the DC-DC converters 44A and 44B, in accordance with the current consumption of all of the low voltage devices.

[Control Method when Limiting Power Supply from DC-DC Converter]

Referring now to FIGS. 16 to 20, a control method by the control device 30 at the time of limiting the power supply from the DC-DC converter 44 to the battery 46 or to a low voltage device, will be described.

Limiting the power supply from the DC-DC converter 44 to the battery 46 or the low voltage device includes, for example, stopping the power supply. Further, limiting the power supply from the DC-DC converter 44 to the battery 46 or the low voltage device includes, for example, stopping the power supply from one of the DC-DC converters 44A, 44B to the battery 46 or the low voltage device, i.e., limiting the current that can be supplied to the entire DC-DC converter 44. Stopping the power supply from the DC-DC converter 44 to the battery 46 or the low voltage device includes, for example, stopping the power supply due to an abnormality in the DC-DC converter 44. Abnormalities in the DC-DC converter 44 include, for example, an input overvoltage in which the input voltage from the power storage device 19 exceeds (surpasses) a predetermined range, or an input undervoltage in which the input voltage from the power storage device 19 falls below the predetermined range. Abnormalities in the DC-DC converter 44 include, for example, an output overvoltage in which the output voltage to the battery 46 or the low voltage devices exceeds (surpasses) a predetermined range, or an output undervoltage in which the output voltage falls below a predetermined range. Abnormalities in the DC-DC converter 44 also include, for example, short circuits in the circuit of the DC-DC converter 44. Abnormalities in the DC-DC converter 44 may also include, for example, overcurrent. Abnormalities in the DC-DC converter 44 include, for example, overheating in which the temperature of a predetermined portion of the DC-DC converter exceeds (surpasses) a predetermined range. Abnormalities in the DC-DC converter 44 include a communication abnormality with an external device such as the controller 30E. Abnormalities in the DC-DC converter 44 include, for example, excessive power supply voltage where the power supply voltage of the DC-DC converter 44 exceeds (surpasses) a predetermined range or insufficient power supply voltage where the power supply voltage falls below a predetermined range. Also, stopping the power supply from the DC-DC converter 44 to the battery 46 or the low voltage device may include, for example, temporary output limits due to the transition to the protective mode of the DC-DC converter 44.

<First Example of Control Method>

Figure 16:
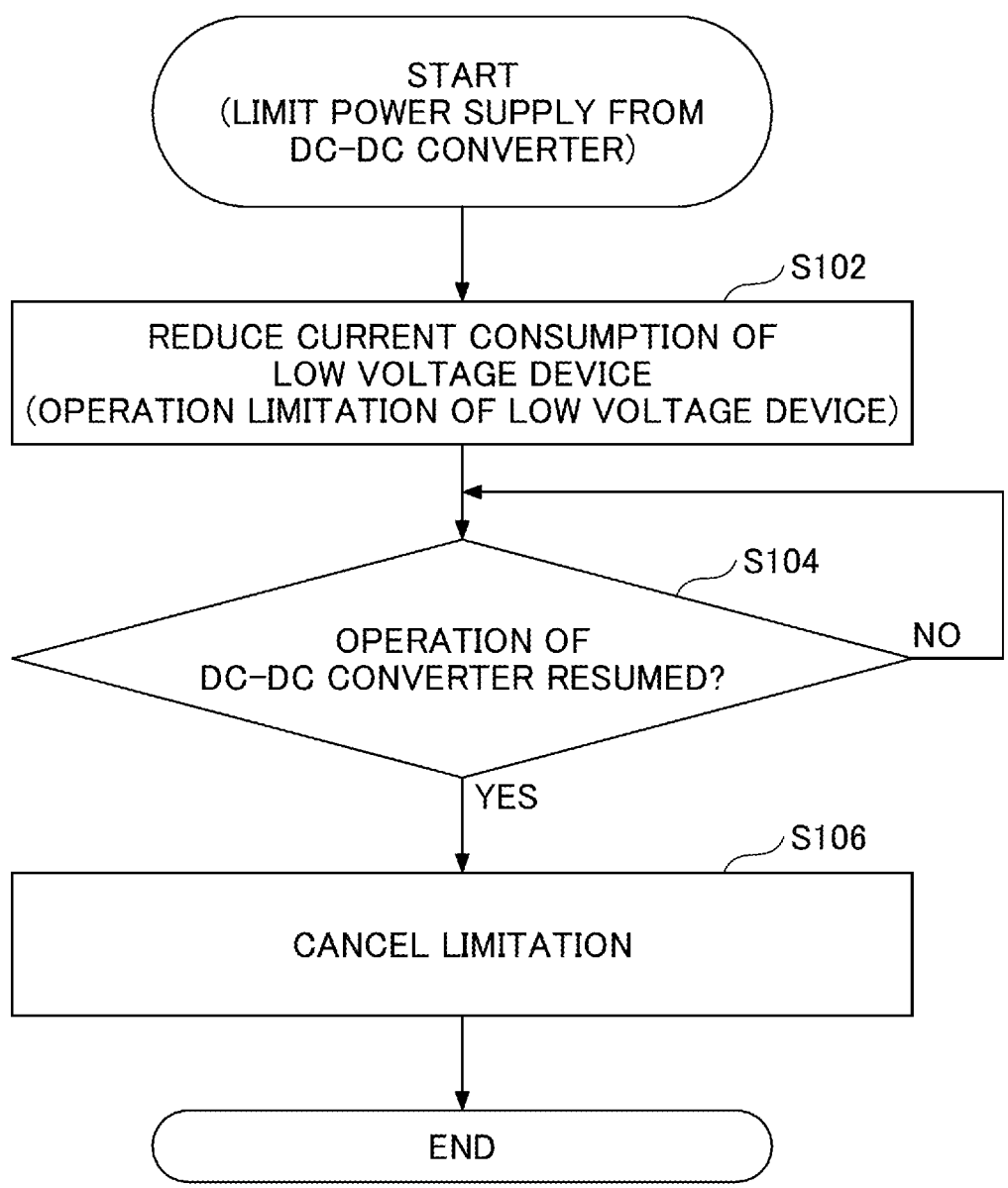
FIG. 16 is a flowchart schematically illustrating a first example of a control process when power supply from a DC-DC converter is limited.
Figure 17:
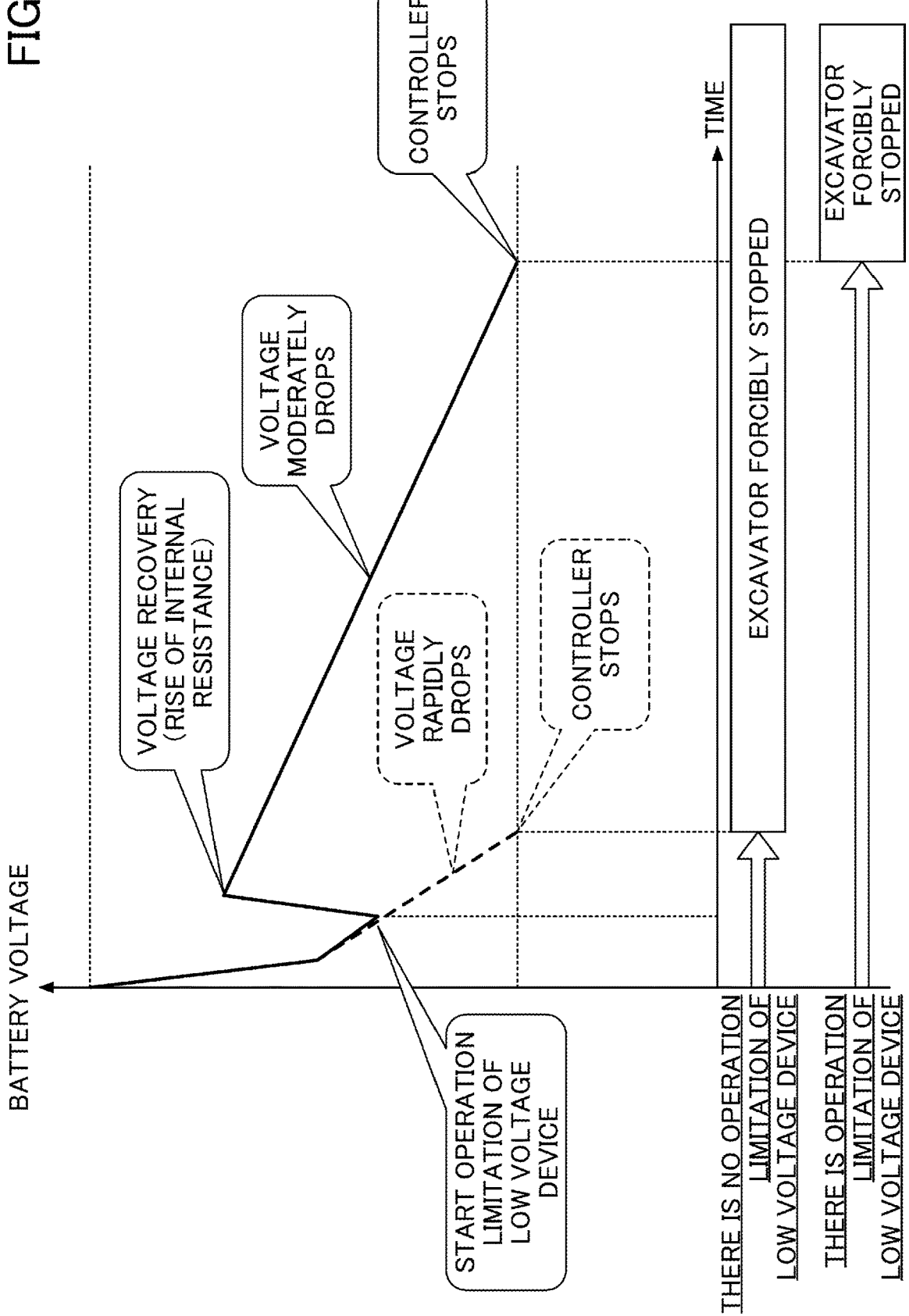
FIG. 17 is a diagram illustrating an example of a change in the battery voltage when power supply from the DC-DC converter is limited.

FIG. 16 is a flowchart schematically illustrating a first example of a control process during limitation of power supply from the DC-DC converter 44. FIG. 17 is a diagram illustrating an example of the voltage change of the battery 46 during limitation of power supply from the DC-DC converter 44.

The flowchart begins when the power supply from the DC-DC converter 44 to the battery 46 or the low voltage device is limited. Specifically, the controller 30E may send a signal to the controller 30A indicating that the power supply from the DC-DC converter 44 is limited due to a limited power supply from the DC-DC converter 44 or due to an abnormality or the like. When the controller 30A receives the signal, the process of this flowchart may start. Hereinafter, the same may apply to the flowcharts of FIGS. 18 to 20, which will be described later.

As illustrated in FIG. 16, in step S102, the controller 30A reduces the current consumption of the low voltage device by limiting the operation of the low voltage device. This allows the current consumption of the low voltage device to be reduced in a situation where the power supply from the DC-DC converter 44 to the battery 46 and the low voltage device is limited, and to allow the controllers 30A to 30E to operate for a relatively long time by the power of the battery 46 alone. As a result, the controller 30A can relatively increase the operable time of various devices of the excavator 100 other than low voltage devices subject to operation limitations and relatively increase the operable time of the excavator 100.

After the processing of step S102, the controller 30A may report to the user through the output device 50 that the operation of the low voltage device is limited. The controller 30A may transmit a report signal through the communication device that the operation of the low voltage device is limited to the external device when the excavator 100 is remotely operated or remotely monitored.

The operation limitation of the low voltage device includes, for example, stopping the operation of the low voltage device. This allows the current consumption of the target low voltage device to be reduced to substantially zero. The operation limitation of the low voltage device includes a state in which the operation continues in an operation state in which the performance of the low voltage device is relatively low (hereinafter referred to as the "performance limitation state"). This allows the current consumption of the target low voltage device to be reduced compared to the case of the operation state in which the performance of the target low voltage device is relatively high.

The low voltage device for which the current consumption is to be reduced, is the low voltage device with relatively high current consumption. The target low voltage device includes, for example, a water pump 64. The performance limitation state of the water pump 64 includes, for example, a limited state such that the discharge flow rate of the water pump 64 is relatively low as compared to a regular state. The target low voltage device also includes, for example, a fan 90. The performance limitation state of the fan 90 includes, for example, a limited state such that the revolution speed of the fan 90 is relatively low as compared to a regular state. The target low voltage device also includes, for example, an air conditioning device 80. The performance limitation state of the air conditioning device 80 includes, for example, an operation state that is limited so that the set temperature of the air conditioning device 80 is relatively high in a situation where the set temperature of the air conditioning device 80 is lower than the outside temperature (e.g., in summer). The performance limitation state of the air conditioning device 80 also includes, for example, an operation state in which the set temperature of the air conditioning device 80 is relatively low in a situation in which the set temperature of the air conditioning device 80 is higher than the outside temperature (e.g., in winter).

The refrigerant circuit 66 is filled with a refrigerant having a relatively large capacity. Therefore, even when the operation of the water pump 64 or the fan 90 is limited, the heat of the cooling target is transferred to the refrigerant circuit 66. Therefore, although the cooling performance is reduced, the cooling device 60 can continue cooling the cooling target even when the operation of the water pump 64 or the fan 90 is limited.

In step S102, the controller 30A may stop the operation of the target low voltage device, or the controller 30A may cause the operation state of the target low voltage device to transition to the performance limitation state, or the controller 30A may apply either the stop of operation of the target low voltage device or the transition to the performance limitation state depending on the situation.

For example, the controller 30A may determine whether the operation of the target low voltage device is to be stopped or whether to transition to the performance limitation state, depending on the voltage of the battery 46. The voltage of the battery 46 can be identified based on the output of the sensor 48. Specifically, when the voltage of the battery 46 is relatively high, the controller 30A may set the operation of the target low voltage device to a performance limitation state, and when the voltage of the battery 46 is relatively low, the operation of the target low voltage device may be stopped.

In step S102, the controller 30A may limit the operation of all target low voltage devices, such as the water pump 64, the fan 90, and the air conditioning device 80, or may limit the operation of some of these devices. In step S102, the controller 30A may either limit the operation of all target low voltage devices, such as the water pump 64, the fan 90, and the air conditioning device 80, or limit the operation of some target low voltage devices, depending on the situation.

For example, the controller 30A may vary the number of target low voltage devices for which the operation is to be limited, depending on the voltage of the battery 46. Specifically, the controller 30A may increase the number of target low voltage devices for which the operation is to be limited, as the voltage of the battery 46 decreases. In this case, the controller 30A may preferentially limit the operation of the water pump 64 and the fan 90 over the air conditioning device 80. Further, when the fan 90 for blowing air to the condenser 82B and the fan 90 for blowing air to the radiator 62 are separately provided, the controller 30A may prioritize operation limitations on the latter fan 90 over the former fan 90.

Hereinafter, various modes of operation limitation of the target low voltage device described above may be suitably applied, also in the case of FIGS. 18 to 20, which will be described later.

When the process of step S102 is completed, the controller 30A proceeds to step S104.

In step S104, the controller 30A determines whether the DC-DC converter 44 has returned to the regular operation state from the operation limitation state. If the DC-DC converter 44 has returned to the regular operation state, the controller 30A proceeds to step S106, and if not, the controller 30A repeats the process of this step until the DC-DC converter returns to the regular operation state.

In step S106, the controller 30A cancels the operation limitation of the target low voltage device.

The controller 30A may report to the user through the output device 50, that the operation limitation of the target low voltage device is canceled, concurrently with the canceling of the operation limitation of the target low voltage device. The controller 30A may transmit a report signal to the external device to cancel the operation limitation of the target low voltage device through the communication device when remote operation or remote monitoring of the excavator 100 is performed. Hereinafter, the same may be applied to step S204 of the second example (FIG. 18), step S302 of the third example (FIG. 19), and step S402 of the fourth example (FIG. 20) described later.

When the processing in step S106 is completed, the controller 30A completes the processing of the flowchart.

In the case where the operation limitation of the DC-DC converter 44 is very unlikely to be canceled, such as in the case of an operation limitation due to an abnormality in the DC-DC converter 44, the processing of the steps S104 and S106 may be omitted.

For example, as illustrated in FIG. 17, when the power supply from the DC-DC converter 44 to the battery 46 is limited, and the low voltage device is operated by the using the power from the battery 46, the voltage of the battery 46 drops. In particular, in the electrically operated excavator 100, the power consumption of the controllers 30B and 30D of the electric driving system and the power supply system, and the power consumption of the cooling system such as the water pump 64 and the fan 90, are relatively increased in comparison with a regular hydraulic excavator, and the voltage drop caused by the internal resistance is significant. Therefore, if the operation limitation of the DC-DC converter 44 is not canceled, and the operation limitation of the low voltage device is not applied, the voltage of the battery 46 drops sharply. Then, the voltage immediately reaches the lower limit value of the control power supply of the various controllers including the controllers 30A to 30E included in the control device 30, and the various controllers stop (see the dashed line in the figure). As a result, the excavator 100 is forced to stop. Thus, if the power supply from the DC-DC converter 44 to the battery 46 or the low voltage device is limited, in some instances, it may not be possible to cause the excavator 100 to evacuate to a safe location or it may not be possible to move the excavator 100 for repair.

In contrast, in this example, the controller 30A limits the operation of the low voltage device. Thus, the voltage drop caused by the internal resistance decreases due to the decrease in the current consumption of the low voltage device, and the voltage recovers and the current consumption decreases, so that the voltage drop of the battery 46 becomes moderate (see solid line in the figure). As a result, the voltage of the battery 46 reaches the lower limit of the control power supply of the various controllers, ensuring a relatively long period of time until the excavator 100 is forced to stop. Accordingly, the user may operate the excavator 100 to cause the excavator 100 to evacuate to a safe location or to move the excavator 100 for repair. Also, if the excavator 100 operates by a fully automatic operation function, the excavator 100 may automatically evacuate to a safe location, for example, in a predetermined evacuation mode, or automatically move for repair.

As described above, in this example, when the power supply from the DC-DC converter 44 to the battery 46 is limited, the controller 30A limits the operation of the target low voltage load and reduces power consumption.

This allows the controller 30A to reduce the voltage drop of the battery 46 in the event of the limitation on the power supply from the DC-DC converter 44 and to ensure a relatively long time until the various controllers are stopped. Therefore, the excavator 100 (own machine) may be evacuated to a safe location or the excavator 100 (own machine) may be moved for repair, by operation by an operator or by an automatic operation function.

In this example, the case where power supply from the DC-DC converter 44 to the battery 46 is limited, may include a case in which the DC-DC converter 44 has an abnormality. Specifically, an abnormality in the DC-DC converter 44 may include at least one of an input overvoltage, an input undervoltage, an output overvoltage, an output undervoltage, a short circuit, an overcurrent, overheat, an excess power supply voltage, an insufficient power supply voltage, and a communication abnormality.

Thus, the controller 30A can reduce the voltage drop of the battery 46 in the event of an abnormality of the DC-DC converter 44 and ensure a relatively long time until the various controllers are stopped.

In this example, the case where power supply from the DC-DC converter 44 to the battery 46 is limited, may include a case in which the power supply from at least one of the plurality of the DC-DC converters 44A and 44B to the battery 46 is stopped.

Thus, for example, when the power supply from one of the DC-DC converters 44A and 44B is stopped, the controller 30A can reduce the voltage drop of the battery 46 and ensure a relatively long time until the various controllers are stopped.

Also, in this example, the low voltage load subject to the operation limitation may include at least one of the water pump 64 and the fan 90.

Accordingly, the controller 30A limits the operation of the water pump 64 and the fan 90, which have relatively high current consumption, and specifically, the current consumption of the low voltage device can be reduced.

Also, in this example, the low voltage load subject to operation limitation may include the air conditioning device 80.

Accordingly, the controller 30A limits the operation of the air conditioning device 80 having a relatively high current consumption, and can specifically reduce the current consumption of all of the low voltage devices.

Also, in this example, controller 30A may preferentially limit the operation of the water pump 64 and fan 90 over the operation of the air conditioning device 80.

This allows the controller 30A to reduce the current consumption of all of the low voltage devices, for example, while taking into account the comfort and health aspects of the user (operator) in the cabin 10.

<Second Example of Control Method>

Figure 18:
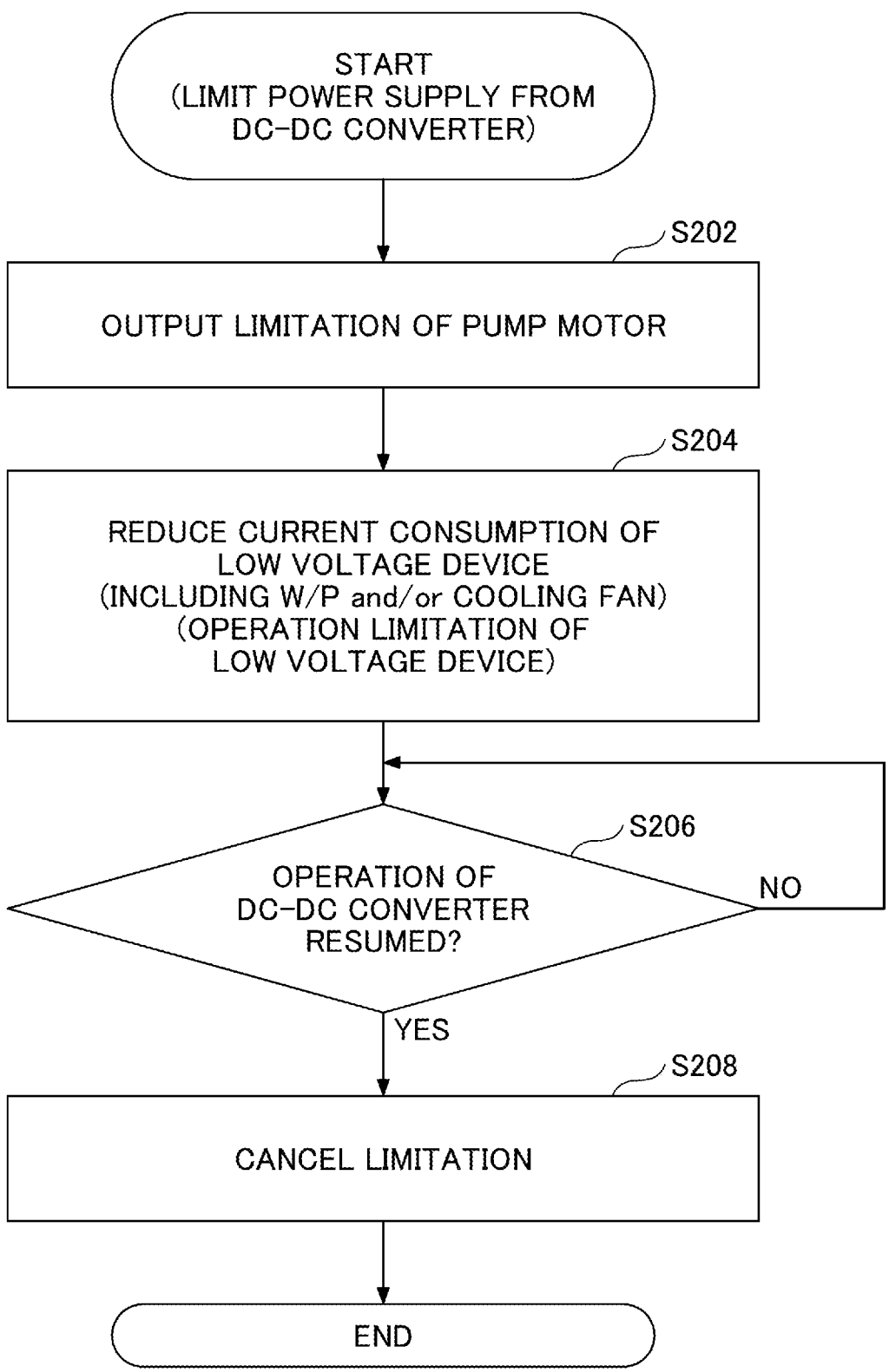
FIG. 18 is a flowchart schematically illustrating a second example of a control process when power supply from the DC-DC converter is limited.

FIG. 18 is a flowchart schematically illustrating a second example of a control process when the power supply from the DC-DC converter 44 is limited.

As illustrated in FIG. 18, in step S202, the controller 30A outputs a control instruction to the controller 30B to limit the output of the pump motor 12. Specifically, the controller 30A may limit the output of the pump motor 12 by controlling a regulator (not illustrated) to reduce the capacity and load of the variable capacity main pump 14. The controller 30A may limit the output of the pump motor 12 by reducing the revolution speed of the pump motor 12. The controller 30A may implement both of these limitations to limit the output of the pump motor 12. Accordingly, the heat generation of the device of the electric driving system and the power supply system can be reduced, and the load of the cooling device 60 can be reduced.

When the process of step S202 is completed, the controller 30A proceeds to step S204.

In step S204, the controller 30A reduces the current consumption of the low voltage device by limiting the operation of the low voltage device including the water pump 64 (W/P) and the fan 90. Thus, the controller 30A can provide a relatively long time for the controllers 30A to 30E to operate by the power of the battery 46 alone, as in the first example above.

The processing of steps S206 and S208 is the same as that of steps S104 and S106 in FIG. 16, and, therefore, the description thereof will be omitted.

When the processing in step S208 is completed, the controller 30A completes the process of this flowchart.

Thus, in this example, the controller 30A limits the output of the pump motor 12 when limiting the operation of at least one of the water pump 64 or the fan 90.

Accordingly, the controller 30A can reduce heat generation from the electric driving system or the power supply system by limiting the output of the pump motor 12. Therefore, even when the operation of the water pump 64 or the fan 90 is limited, the controller 30A can reduce the increase in temperature (overheating) of the device to be cooled by the cooling device 60.

The controller 30A may identify the temperature state of the device to be cooled based on the output of the temperature sensor 54, and limit the output of the pump motor 12 in accordance with the temperature state of the device to be cooled by the cooling device 60. Specifically, the controller 30A may limit the output of the pump motor 12 when the temperature of the device to be cooled by the cooling device 60 exceeds a predetermined threshold value.

<Third Example of Control Method>

Figure 19:
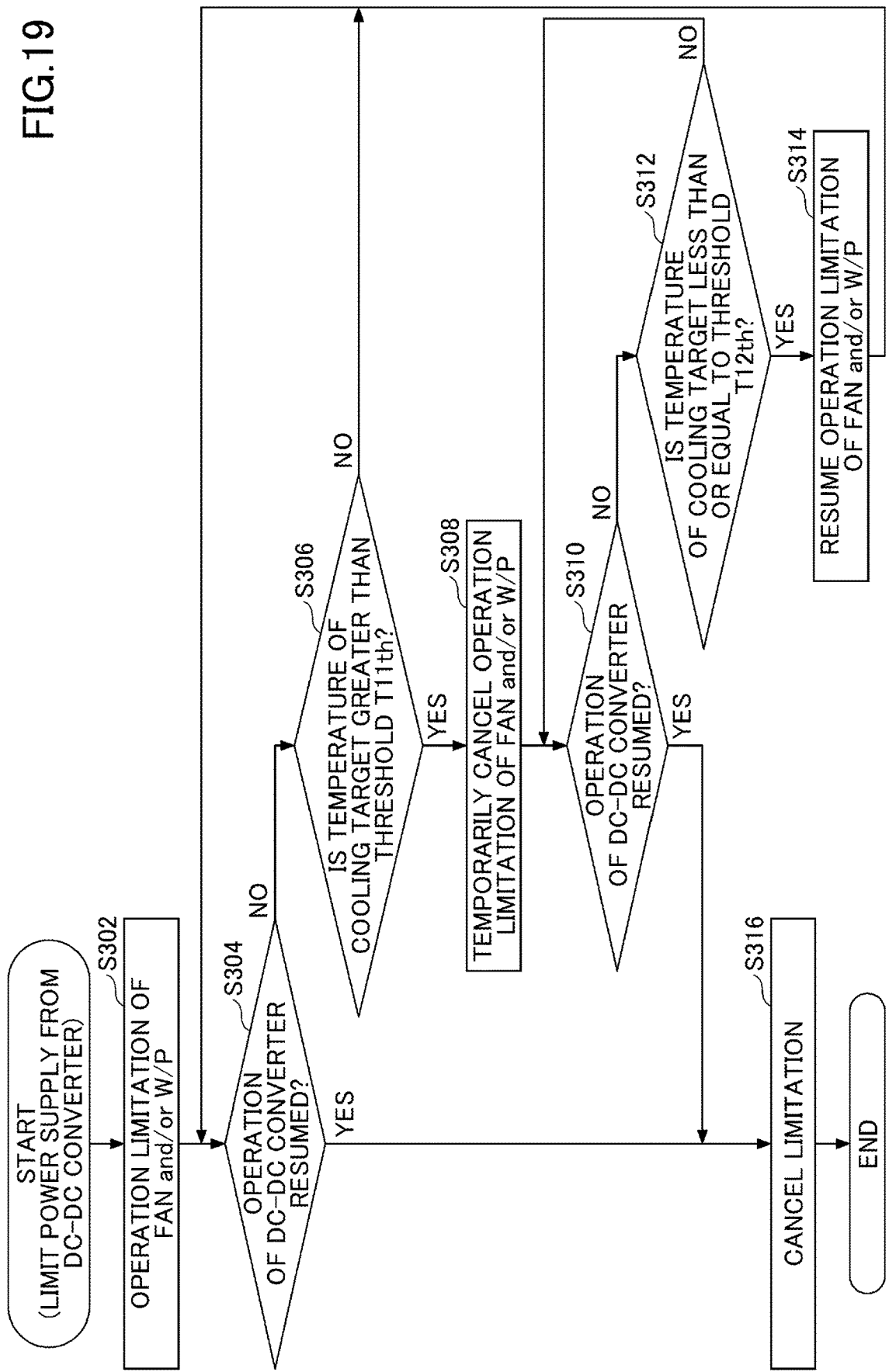
FIG. 19 is a flowchart schematically illustrating a third example of a control process when power supply from the DC-DC converter is limited.

FIG. 19 is a flowchart schematically illustrating a third example of a control process when the power supply from the DC-DC converter 44 is limited.

As illustrated in FIG. 19, in step S302, the controller 30A limits the operation of at least one of the water pump 64 or the fan 90. Therefore, it is possible to reduce the current consumption of all of the low voltage devices.

When the process of step S302 is completed, the controller 30A proceeds to step S304.

In step S304, the controller 30A determines whether the DC-DC converter 44 has returned to the regular operation state from the operation limitation state. The controller 30A proceeds to step S306 if the DC-DC converter 44 has not returned to the regular operation state, and proceeds to step S316 if the DC-DC converter 44 has returned to the regular operation state.

Meanwhile, in step S306, the controller 30A determines whether the temperature of the device to be cooled down by the cooling device 60 exceeds the threshold value T11th (>0) based on the output of the temperature sensor 54. If the temperature of the device to be cooled exceeds the threshold value T11th, the controller 30A proceeds to step S308, and otherwise returns to step S304.

In step S308, the controller 30A temporarily cancels the operation limitation of the water pump 64 or the fan 90 for which the operation is limited in step S302. Therefore, it is possible to improve the cooling performance of the cooling device 60 and prevent the temperature rise of the device to be cooled down.

When the process of step S308 is completed, the controller 30A proceeds to step S310.

In step S310, the controller 30A determines whether the DC-DC converter 44 has returned to the regular operation state from the operation limitation state. The controller 30A proceeds to step S316 if the DC-DC converter 44 has returned to the regular operation state, and proceeds to step S312 if the DC-DC converter 44 has not returned to the regular operation state.

In step S312, the controller 30A determines whether the temperature of the device to be cooled down by the cooling device 60 is less than or equal to the threshold value T12th (<T11th). If the temperature of the device to be cooled is less than or equal to the threshold value T12th, the controller 30A proceeds to step S314, and otherwise returns to step S310.

In step S314, controller 30A resumes the operation limitation of the water pump 64 and the fan 90, that was temporarily canceled in step S308.

When the process of step S314 is completed, the controller 30A returns to step S304.

On the other hand, in step S316, the controller 30A cancels the operation limitation of the target low voltage device.

When the process of step S316 is completed, the controller 30A completes the process of the present flowchart.

Thus, in this example, when the temperature of the device to be cooled by the cooling device 60 is relatively high while the operation of the water pump 64 or the fan 90 is limited, the controller 30A temporarily cancels the operation limitation of the water pump 64 or the fan 90.

Accordingly, the controller 30A can prevent the temperature rise of the device to be cooled while reducing the current consumption of all of the low voltage devices.

<Fourth Example of Control Method>

Figure 20:
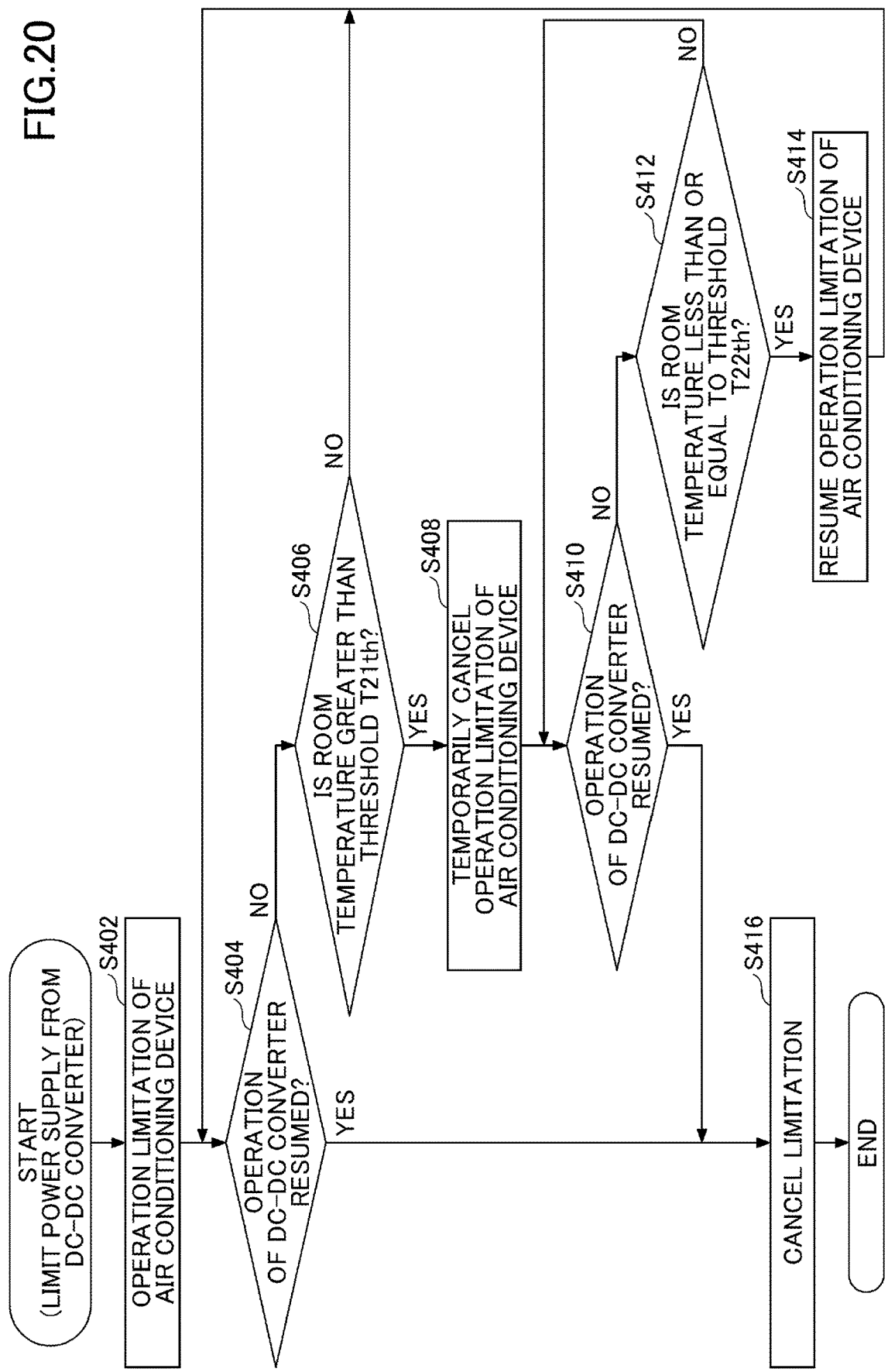
FIG. 20 is a flowchart schematically illustrating a fourth example of a control process when power supply from the DC-DC converter is limited.

FIG. 20 is a flowchart schematically illustrating a fourth example of a control process when the power supply from the DC-DC converter 44 is limited.

In this example, a control process in a state in which the set temperature of the air conditioning device 80 is lower than the outside temperature (for example, in summer) is represented.

As illustrated in FIG. 20, in step S402, the controller 30A limits the operation of the air conditioning device 80. Therefore, it is possible to reduce the current consumption of all of the low voltage devices.

When the process of step S402 is completed, the controller 30A proceeds to step S404.

In step S404, the controller 30A determines whether the DC-DC converter 44 has returned to the regular operation state from the operation limitation state. The controller 30A proceeds to step S406 if the DC-DC converter 44 has not returned to the regular operation state, and proceeds to step S416 if the DC-DC converter has returned to the regular operation state.

On the other hand, in step S406, the controller 30A determines whether the indoor temperature of the cabin 10 exceeds the threshold value T21th (>0) based on the output of the temperature sensor 56. If the temperature of the device to be cooled exceeds the threshold value T21th, the controller 30A proceeds to step S408, and otherwise returns to step S404.

In the case of the control process in a situation where the set temperature of the air conditioning device 80 is higher than the outdoor temperature, it may be determined whether the indoor temperature of the cabin 10 is lower than a predetermined threshold value.

In step S408, the controller 30A temporarily cancels the operation limitation of the air conditioning device 80 whose operation is limited in step S402. This improves the performance of the air conditioning device 80 and prevents the increase in the room temperature of the cabin 10.

When the process of step S408 is completed, the controller 30A proceeds to step S410.

In step S410, the controller 30A determines whether the DC-DC converter 44 has returned to the regular operation state from the operation limitation state. The controller 30A proceeds to step S416 if the DC-DC converter 44 has returned to the regular operation state, and proceeds to step S412 if the DC-DC converter has not returned to the regular operation state.

In step S412, the controller 30A determines whether the indoor temperature of the cabin 10 is less than or equal to the threshold value T22th (<T11th). If the temperature of the device to be cooled is less than or equal to the threshold value T22th, the controller 30A proceeds to step S414, and otherwise returns to step S410.

In the case of the control process in a situation where the set temperature of the air conditioning device 80 is higher than the outdoor temperature, it may be determined whether the indoor temperature of the cabin 10 is higher than or equal to the predetermined threshold value.

In step S414, the controller 30A resumes the operation limitation of the air conditioning device 80 that was temporarily canceled in step S408.

When the processing of step S414 is completed, the controller 30A returns to step S404.

Meanwhile, in step S416, the controller 30A cancels the operation limitation of the target low voltage device.

When the processing in step S416 is completed, the controller 30A ends the process of the flowchart.

As described above, in this example, the controller 30A temporarily cancels the operation limitation of the air conditioning device 80 when the indoor temperature of the cabin 10 exceeds a threshold value in a manner as to deviate from the set temperature of the air conditioning device 80, while the operation of the air conditioning device 80 is limited.

Thus, the controller 30A can reduce the current consumption of all of the low voltage devices while preventing a situation in which the indoor temperature of the cabin 10 is too high in summer or too low in winter.

[Control Process for Start and Stop of Operation Mode]

Figure 21:
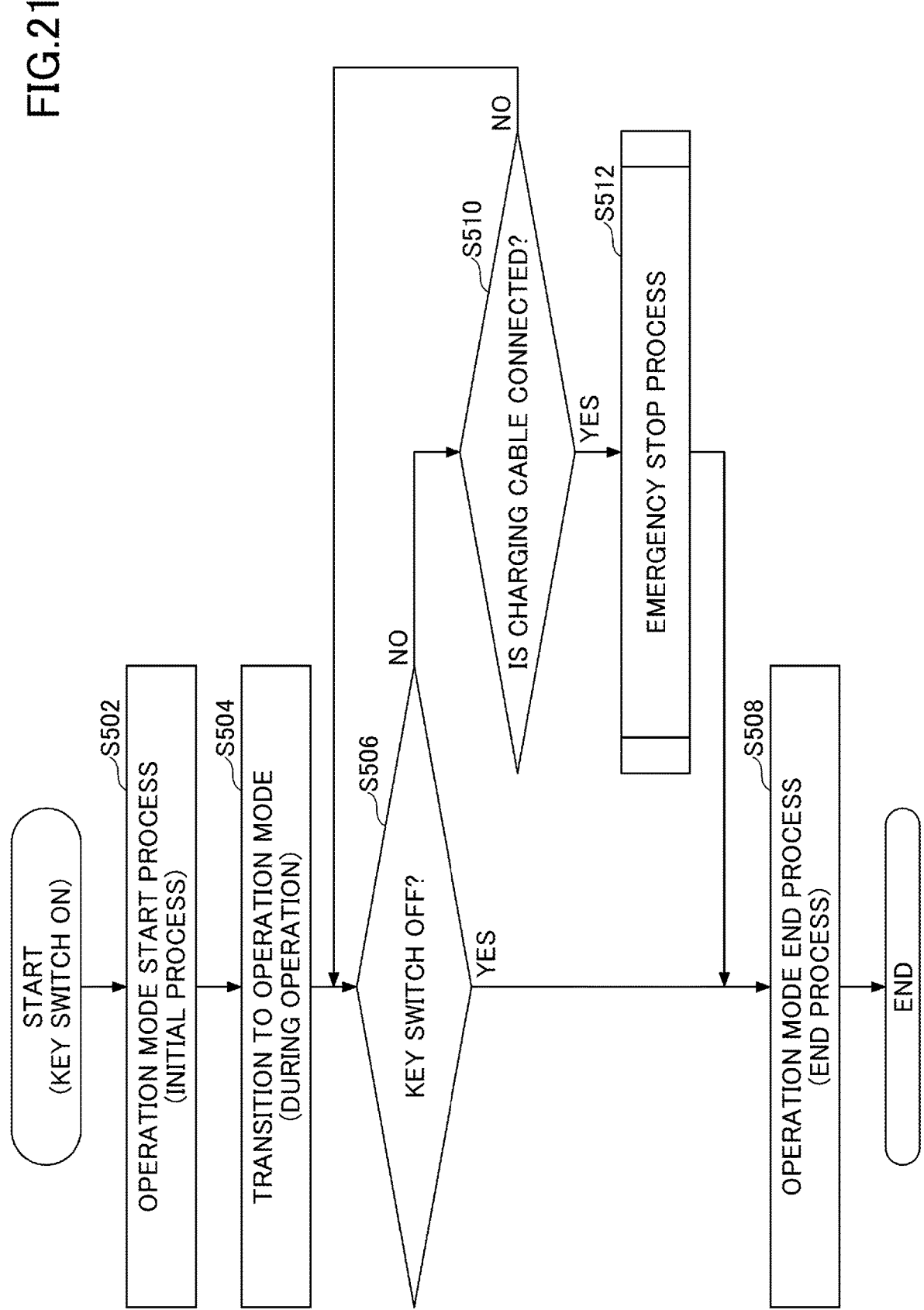
FIG. 21 is a flowchart schematically illustrating an example of a control process for starting and stopping the operation mode of the excavator.
Figure 22:
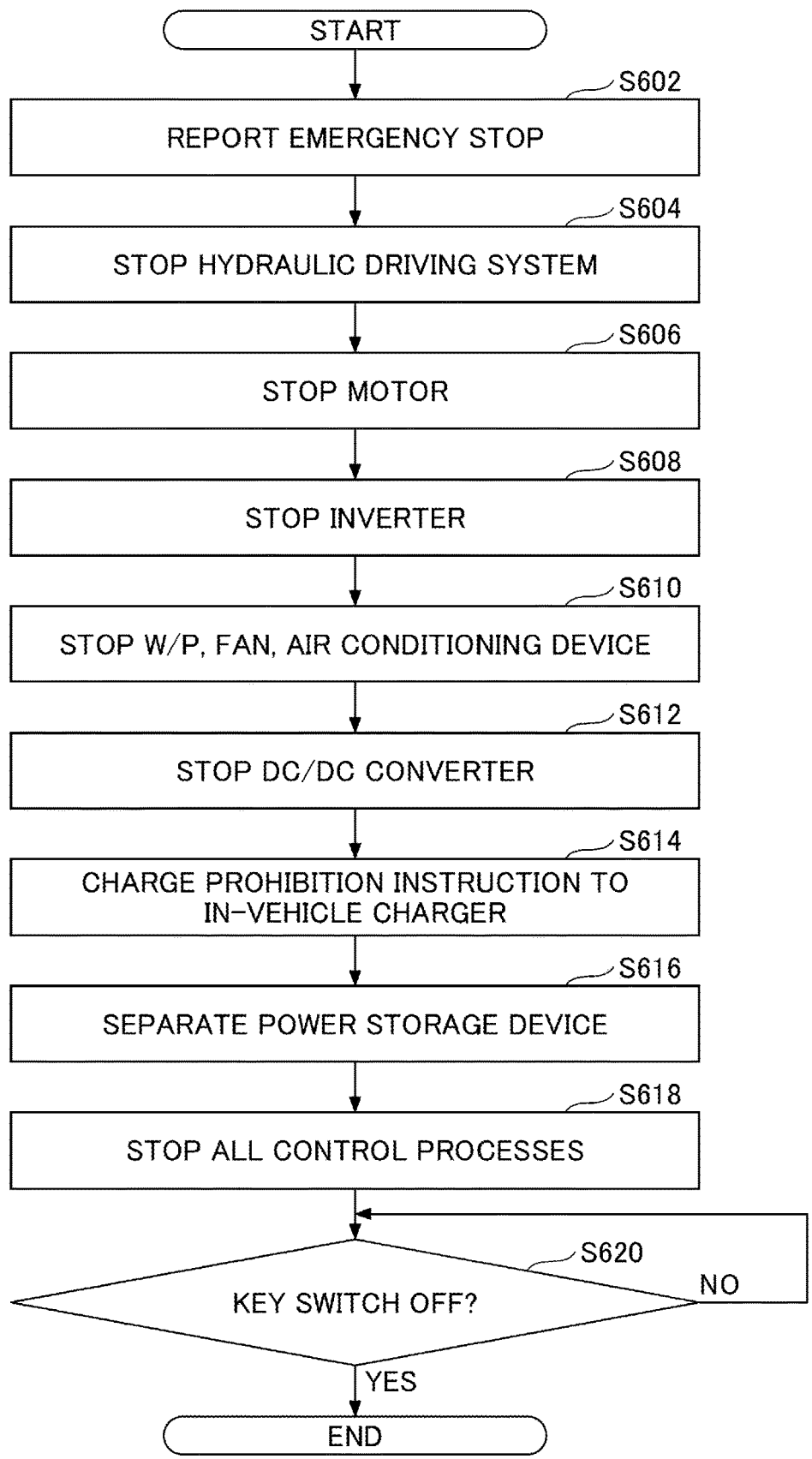
FIG. 22 is a flowchart schematically illustrating an example of an emergency stop process of the excavator.

Referring now to FIGS. 21 and 22, a control process regarding the start and stop of the operation mode of the excavator 100 will be described.

FIG. 21 is a flowchart schematically illustrating a control process for starting and stopping the operation mode of the excavator 100. FIG. 22 is a flowchart schematically illustrating an example of an emergency stop process of the excavator 100.

The process of the flowchart of FIG. 21 is started when a key switch is turned on in response to a predetermined input from a user through the input device 52. A key switch is provided in the power system between the battery 46 and various controllers such as the controllers 30A to 30E.

As illustrated in FIG. 21, in step S502, the controller 30A performs a process of starting the operation mode corresponding to an initial process at the time of activation of the excavator 100. The operation mode is the default control mode when the excavator 100 is operating (being driven) to perform regular work, by operating the actuator in response to an operation instruction corresponding to an operator's operation or an automatic operation function.

When the process of step S502 is completed, the controller 30A proceeds to step S504.

In step S504, the controller 30A transitions to an operation mode of corresponding to regular operation of the excavator 100.

When the process of step S504 is completed, the controller 30A proceeds to step S506.

In step S506, the controller 30A determines whether the key switch has been turned on. The controller 30A proceeds to step S508 when the key switch is turned on and proceeds to step S510 when the key switch is not turned on.

In step S508, the controller 30A performs a process of ending the operation mode corresponding to the ending process when the excavator 100 stops.

When the processing in step S508 is completed, the controller 30A ends the process of the flowchart.

On the other hand, in step S510, the controller 30A determines whether a charging cable extending from an external power source is connected to the charging port 72. For example, when the charging cable is connected to the charging port 72A, the in-vehicle charger 70 sends a signal to the controller 30D indicating that the charging cable is connected to the charging port 72A. Accordingly, the controller 30A can identify that a charging cable is connected to the charging port 72A by identifying the reception of a signal from the in-vehicle charger 70 through the controller 30D. For example, when the charging cable is connected to the charging port 72B, the controller 30D identifies the state in which the charging cable is connected to the charging port 72B by communication with a charging station side through contact detection or power line communication. Thus, the controller 30A can identify that the charging cable is connected to the charging port 72B through the controller 30D. The controller 30A proceeds to step S512 when the charging cable extending from the external power source is connected to the charging port 72, and proceeds to step S506 when the charging cable is not connected.

In step S512, an emergency stop process of the excavator 100 is performed. Specifically, the process transitions to the flowchart illustrated in FIG. 22.

FIG. 22 is a flowchart of an emergency stop process when a charging cable is connected to the charging port 72A.

As illustrated in FIG. 22, in step S602, the controller 30A reports to the user, via the output device 50, about the emergency stop of the excavator 100 together with the reason. The controller 30A may also report that it is necessary to turn off the key switch once (see step S620) in order to recover from the emergency stop state of the excavator 100. The controller 30A may transmit a signal to an external device representing an emergency stop or the like of the excavator 100 through a communication device when the excavator 100 is remotely operated or remotely monitored.

When the process of step S602 is completed and a certain time elapses, the controller 30A proceeds to step S604.

In step S604, the controller 30A stops the hydraulic driving system. For example, the controller 30A blocks the pilot line 25 through the switching valve 25V2 by energizing the relay 25R to open the relay 25R. As a result, the pilot pressure supply to the hydraulic control valve 31 is cut off (stopped) and the hydraulic actuator does not operate even if the operation device 26 is operated, and the hydraulic driving system is stopped.

When the process of step S604 is completed, the controller 30A proceeds to step S606.

In step S606, the controller 30A stops the pump motor 12 through the controller 30B.

When it is confirmed through the controller 30B that the pump motor 12 is stopped, the controller 30A proceeds to step S608. For example, the controller 30A receives a signal relating to the revolution speed of the pump motor output from the inverter 18 through the controller 30B and identifies that the rotation of the pump motor 12 has been stopped.

In step S608, the controller 30A stops the inverter 18 through the controller 30B.

When it is confirmed that the inverter 18 has stopped, the controller 30A proceeds to step S610. For example, the controller 30A receives, through controller 30B, a signal representing the stop of operation, output from the inverter 18, and identifies that the inverter 18 has been stopped.

In step S610, the water pump 64, the fan 90, and the air conditioning device 80 are stopped.

When the process of step S610 is completed, the controller 30A proceeds to step S612.

In step S612, the controller 30A stops the DC-DC converter 44 through the controller 30E.

When it is confirmed that the DC-DC converter 44 has stopped, the controller 30A proceeds to step S614. The controller 30A receives, through the controller 30E, a signal representing the stop of operation, output from the DC-DC converter 44, and identifies that the DC-DC converter 44 has stopped.

In step S614, the controller 30A outputs, through the controller 30D, a charge prohibition instruction to the in-vehicle charger 70, to prohibit the charging of the power storage device 19.

When the charging cable is connected to the charging port 72B, in this step, the controller 30A may output a signal requesting to prohibit (stop) the external power supply (charging stand) side from charging the power storage device 19.

The controller 30A proceeds to step S616 when it is confirmed that the charge prohibition is applied to the in-vehicle charger 70. For example, the controller 30A receives a signal representing a charge prohibition state output from the in-vehicle charger 70, through the controller 30D, and identifies the charge prohibition state of the in-vehicle charger 70.

In step S616, controller 30A blocks the system main relay through controller 30D to separate the power storage device 19 from the power supply system.

The controller 30A proceeds to step S618 when it is confirmed that the power storage device 19 has been separated from the power supply system. For example, the controller 30A identifies that the power storage device 19 is separated from the power supply system by receiving a signal indicating the measurement result of the voltage of the power storage device 19 input from the power storage device 19 through the controller 30D.

In step S618, controller 30A stops all control processing of the control device 30.

When the processing of step S618 is completed, the controller 30A proceeds to step S620.

In step S620, the controller 30A determines whether the key switch has been turned off. If the key switch is not turned off, the processing of this step is repeated until the key switch is turned off. If the key switch is turned off, the process of this flowchart is completed.

In the emergency stop process, only one of the stopping of the hydraulic driving system or the stopping of the power storage system, may be performed. If only the hydraulic driving system is stopped, the processing of step S604 through step S618 may be omitted. When only the electric driving system and the power storage system are stopped, the processing of step S602 is omitted.

Returning to FIG. 21, the controller 30A proceeds to step S508 when the processing of step S512 is ended, that is, when the process of the flowchart of FIG. 22, is ended.

Thus, in this example, the controller 30A causes the state of the hydraulic actuator to transition to an inoperable state, when the charging cable is connected to the charging port 72 while the excavator 100 is operating.

This allows the controller 30A to substantially prohibit the continuation of work by the excavator 100, in a state where the charging cable is connected to the charging port. Thus, for example, when the excavator 100 is operating, and a third party connects a charging cable to the charging port 72 without the user (operator) in the cabin 10 being aware of this, it is possible to avoid a situation in which the excavator 100 continues work. Thus, for example, it is possible avoid a situation where the excavator 100 continues to work and the charging cable breaks or the charging cable is dragged to affect the surroundings of the excavator 100, thereby improving the safety of the electrically operated excavator 100.

In this example, the controller 30A may stop the pump motor 12 if the charging cable is connected to the charging port 72 while the excavator 100 is operating.

This allows the excavator 100 to stop the main pump 14 and specifically cause the operation state of the hydraulic actuator to transition to an inoperable state.

When a predetermined cable is connected to the charging port 72 during operation of the excavator 100, the controller 30A may cut off the supply of hydraulic oil from the pilot pump 15 (or the main pump 14 when the pilot pump 15 is omitted) to the hydraulic control valve 31.

Accordingly, the excavator 100 can stop supplying pilot pressure from the pilot pump 15 or the main pump 14 to the hydraulic control valve 31, and specifically cause the operation state of the hydraulic actuator to transition to an inoperable state.

The output device 50 may report to the user, under the control of controller 30A, why the hydraulic actuator transitions to an inoperable state.

This allows the excavator 100 to cause the user to recognize that the hydraulic actuator transitions to an inoperable state because the charging cable is connected.

[Control Process for Start and Stop of Charging Mode]

Figure 23:
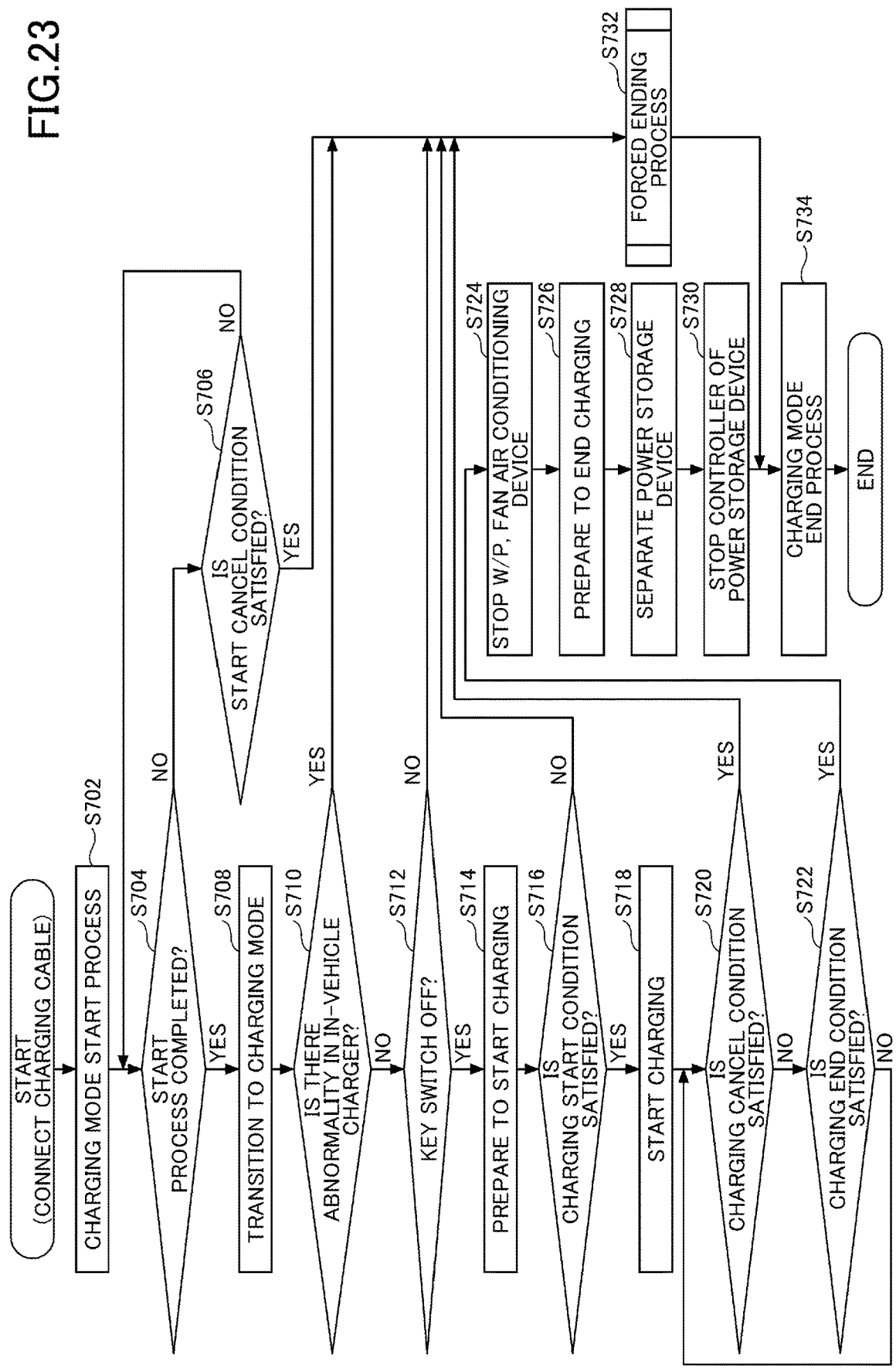
FIG. 23 is a flowchart schematically illustrating an example of a control process for starting and stopping the charging mode of the excavator.
Figure 24:
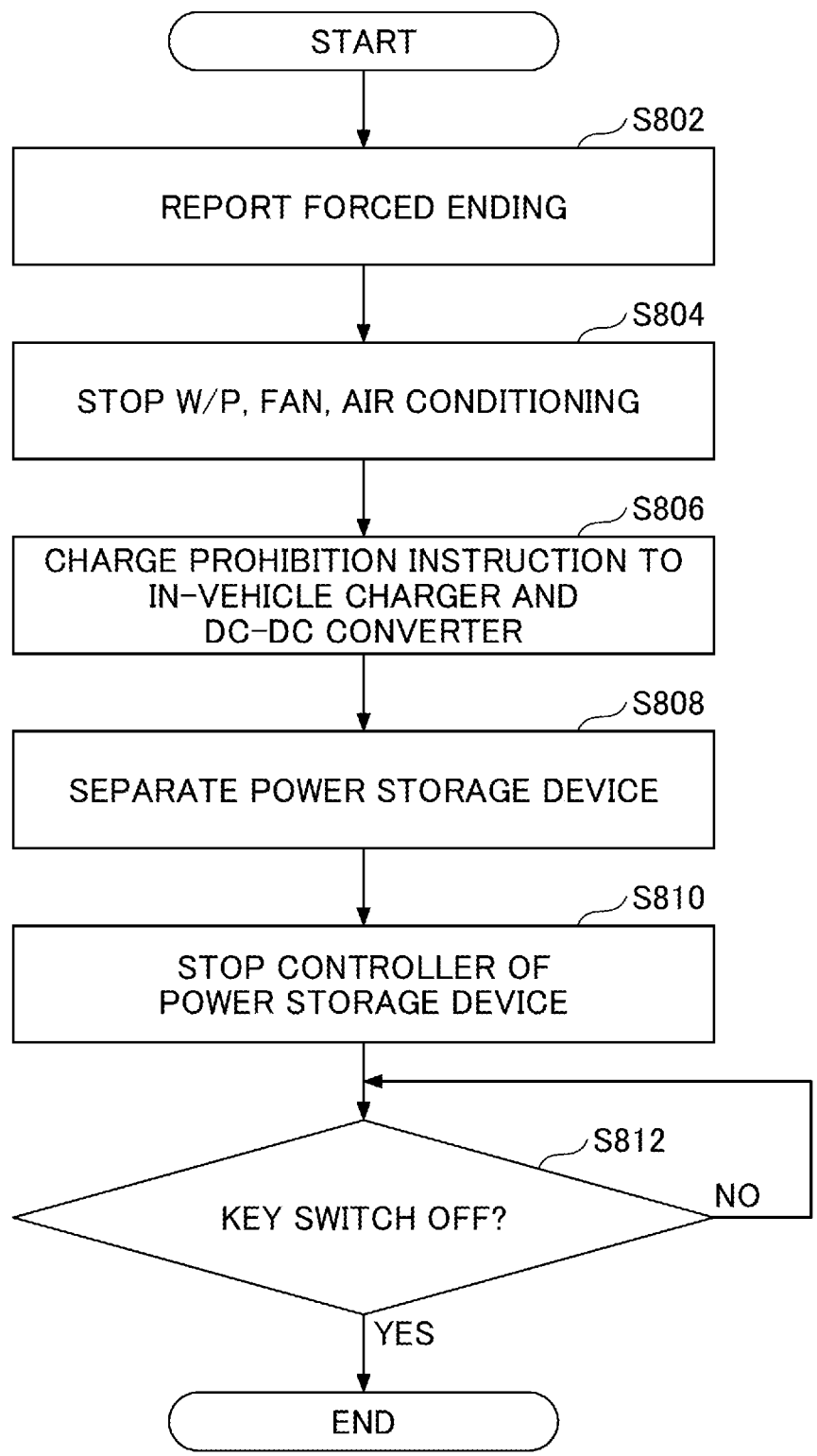
FIG. 24 is a flowchart schematically illustrating an example of a forced ending process of charging mode.

Referring now to FIGS. 23 and 24, a control process regarding the start and stop of the charging mode will be described.

FIG. 23 is a flowchart schematically illustrating an example of a control process for starting and stopping the charging mode of the excavator 100. FIG. 24 is a flowchart schematically illustrating an example of a forced ending process of the charging mode.

FIGS. 23 and 24 are flowcharts of an emergency stop process when the charging cable is connected to the charging port 72A.

The process of the flowchart of FIG. 23 is started, for example, when the charging cable is connected to the charging port 72 while the excavator 100 is stopped, i.e., the key switch is off. The process of the flowchart of FIG. 23 may be started, for example, when the charging cable is connected to the charging port 72 with the key switch off and the accessory switch off. The accessory switch is provided in the power path between a predetermined low voltage device, other than the control device 30, and the battery 46, and is turned on to enable power to be supplied from the battery 46 and the DC-DC converter 44 to the low voltage device while the excavator 100 is stopped.

As illustrated in FIG. 23, in step S702, the controller 30A starts the start process of the charging mode of the excavator 100. The charging mode of the excavator 100 is a control mode for charging the power storage device 19 through the charging cable.

When the process of step S702 is completed, the controller 30A proceeds to step S704.

In step S704, the controller 30A determines whether the charging mode start process has been completed. If the charging mode startup process is not completed, the controller 30A proceeds to step S706, and if the charging mode startup process is completed, the controller 30A proceeds to step S708.

In step S706, the controller 30A determines whether a condition (hereinafter, a "start cancel condition") for cancelling the start of the charging mode is satisfied. The start cancel condition includes, for example, receiving a signal representing an abnormality from the in-vehicle charger 70 via controller 30D. If the start cancel condition is not satisfied, the controller 30A returns to step S704. If the start stop condition is satisfied, the controller 30A proceeds to step S732.

When the charging cable is connected to the charging port 72B, the start cancel condition of this step may include, for example, receiving a signal representing an abnormality from the external power supply (charging stand) side through the controller 30D.

Meanwhile, in step S708, the controller 30A transitions to the charging mode.

When the process of step S708 is completed, the controller 30A proceeds to step S710.

In step S710, the controller 30A determines whether there is an abnormality in the in-vehicle charger 70. Specifically, the controller 30A may determine whether a signal representing an abnormality output from the in-vehicle charger 70 has been received through the controller 30D. The controller 30A proceeds to step S712 when there is no abnormality in the in-vehicle charger 70, and proceeds to step S732 when there is an abnormality in the in-vehicle charger 70.

When the charging cable is connected to the charging port 72B, in this step, the controller 30A may determine whether a signal representing an abnormality is received from the external power supply (charging stand) side through the controller 30D.

In step S712, the controller 30A determines whether the key switch is in the OFF state. The controller 30A proceeds to step S714 when the key switch is in the off state and proceeds to step S732 when the key switch is in the on state.

In step S714, controller 30A prepares to start charging. Specifically, the controller 30A may cause the system main relay to transition to the connection state via the controller 30D. The controller 30A may report to the user that charging is started through the output device 50.

When the process of step S714 is completed, the controller 30A proceeds to step S716.

In step S716, the controller 30A determines whether the charging start condition is satisfied. The charging start condition includes, for example, the key switch being in the off state. The charging start condition includes, for example, that the in-vehicle charger 70 is in a standby state. For example, the controller 30A identifies the state of the in-vehicle charger 70 by receiving a signal representing the current state from the in-vehicle charger 70 through the controller 30D. The charging start condition includes charging from the DC-DC converter 44 to the battery 46 is complete and the battery 46 is fully charged. For example, controller 30A can identify the voltage state of the battery 46 by receiving the output of the sensor 48 through the controller 30E. The charging start condition includes that the system main relay of the power storage device 19 is connected. For example, the controller 30A can identify the connection state of the system main relay by receiving, through the controller 30D, a signal representing the measurement result of the voltage of the power storage device 19 including the system main relay in the path. If the charging start condition is satisfied, the controller 30A proceeds to step S718, and if not, the controller 30A proceeds to step S732.

When the charging cable is connected to the charging port 72B, the charging start condition may include the condition relating to the state of the external power supply (charging stand side) instead of the condition relating to the state of the in-vehicle charger 70.

In step S718, the controller 30A starts charging the power storage device 19. Specifically, the controller 30A outputs an instruction to start charging to the in-vehicle charger 70 through the controller 30D. The controller 30A operates the water pump 64 and the fan 90. Accordingly, it is possible to prevent the temperature increase caused by the heat generation of the power storage device 19 and the in-vehicle charger 70.

The controller 30A may switch between operation/stop of the water pump 64 or the fan 90 while identifying the temperature state of the device to be cooled (such as the power storage device 19 or the in-vehicle charger 70) based on the output of the temperature sensor 54 while the power storage device 19 is being charged.

When the process of step S718 is completed, the controller 30A proceeds to step S720.

In step S720, the controller 30A determines whether the charging cancel condition is satisfied. For example, the charging cancel condition includes that the key switch is on. Also, for example, the charging cancel condition may include receiving a signal representing an abnormality of other controllers (such as the controllers 30B to 30E). If the charging cancel condition is not satisfied, the controller 30A proceeds to step S722, and if the charging stop condition is satisfied, the controller 30A proceeds to step S732.

In step S722, the controller 30A determines whether the charging end condition is satisfied. For example, the charging end condition includes that the state of charge (SOC) of the power storage device 19 has reached a predefined target value (target charge amount). The target charge amount may be, for example, 100 percent, representing full charge, or may be a lower charge amount (e.g., 80 percent) than full charge that is suitably set manually or automatically. For example, the controller 30A receives a signal representing a calculation result of the charging state based on the result of measuring the voltage of the power storage device 19 from the controller 30D, thereby identifying the charging state of the power storage device 19. The charging end condition may include, for example, that the charging cable has been removed from the charging port 72. If the charging end condition is satisfied, the controller 30A proceeds to step S724, and if the charging end condition is not satisfied, the controller returns to step S720.

In step S724, the controller 30A stops the water pump 64, the fan 90, and the air conditioning device 80.

When the process of step S724 is completed, the controller 30A proceeds to step S726.

In step S726, the controller 30A prepares for ending the charging of the power storage device 19. Specifically, the controller 30A may output a control instruction to transition to a standby state, to the in-vehicle charger 70. The controller 30A may output a control instruction to stop the operation, to the DC-DC converter 44.

The controller 30A proceeds to step S728 upon confirming that the in-vehicle charger 70 has transitioned to the standby state and the DC-DC converter 44 has stopped the operation.

In step S728, controller 30A blocks the system main relay through the controller 30D and separates the power storage device 19 from the power supply system.

When the controller 30A confirms that the power storage device 19 has been separated from the power supply system, the controller 30A proceeds to step S730.

In step S730, the controller 30A stops the controller 30D of the power storage device 19.

When the process of step S730 is completed, the controller 30A proceeds to step S734.

On the other hand, in step S732, the controller 30A performs the forced ending process of the charging mode. Specifically, the process transitions to the flowchart illustrated in FIG. 24.

As illustrated in FIG. 24, in step S802, the controller 30A reports to the user that the charging mode of the excavator 100 is forcibly ended together with the reason, through the output device 50. The controller 30A may also report that it is necessary to turn off the key switch once (see step S812) in order to recover from the forced ending of the charging mode. The controller 30A may transmit a signal to an external device representing an emergency stop of the excavator 100 or the like through a communication device when the excavator 100 is remotely operated or remotely monitored.

When the process of step S802 is completed and a certain amount of time elapses, the controller 30A proceeds to step S804.

In step S804, the water pump 64, the fan 90, and the air conditioning device 80 are stopped.

When the process of step S804 is completed, the controller 30A proceeds to step S806.

In step S806, the controller 30A outputs a charge prohibition instruction to prohibit the charging of the power storage device 19 and the battery 46, to the in-vehicle charger 70 and the DC-DC converter 44, through the controllers 30D and 30E.

When the charging cable is connected to the charging port 72B, in this step, the controller 30A may output a signal requesting to prohibit (stop) the external power supply (charging stand) side from charging the power storage device 19.

The controller 30A proceeds to step S808 when it is confirmed that the charging prohibition is applied to the in-vehicle charger 70.

In step S808, the controller 30A cuts off the system main relay through the controller 30D and separates the power storage device 19 from the power supply system.

When the controller 30A confirms that the power storage device 19 has been separated from the power supply system, the controller 30A proceeds to step S810.

In step S810, the controller 30A stops the controller 30D of the power storage device 19.

When the process of step S810 is completed, the controller 30A proceeds to step S812.

In step S812, controller 30A determines whether the key switch has been turned off. If the key switch is not turned off, the processing of this step is repeated until the key switch is turned off. If the key switch is turned off, the process of this flowchart is completed.

Returning to FIG. 23, the controller 30A proceeds to step S734 when the process of step S732, that is, the flowchart of FIG. 24, is completed.

In step S734, the controller 30A performs the charging mode end process.

When the processing in step S734 is completed, the controller 30A completes the process of the flowchart.

Thus, in this example, when the charging cable is connected to the charging port 72, the controller 30A does not activate the pump motor 12 even if an input (e.g., an input to turn the key switch on) for activating the pump motor 12 is received from the user.

This can improve the safety of the electrically operated excavator 100, for example, by avoiding the situation where the excavator 100 starts work during charging and the charging cable breaks or the charging cable is dragged affecting the surroundings of the excavator 100.

In this example, the controller 30A may start the charging of the power storage device 19 if the charging cable is reconnected to the charging port 72 after the input for activating the pump motor 12 is canceled and the connection of the charging cable to the charging port 72 is canceled.

Thus, the controller 30A can reconfirm the user's intention to charge the power storage device 19, for example, when the user has inadvertently turned the key switch on, and then the key switch is turned off again and the charging cable is caused to be reconnected to the charging port 72. Thus, controller 30A can safely resume the charging of the power storage device 19.

The output device 50 may report to the user about the reason why the pump motor 12 is not activated in response to an input from the user for activating the pump motor 12 (e.g., an input for turning the key switch on).

This allows the excavator 100 to make the user aware that the pump motor 12 is not activated because the charging cable is connected to the charging port 72.

In this example, the controller 30A may start the charging of the power storage device 19 when the charging cable is connected to the charging port 72 while the accessory switch is on.

This allows the controller 30A to activate the low voltage device (e.g., the air conditioning device 80, a radio, and the like, described below) of the excavator 100 at the start of charging of the power storage device 19.

[Control Process for Use of Air Conditioning Device During Charging of the Power Storage Device]

Figure 25:
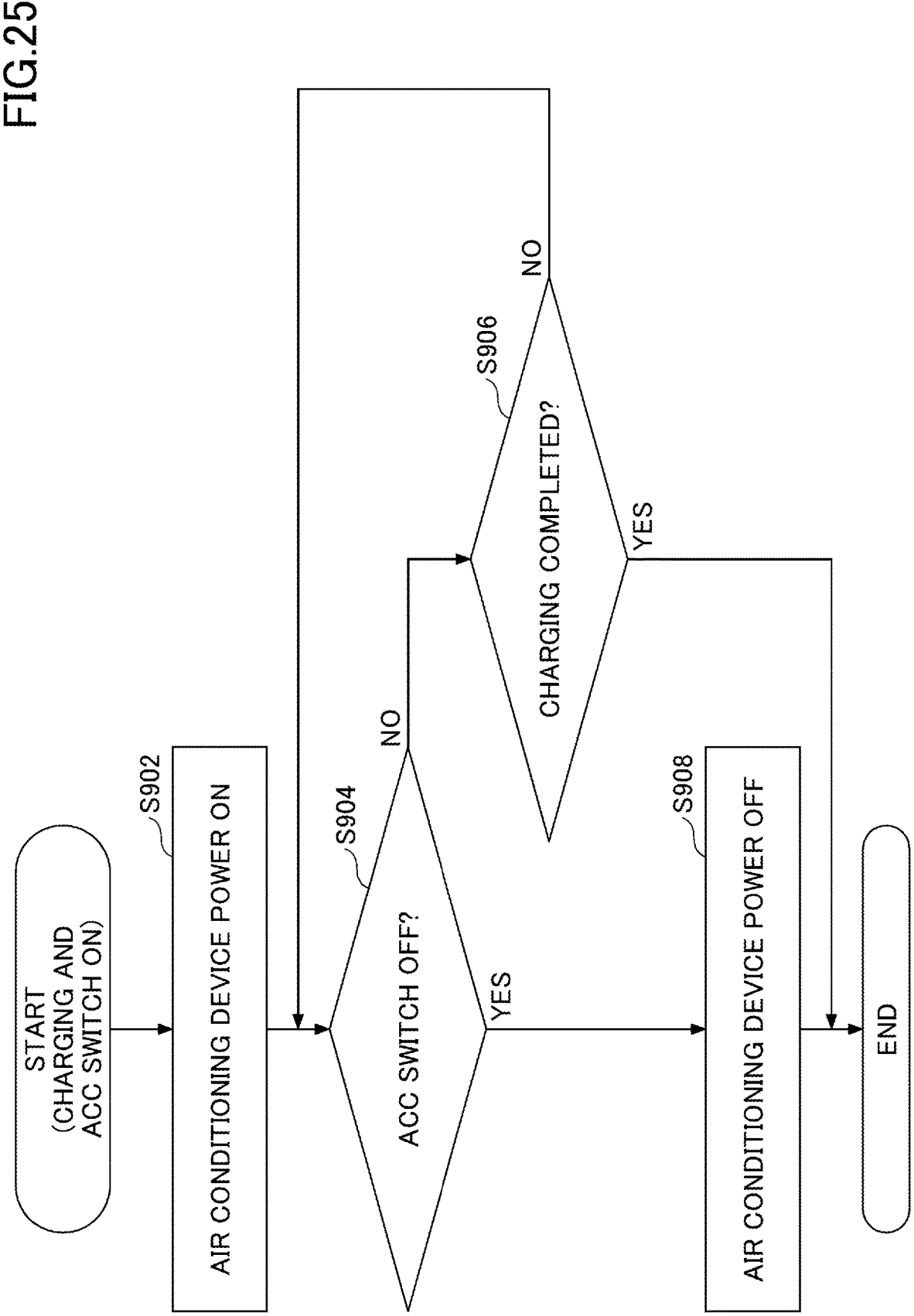
FIG. 25 is a flowchart schematically illustrating a first example of a control process for the use of an air conditioning device during charging of the power storage device.
Figure 26:
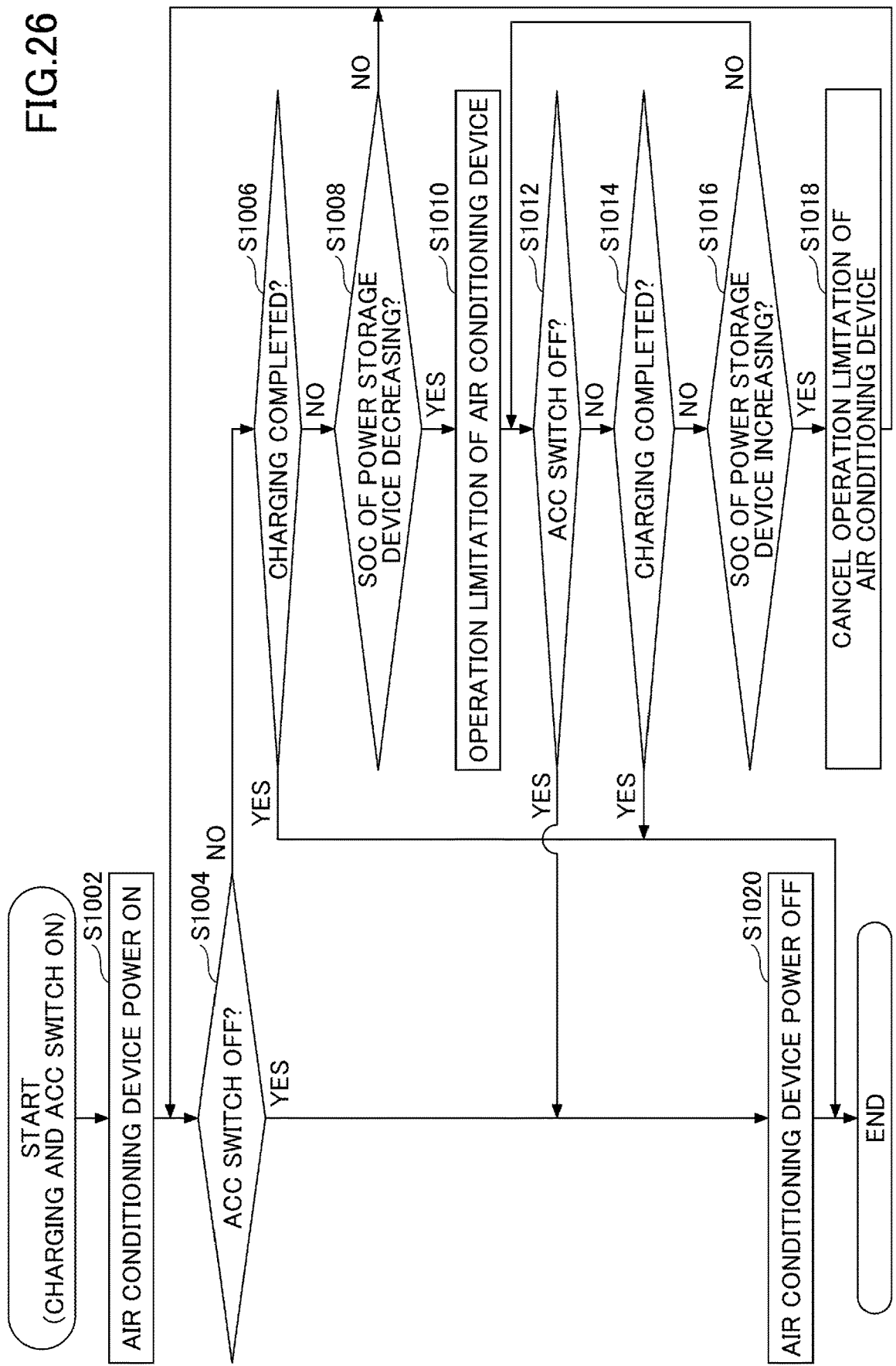
FIG. 26 is a flowchart schematically illustrating a second example of a control process for the use of an air conditioning device during charging of the power storage device.

Referring now to FIGS. 25 and 26, a control process regarding the use of an air conditioning device during the charging of the power storage device 19 will be described.

First Example of Control Process

FIG. 25 is a flowchart schematically illustrating a first example of a control process for the use of the air conditioning device 80 during the charging of the power storage device 19.

The process of this flowchart is implemented when the power storage device 19 is being charged and the accessory switch is on. The accessory switch may be turned on from a state before the power storage device 19 is charged, or the accessory switch may be turned on after the power storage device 19 starts to be charged. Hereinafter, the same shall apply to the flowchart of FIG. 26 which will be described later.

As illustrated in FIG. 25, in step S902, the controller 30A turns on the power of the air conditioning device 80. This allows the air conditioning device 80 to operate in response to input from a user (operator) of the cabin 10.

When the process of step S902 is completed, the controller 30A proceeds to step S904.

In step S904, controller 30A determines whether the accessory switch has been turned off. The controller 30A proceeds to step S906 if the accessory switch is not turned off, and proceeds to step S908 if the accessory switch is turned off.

In step S906, the controller 30A determines whether the charging of the power storage device 19 has been completed. When the charging of the power storage device 19 is completed, the controller 30A ends the process of this flowchart, and when the charging of the power storage device 19 is not completed, the controller 30A proceeds to step S904.

On the other hand, in step S908, the controller 30A turns off the power of the air conditioning device 80.

When the process of step S908 is completed, the controller 30A ends the process of this flowchart.

Thus, in this example, the controller 30A operates the air conditioning device 80 in response to an input from a user when the charging cable is connected to the charging port. Specifically, the controller 30A may cause the air conditioning device to operate in response to an input from the user when the accessory switch is on and a predetermined cable is connected to the charging port.

This can improve the comfort and convenience of the user who is present in the cabin 10 during the charging of the power storage device 19.

<Second Example of Control Process>

FIG. 26 is a flowchart schematically illustrating a second example of a control process relating to the use of the air conditioning device 80 during the charging of the power storage device 19.

As illustrated in FIG. 26, the processing of steps S1002, S1004, and S1006 is the same as that of steps S902, S904, and S906 in FIG. 25, and, therefore, the description thereof will be omitted.

In step S1004, the controller 30A proceeds to step S1006 when the accessory switch is not off and proceeds to step S1020 when the accessory switch is off.

In step S1006, when the charging of the power storage device 19 is not completed, the controller 30A proceeds to step S1008, and when the charging of the power storage device 19 has been completed, the process of this flowchart is ended.

In step S1008, the controller 30A determines whether the charge amount (SOC) of the power storage device 19 is decreasing. For example, the controller 30A sequentially receives the charge amount (SOC) calculated from the measurement result of measuring the voltage of the power storage device 19 through the controller 30D to identify the change in the charge amount of the power storage device 19. If the charge amount of the power storage device 19 is decreasing, the controller 30A proceeds to step S1010. If the charging amount is not decreasing, the controller 30A returns to step S1004.

In step S1010, the controller 30A limits the operation of the air conditioning device 80. This reduces the power supplied to the air conditioning device 80 from the power storage device 19 through the DC-DC converter 44.

When the process of step S1010 is completed, the controller 30A proceeds to step S1012.

In step S1012, the controller 30A determines whether the accessory switch is in the off state. If the accessory switch is not in the off state, the controller 30A proceeds to step S1014, and if the accessory switch is in the off state, the controller 30A proceeds to step S1020.

In step S1014, the controller 30A determines whether the charging of the power storage device 19 has been completed. If the charging of the power storage device 19 has not been completed, the controller 30A proceeds to step S1016. If the charging has been completed, the controller 30A ends the process of the flowchart.

In step S1016, the controller 30A determines whether the charge amount (SOC) of the power storage device 19 is increasing at a rate exceeding a predetermined reference rate. The controller 30A proceeds to step S1018 if the charge amount of the power storage device 19 is increasing at a rate exceeding a predetermined reference rate, and otherwise returns to step S1012.

In step S1018, the controller 30A cancels the operation limitation of the air conditioning device 80.

When the process of step S1018 is completed, the controller 30A returns to step S1004.

On the other hand, step S1020 is the same as the processing of step S908 in FIG. 25, and, therefore, the description thereof will be omitted.

Thus, in this example, the controller 30A limits the operation of the air conditioning device 80, when the charge amount of the power storage device 19 decreases in a state where the air conditioning device 80 is operating while the power storage device 19 is being charged.

Accordingly, the controller 30A can change the charge amount of the power storage device 19 from a decreasing state to an increasing state, by to the limitation of operation of the air conditioning device 80, in a state where the current consumption of the air conditioning device 80 is relatively high and the charge amount of the power storage device 19 is decreasing even though the power storage device 19 is being charged. Accordingly, the controller 30A can more appropriately achieve both the charging of the power storage device 19 and the use of the air conditioning device 80 while the power storage device 19 is being charged.

According to an aspect of the present invention, the capacity of a power storage device can easily be changed in an electrically operated excavator.

While the embodiments have been described in detail above, the disclosure is not limited to such particular embodiments, and various modifications and variations are possible within the scope of the scope of the appended claims.

What is claimed is:

1. An excavator comprising:
a lower traveling body;
an upper turning body turnably mounted to the lower traveling body;
an actuator configured to drive a driven part including the lower traveling body and the upper turning body; and
a power storage device mounted in the upper turning body and configured to serve as an energy source for driving the actuator, the power storage device including a plurality of power storage modules stacked in a vertical direction, each of the plurality of power storage modules including a power storage part and a housing that houses the power storage part,
wherein the housing of each of the plurality of power storage modules includes
an accommodating part that accommodates the power storage part;
a lid that closes an opening of the accommodating part; and
a plurality of first bolts that fasten the lid to the accommodating part in the vertical direction, and
the power storage device further includes a plurality of second bolts that fasten the accommodating part of the housing of a first power storage module and the lid and the accommodating part of the housing of a second power storage module together, the first power storage module being stacked on the second power storage module in the plurality of power storage modules with the lid of the housing of the second power storage module being between the accommodating part of the housing of the first power storage module and the accommodating part of the housing of the second power storage module.

2. The excavator according to claim 1, wherein each of the plurality of power storage modules includes an upper coupling structure configured to be compatible with a lower coupling structure of each of all other ones of the plurality of power storage modules.

3. The excavator according to claim 1, wherein each of the plurality of power storage modules includes a lower coupling structure configured to be compatible with an upper coupling structure of each of all other ones of the plurality of power storage modules.

4. The excavator according to claim 1, wherein the plurality of power storage modules have substantially a same shape in a top view.

5. The excavator according to claim 4, wherein the housings of at least two of the plurality of power storage modules have substantially a same external shape.

6. The excavator according to claim 1, wherein relevant devices of the power storage device are distributed among and housed in the housings of the plurality of power storage modules.

7. The excavator according to claim 6, wherein the relevant devices include at least one of a power storage control device configured to implement control relating to the power storage device, or a power relay device configured to relay power between the power storage device and a plurality of other devices.

8. The excavator according to claim 1, wherein the plurality of power storage modules each include
a hole provided on a side surface of the housing, the hole being configured to have a service plug detachably mounted therein, the service plug being configured to block a power path, and
a cover configured to cover the hole.

9. The excavator according to claim 1, wherein
in the housing of each of the plurality of power storage modules, fastening holes configured to fasten the plurality of second bolts are provided between fastening holes to which two adjacent ones of the first bolts are fastened.

10. The excavator according to claim 1, wherein the housing of the first power storage module has recesses on a lower surface of the housing, the recesses being positioned at substantially same positions as the plurality of first bolts of the housing of the second power storage module.

* * * * *